(12) United States Patent
Mall et al.

(10) Patent No.: US 9,161,156 B2
(45) Date of Patent: Oct. 13, 2015

(54) TILES IN A MOBILE APPLICATION FRAMEWORK

(71) Applicants: Sanjeet Mall, Heidelberg (DE); Hans Kedefors, Hillsborough, CA (US); Karsten Hinrichs, Ludwigshafen (DE); Karoly Nyisztor, Dunakeszi (HU); Zoltan Farkas, Hernadnemeti (HU); David Egresits, Sopron (HU)

(72) Inventors: Sanjeet Mall, Heidelberg (DE); Hans Kedefors, Hillsborough, CA (US); Karsten Hinrichs, Ludwigshafen (DE); Karoly Nyisztor, Dunakeszi (HU); Zoltan Farkas, Hernadnemeti (HU); David Egresits, Sopron (HU)

(73) Assignee: SAP SE, Walldorf (DE)

( * ) Notice: Subject to any disclaimer, the term of this patent is extended or adjusted under 35 U.S.C. 154(b) by 104 days.

(21) Appl. No.: 14/062,480

(22) Filed: Oct. 24, 2013

(65) Prior Publication Data

US 2015/0040104 A1     Feb. 5, 2015

Related U.S. Application Data

(60) Provisional application No. 61/860,703, filed on Jul. 31, 2013, provisional application No. 61/860,716, filed on Jul. 31, 2013.

(51) Int. Cl.
| | |
|---|---|
| *G06F 9/44* | (2006.01) |
| *H04W 4/00* | (2009.01) |
| *H04L 12/24* | (2006.01) |
| *H04L 29/06* | (2006.01) |
| *H04L 29/08* | (2006.01) |
| *G06F 9/445* | (2006.01) |

(52) U.S. Cl.
CPC ............... *H04W 4/003* (2013.01); *G06F 8/60* (2013.01); *G06F 8/71* (2013.01); *G06F 9/44505* (2013.01); *H04L 41/082* (2013.01); *H04L 63/08* (2013.01); *H04L 67/34* (2013.01); *G06F 8/36* (2013.01); *G06F 8/65* (2013.01)

(58) Field of Classification Search
IPC ...... G06F 13/00,3/00, 9/4443, 9/542, 2209/545, G06F 8/00, 8/10, 8/60; H04W 4/003
See application file for complete search history.

(56) References Cited

U.S. PATENT DOCUMENTS

| | | | |
|---|---|---|---|
| 7,240,327 B2 | 7/2007 | Singh et al. | |
| 7,577,912 B2 | 8/2009 | Govindan et al. | |
| 7,865,606 B1 * | 1/2011 | Tewes et al. | 709/230 |
| 8,095,565 B2 | 1/2012 | Dengler et al. | |
| 8,171,410 B2 | 5/2012 | Falchuk | |
| 8,434,097 B2 | 4/2013 | Brandow et al. | |
| 8,453,175 B2 | 5/2013 | Reid et al. | |
| 8,645,973 B2 | 2/2014 | Bosworth et al. | |
| 2004/0083463 A1 * | 4/2004 | Hawley | 717/140 |
| 2004/0172637 A1 * | 9/2004 | Koutyrine | 719/328 |
| 2004/0252121 A1 | 12/2004 | Bhatt et al. | |
| 2005/0091185 A1 * | 4/2005 | Koutyrine et al. | 707/1 |
| 2005/0246656 A1 * | 11/2005 | Vasilev et al. | 715/805 |
| 2010/0030783 A1 * | 2/2010 | Ho et al. | 707/9 |
| 2012/0023064 A1 | 1/2012 | Ireland | |
| 2012/0117534 A1 * | 5/2012 | Hershenson et al. | 717/105 |

(Continued)

*Primary Examiner* — Tuan Vu

(74) *Attorney, Agent, or Firm* — Schwegman Lundberg & Woessner, P.A.

(57) ABSTRACT

In an example embodiment, a mobile application framework is added to a metadata-driven application. The mobile application framework includes generic libraries having one or more references to one or more configuration files stored on a platform server. Then the one or more configuration files can be updated to include one or more tiles, each tile comprising a user interface element or screen view, each tile being either a primitive tile or a tile embedding other nested tiles within it, thereby updating the metadata-driven mobile application without recompiling it.

18 Claims, 61 Drawing Sheets

(56) References Cited

U.S. PATENT DOCUMENTS

| | | |
|---|---|---|
| 2012/0173339 A1 | 7/2012 | Flynt et al. |
| 2012/0180073 A1 | 7/2012 | Hung |
| 2012/0204114 A1 | 8/2012 | Jessen et al. |
| 2013/0013649 A1 | 1/2013 | Husseini et al. |
| 2013/0318125 A1 | 11/2013 | Smith et al. |
| 2014/0173683 A1 | 6/2014 | Zhang et al. |

* cited by examiner

FIG. 35 iOS Simulator - iPhone (Retina 4-inch) / iOS 6.1 (10B141)

Carrier 3:34 AM

Hello World! This is Extensibility!

Approved By: Peter Dawson 2013-04-16 13:34:36 +0000

▶ 📄 http_all_your_base_are_belong_to_us_leaverequestcollection%.xml ← 4000
  📄 http_all_your_base_are_belong...erequestcollection%.xml (French)
  📄 http_all_your_base_are_belong...erequestcollection%.xml (English)
  📄 http_all_your_base_are_belong...requestcollection%.xml (German)

TILES IN A MOBILE APPLICATION FRAMEWORK

CROSS-RELATION TO RELATED APPLICATIONS

This application claims priority to U.S. Provisional Application No. 61/860,703, filed Jul. 31, 2013, and to U.S. Provisional Application No. 61/860,713, filed Jul. 31, 2013, both of which applications are incorporated herein by reference in their entireties.

TECHNICAL FIELD

This document generally relates to methods and systems for use with a mobile application framework. More particularly, this document relates to tiles in a mobile application framework.

BACKGROUND

Mobile applications (also known as "apps") have dramatically increased in popularity with the rise of smartphones and tablets. It is common for these applications to be downloaded by end users from a central repository, sometimes referred to as an "app store" or other location where digital files can be downloaded to user devices. App developers typically design the application, test the code, compile the code, and then upload the compiled code representing the app to the app store. Updates to the app, even for minor changes such as user interface changes (e.g., logo changes, font changes, color changes, etc.) still require that the application be recompiled and uploaded to the app store, where a user must download the latest version.

BRIEF DESCRIPTION OF DRAWINGS

The present disclosure is illustrated by way of example and not limitation in the figures of the accompanying drawings, in which like references indicate similar elements and in which:

FIG. 9 is a block diagram illustrating a system, in accordance with an example embodiment, including main parts of the UI and Logic Components and the other Components they interact with.

FIG. 20 is a screen capture illustrating a method, in accordance with an example embodiment, of selecting options for the template.

FIG. 34 is a screen capture illustrating a method, in accordance with an example embodiment, of displaying a complete list of libraries and frameworks.

FIG. 35 is a screen capture illustrating a method, in accordance with an example embodiment, of executing the application after this last step.

FIG. 40 is a screen capture illustrating a method, in accordance with an example embodiment, of presenting a resulting resource file and corresponding localized languages.

Figure 44:
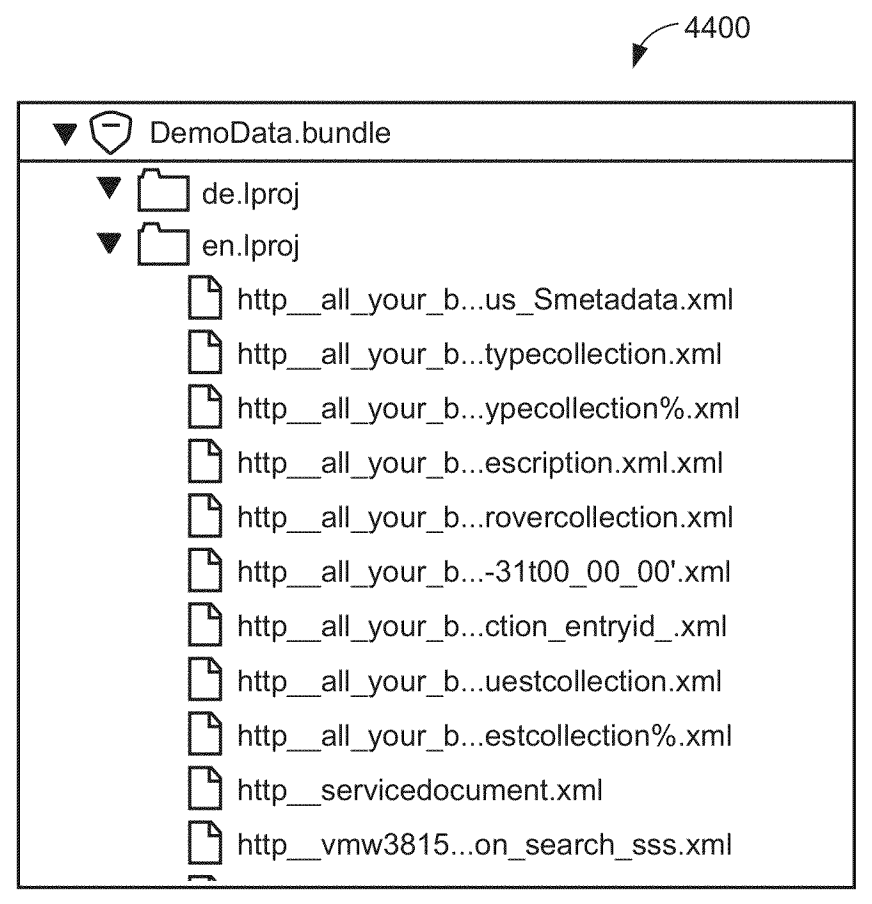

FIG. 44 is a screen capture illustrating a method, in accordance with an example embodiment, of placing demo data in a separate bundle.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, a mobile application framework is provided to allow a powerful and flexible platform to be used to create and distribute mobile applications. The framework allows designers to build and run customizable native mobile applications.

In an example embodiment, the mobile application framework provides customization, changeability and extensibility, dynamic configuration, reusable components, and a standardized look and feel. The mobile application framework may also provide the ability to build native enterprise ready mobile applications that are customizable and extensible. In an example embodiment, this may be accomplished through configuration rather than by coding changes. This helps to maximize developer productivity.

Figure 1:
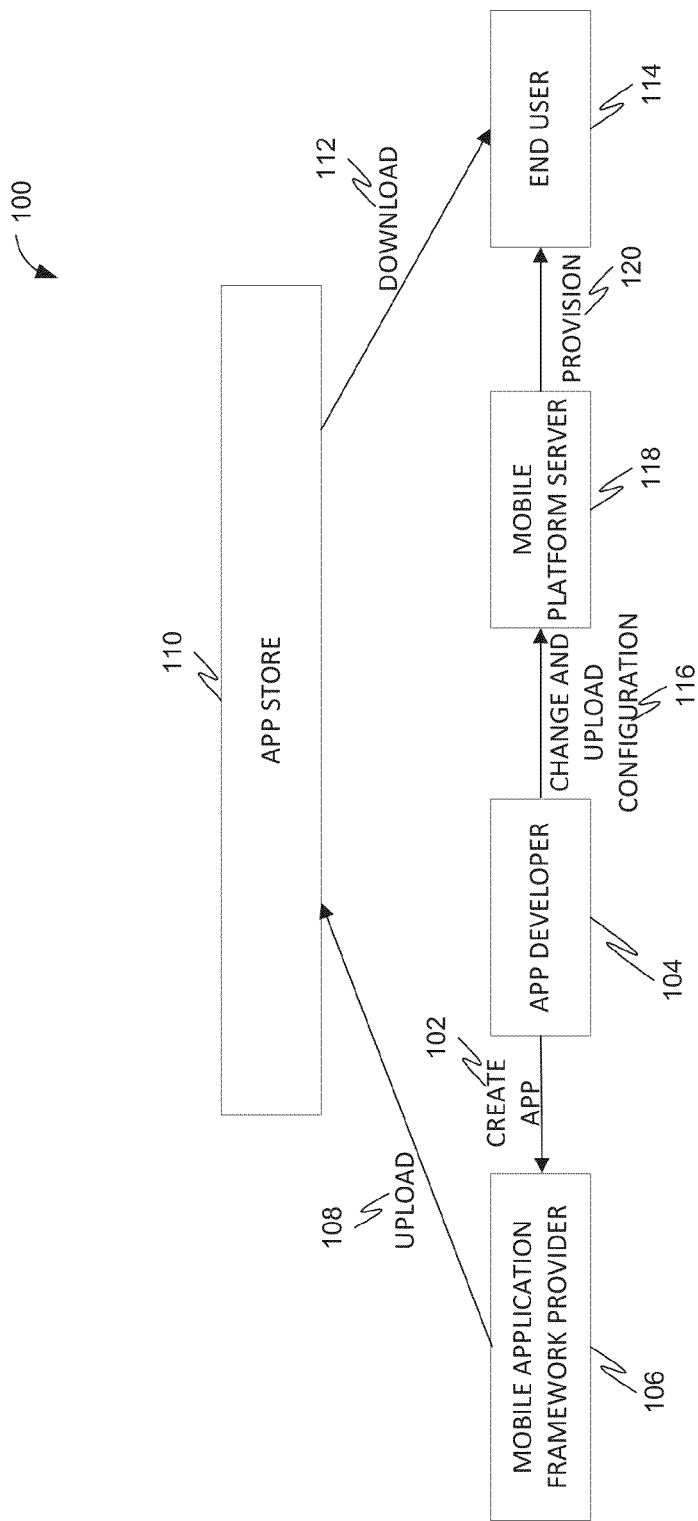
FIG. 1 is a diagram illustrating a method, in accordance with an example embodiment, of provisioning an update to a mobile application.

FIG. 1 is a diagram illustrating a method 100, in accordance with an example embodiment, of provisioning an update to a mobile application. At operation 102, an application developer 104 may create an application using a mobile application framework provider 106. This process will be described in more detail below, but generally the application developer 104 may include one or more configuration files in the application. At operation 108, the mobile application framework provider 106 may upload the created application to an app store 110. Subsequently, at operation 112, and end-user 114 may download the application from the app store 110.

Later, when the application developer 104 wishes to make a change to a portion of the application, such as altering user interface elements, the application developer 104 may change one or more configuration files and upload the altered configuration files to a mobile platform server 118. At operation 120 the mobile platform server 118 may provision the new configuration files to the end-user 114.

Figure 2:
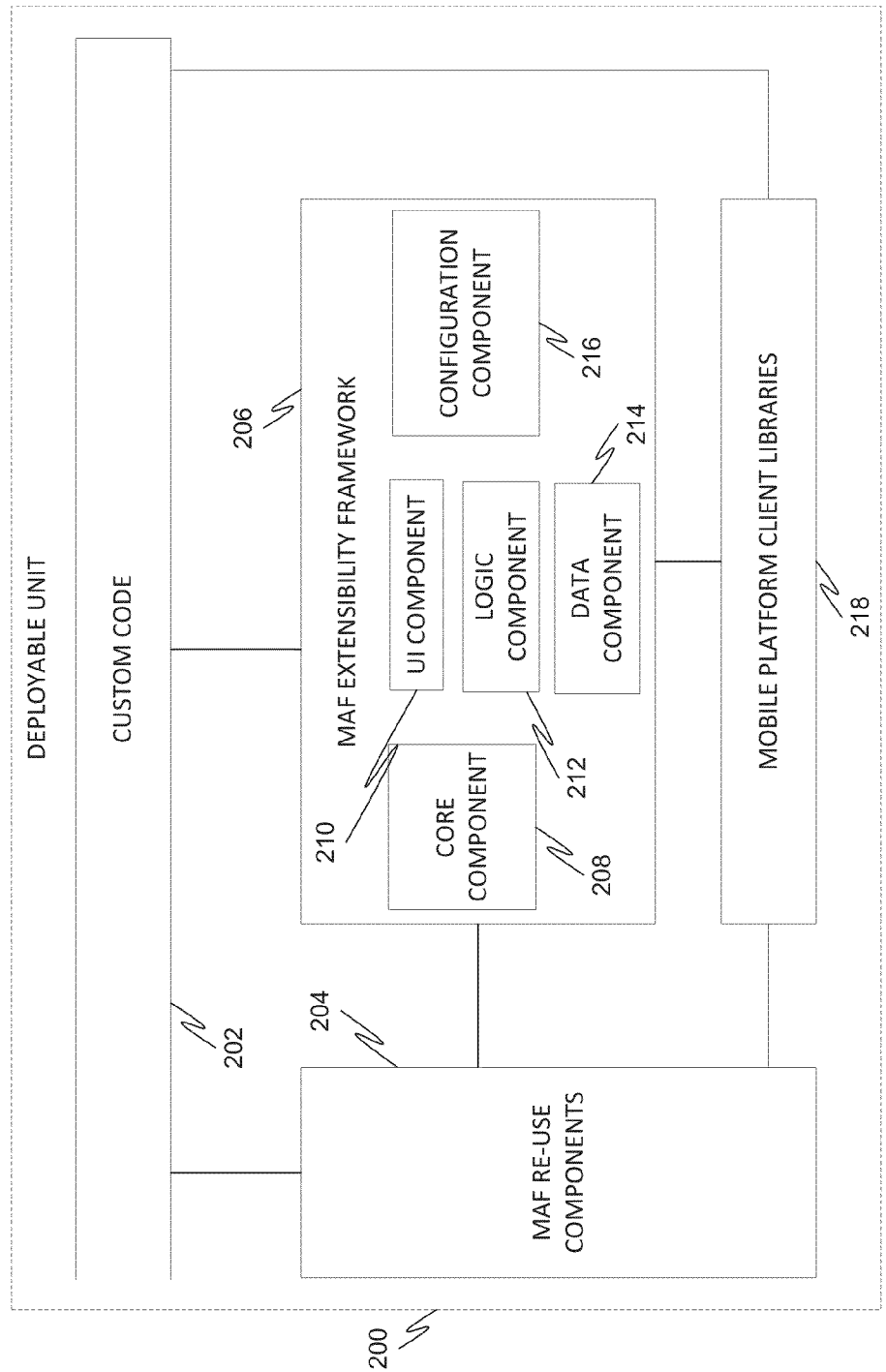
FIG. 2 is a diagram illustrating a system, in accordance with an example embodiment, for provisioning an update to a mobile application.

FIG. 2 is a diagram illustrating a system, in accordance with an example embodiment, for provisioning an update to a mobile application. The system includes a deployable unit 200, which can be deployed as a whole to a mobile device for execution. This mobile device may be, for example, an end-user device. The deployable unit 200 may include custom code 202, which may be developed by an application developer. The custom code 202 may include mobile application framework re-use components 204. The mobile application framework re-use components 204 may be developed by a mobile application framework provider. The mobile application framework re-use components 204 may be part of a series of mobile application framework libraries that can be downloaded and included in the deployable unit 200 by the application developer. Also a part of the series of mobile application framework libraries is the mobile application framework extensibility framework 206. By including these mobile application framework libraries in the deployable unit 200, the application developer provides a mechanism by which elements of the application can be modified after deployment to an end-user, without requiring recompilation and/or redistribution of the application.

The mobile application framework extensibility framework 206 may include a number of components, including a core component 208. The core component may expose application program interfaces (APIs) that initialize the framework and access additional functionality provided by internal components. A user interface component 210 may encapsulate a metadata-driven view, controller, and data binding generation functionalities. A logic component 212 may create controllers associated with the metadata and maintain responsibility for the behavior of the application, including business logic. A data component 214 may provide a unified facade to the underlying data access technology. A configuration component 216 may read and parse all the metadata required by the application, such as user interface definitions, data bindings, user interface elements and controls, events, and actions (built-in and custom). The configuration component 216 may also transform metadata to native constructs using wrapper classes, dedicated parsers, and validators.

Mobile platform client libraries 218 may store metadata in the form of configuration files. In an example embodiment, user interface elements may be included in the mobile platform client libraries 218 in the form of tiles. A tile is a user interface elements or screen, which can be primitive or can embed further tiles. Theoretically, tiles can be nested to an unlimited level.

When a deployable unit 200 is compiled, uploaded to an app store, downloaded by an end user, and executed, the deployable unit 200 may simply execute as an ordinary application would, running various functions from the custom code 202. When a call to a mobile application framework re-use component 204 is encountered in the custom code 202, then control may pass one or more functions defined within the mobile application framework re-use component 204. The mobile application framework re-use component 204 may then be executed using functionality within the mobile application framework extensibility framework 206, which may retrieve one or more tiles from the configuration files in the mobile platform client libraries 218.

When an application developer wishes to update one or more user interface elements or other metadata of the application, the application developer may update one or more configuration files within the mobile platform client libraries 218 by updating a mobile platform server that can deploy the updates to these mobile platform client libraries 218 to the end-user device. Since modification of these mobile platform client libraries 218 does not directly alter the functionality of the code, such as custom code 202, of the application, there is no need to recompile the application in order to take advantage of the updates.

It should be noted that while this document concentrates on providing extensibility using configuration files to update user interface and other metadata elements, in some example embodiments behavior and/or logic can be altered as well. This may be accomplished through the use of configuration files, or through other means.

In an example embodiment, by default, each application ships with a predefined set of configuration data, which is added to the project as a resource bundle. External configuration files can override the defaults. These external configuration files allow an application developer to modify and enhance the look and feel of the application, add or remove user interface elements and screens, modify data bindings, and so on. This may all be accomplished without having to recompile the application. In an example embodiment, the configuration files are distributed from a mobile platform server in compressed form, which may be called the application configuration profile (ACP).

In an example embodiment, there are several different types of configuration files stored in the application configuration profile. The first, called "META-INF", may contain versioning related metadata. This may include a file called MANIFEST.MF, which is a manifest file used by the mobile platform server.

The second type of configuration files is tiles. In some example embodiments, tiles may be expressed in extensible markup document (XML) form. Files may include layout_phone.xml, which provides an extensibility configuration file for phone or phone-like devices (such as MP3 players), and layout_tablet.xml, which provides an extensibility configuration file for tablet devices.

The third type of configuration files is styles. This may include style.xml, which is a styling configuration file.

The fourth type of configuration files is image files. These contain the static images used by the application, organized by platform. Thus, image files for multiple different platforms can all be stored in the library and the device may simply just use the files corresponding to its platform. For example, a platform called IOS may contain images specific to the iOS platform. Subfolders may contain images specific to specific devices within that platform such as for example iPhone and iPad. In an example embodiment, native naming conventions may apply. For example <filename>.png may be used for low-resolution images in the iOS platform, and <filename>@2x.png may be used for hi-resolution images in the iOS platform. For android devices, subfolders within an android image folder may contain images specific to the density of the android device. For example LDPI may contain images specific to low density android devices. MDPI may contain images specific to medium density android devices, and so on.

The fifth type of configuration files is strings. Strings may contain localized text strings, one file per locale. In an example embodiment, filenames may follow this format localization.<language code>.xml.

The sixth type of configuration files may be called "ext." This may include configuration files required by the application. The entry names may be defined by the application. The developer can place any kinds of files in this directory. Although the framework does not process files in the ext folder, it exposes the APIs required to retrieve their content.

The seventh type of configuration files may be demos. These may contain off-line data used by the application in demo mode.

These types of configuration files may represent only a small portion of the possible types of configuration files available to the system and are only intended as examples. Other embodiments may be possible where some but not all of the above types of configuration files are used, either in lieu of or in conjunction with other types of configuration files not listed here.

The mobile application framework enables rapid development of mobile applications using a common set of services and a consistent approach. It also allows for sustainable development of packaged applications by providing developer extensibility in a declarative manner via configuration, i.e., without the need for access to source code, in turn allowing for easy upgrades of the application.

Much of this disclosure will focus on the client side of the extensibility. It may be assumed that a valid, consistent, and correct configuration is available on the client device and can be accessed by the client occasion. Further it is assumed that all required libraries are bound to the application and that the functionality is available. While this disclosure makes these assumptions, these assumptions are not intended to be limiting and, in fact, it is possible that in some implementations one or more of these assumptions may not be correct.

The mobile application framework supports a scenario in which an application development is implementing a concrete application that performs a particular business process. The mobile application framework also supports a scenario in which a developer or partner applies specific extensions to a mobile application. In the first scenario, the application development team may have access to the framework API and is even able to add specific classes which implement the application and its required behavior. Hence, the application can provide its own custom implementation to override certain default framework functionality. The application then may keep the control and responsibility as desired. In the second scenario, developers may be supported to enhance the application in a structural way. This means that developers can change the layout of the screen, add new fields or entire screens, plus the required navigation to the new screens. However, the framework may not support the definition of new behavior logic, also known as behavior extensibility. In some embodiments, however, such behavior extensibility may be supported.

When building an application using them mobile application framework, there are many different development possibilities. A developer can choose to build an application fully using metadata definition. A developer can choose to build an application partially using metadata definition and partially using custom code. A developer can choose to build a fully custom application that uses the configuration extensions provided I the mobile application framework and provisioning infrastructure.

As described above, the mobile application framework allows developers to configure the application without access to code or the need to recompile. The application developer can integrate the framework to make use of the extensibility capabilities. A number of example use cases will now be described.

In one example embodiment, the developer is able to adjust user interface controls to a corporate design (colors, font, font size, etc.). Further, it shall be possible to replace icons/images with custom ones, also known as rebranding.

In another example embodiment, a developer is able to modify the layout of the existing screen. This may include, for example, rearranging, hiding, and adding new user interface controls. In the case of adding new controls, the developer is able to bind these two business object attributes or application available behavior. The behavior of the original controls may remain as prior to the modification. In addition, if the new controls contain static text (e.g., labels) the developer is able to define the static text in multiple languages.

In another example embodiment, the mobile application framework is able to handle new attributes as well as new business objects and enable the developer to bind the new attributes to user interface controls. The mobile application framework is then able to handle changes in the data model gracefully for additional values are objects.

In another example embodiment, the developer is able to define a new screen based on existing or new business objects. To display the newly defined screen, the navigation to it shall also be defined via customization by the developer. Basic activities, such as select (from a list), new, update, and delete may be supported.

In another example embodiment, an activity list/detail user interface displays activity attributes that are derived from an activity object plus a business partner name that comes from the business partner object. On a visit detail screen, one can see the customer name that comes from a different object than the visit object. The application developer can adjust the display data. This permits the display of a detail screen with ID-name resolution.

Figure 3A:
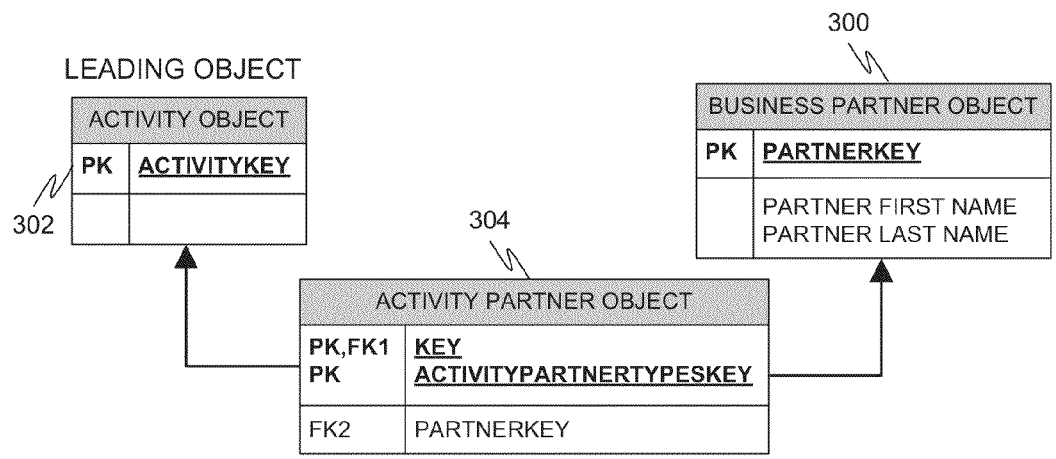
FIGS. 3A and 3B illustrate the interrelation between objects for to use cases, in accordance with an example embodiment.
Figure 3B:
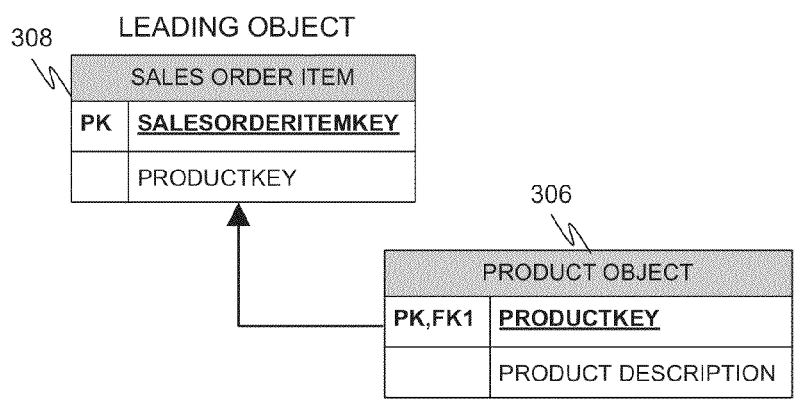

In another example embodiment, it is possible to display attributes from a leading object (source) and a name from another object (target) on a list screen. The ID of the target object may or may not be an attribute of the source object. FIGS. 3A and 3B illustrate the interrelation between objects for to use cases, in accordance with an example embodiment. Preferring first to FIG. 3A, the ID of target object 300 is not an attribute of the leading object 302, but is instead an attribute of an intermediary object 304. This is in contrast to FIG. 3B, in which the ID of the target object 306 is an attribute of the leading object 308.

In another example embodiment, the key of a target object may be filled on a detail screen of the source object while editing/creating the source object. On the detail screen of the source object, it may be possible to navigate to a target objects search screen, choose records (one or many), and assign to the source object. For example, when creating an activity, it may be desirable to enter the business partner ID.

In another example embodiment, it is possible to a search screen as value help.

In another example embodiment, it is possible to apply filters on the value help before the user navigates to the value help.

In another example embodiment, validators may be associated in order to enable some basic client-side checks. For example, in a given purchase order, it may be possible to:
 Check for a given data type (string/integer/date etc . . . )
 Check for Length (of a long number/string/decimals etc . . . )
 Check if an attribute value is in the allowed range for another given attribute
 Check if Date/time greater-than or less-than. Example (1) employment date from, employment date to, (2) Employment date from less than date of birth, then raise error, (3) Date of item between dates of header (range), (4) time within business hours dates, (5) greater than today
 Check if an attribute value is in a given range (between an upper and lower limit where upper and lower limit are 2 attributes of a BO)

Check if a mandatory attribute is filled by user
Check if a value (of an attribute) is less than sum of a set of attributes
Check email format
Check for allowed characters in an attribute. Example: Allow—1234567890/( )ABCDEFGHIJKLM-NOPQRSTUVWXYZabcdefghijkl mnopqrstuvwxyz and spaces
Check for a valid file name
Check for Prefixes In another example embodiment, it may be possible for an application developer to pass a context (value/object) when navigating from one screen to another.

In another example embodiment, it may be possible for an application developer to design different kinds of navigation patterns. For example, in the case of tablets, where the device real estate is more than that of smart phones, it is common to have a navigation pane on the left side. The navigation pane may contain items such as sales orders, activities, etc. In an example embodiment, by default the left menu may always be displayed for the complete application scenario. The navigation pane also can be hidden when the user needs more real estate. An example of such a navigation may be seen in a sales laptop application. This type of navigation may be known as "left menu based."

In another example embodiment, tab-based navigation may be utilized. In this case, the application may have a navigation pane on the top as tabs. The different tabs can contain items such as sales orders, activities, etc.

In another example embodiment, a combination of left menu and tab may be utilized. In this case, the application may have left menu for main objects and tabs for child objects. For example, sales order could be an item in the left menu. Once the user navigates to a given sales order, the default display could be a sales order detail while the child objects of a sales order such as contracts, partners, follow-up objects can be displayed as tab items.

In another example embodiment a swipe-like navigation scheme may be utilized. In this case, the application provides backward navigation from one screen to another by swiping (instead of the usual click) by swiping. This is typically performed in conjunction with a touchscreen interface. Foreword navigation may be performed via click action. An example of such a navigation may be seen in, for example, a sales application.

In another example embodiment, applications may define platform specific transition patterns between screens.

In another example embodiment, applications can put and read content of recently visited objects across the application. For example, if an application has leads, customers, and activities, and the user has navigated from a first lead to a second customer then to a fourth customer, then the recent items list may contain all of these objects (where least the object type in key) in order that the application can use this for displaying recently visited items.

In another example embodiment, applications may define an aggregate field that gets data from multiple fields. For example first name, last name, and title may be individual fields in the database or attributes that need to be displayed as one concatenated field on the user interface during display.

In another example embodiment, it is possible to display fields as de-aggregated for an edit mode.

In another example embodiment, it is possible for applications to provide application-specific logic to mobile application framework extensibility framework generated user interfaces. The application provided business logic implementation may be called by the framework to notify about relevant events triggered by the user (e.g., press a button, select an item, etc.).

In another example embodiment, applications may be able to use the mobile application framework extensibility framework for generation of configured user interface elements. The framework is not responsible for displaying the user interface elements. The application can use the generated user interface elements to create a user interface and control the runtime related interaction with the platform specific graphics subsystem. The framework may be initialized for this usage.

In another example embodiment, it is possible for applications to provide application-specific user interface elements. The application-specific user interface elements may be seamlessly integrated into the framework generated configuration-based user interface.

In another example embodiment, it is possible for applications to add configuration files to the framework configuration. The framework may provide an API that enables an application to read the application-specific configuration files. The framework may not process these files in any way.

In an example embodiment the mobile application framework may support MBO and OData based applications, without introducing cross dependencies to the applications. In other words an OData based application should not be forced to include MBO related libraries and vice versa.

In another example embodiment, the mobile application framework supports user experience design guidelines for mobile applications. The framework itself need not define user interface and interaction, but merely may enable application development to follow the given guidelines.

The mobile application framework foundation framework as well as the reusable components may be part of the client architecture. An application can use the mobile application framework foundation framework and at the same time the application is not restricted to use the required libraries or services offered by the platform.

As described above, the application may be built on top of the mobile application framework foundation and is not embedded to the foundation. With this concept, the application development has the possibility to influence and control the behavior of the application, but still take benefit of the extensibility features of the framework. In order to fulfill the extensibility requirements, the mobile application framework foundation may provide the capabilities to define the screens, the flow, and the access to business objects in a declarative manner. This feature enables extensibility without access to the source code while avoiding the need to recompile/redeploy the application. It is the responsibility of the application development to align to the framework interfaces and patterns in order to use this feature.

As described above, the mobile application framework foundation may provide various features to support the application development and give a common pattern for the application. This may include creating and displaying screens, including the header and footer areas, performing business logic (generic or application-specific), accessing and modifying data (content of business objects), and defining the application flow (the navigation from one screen to another screen).

Figure 4:
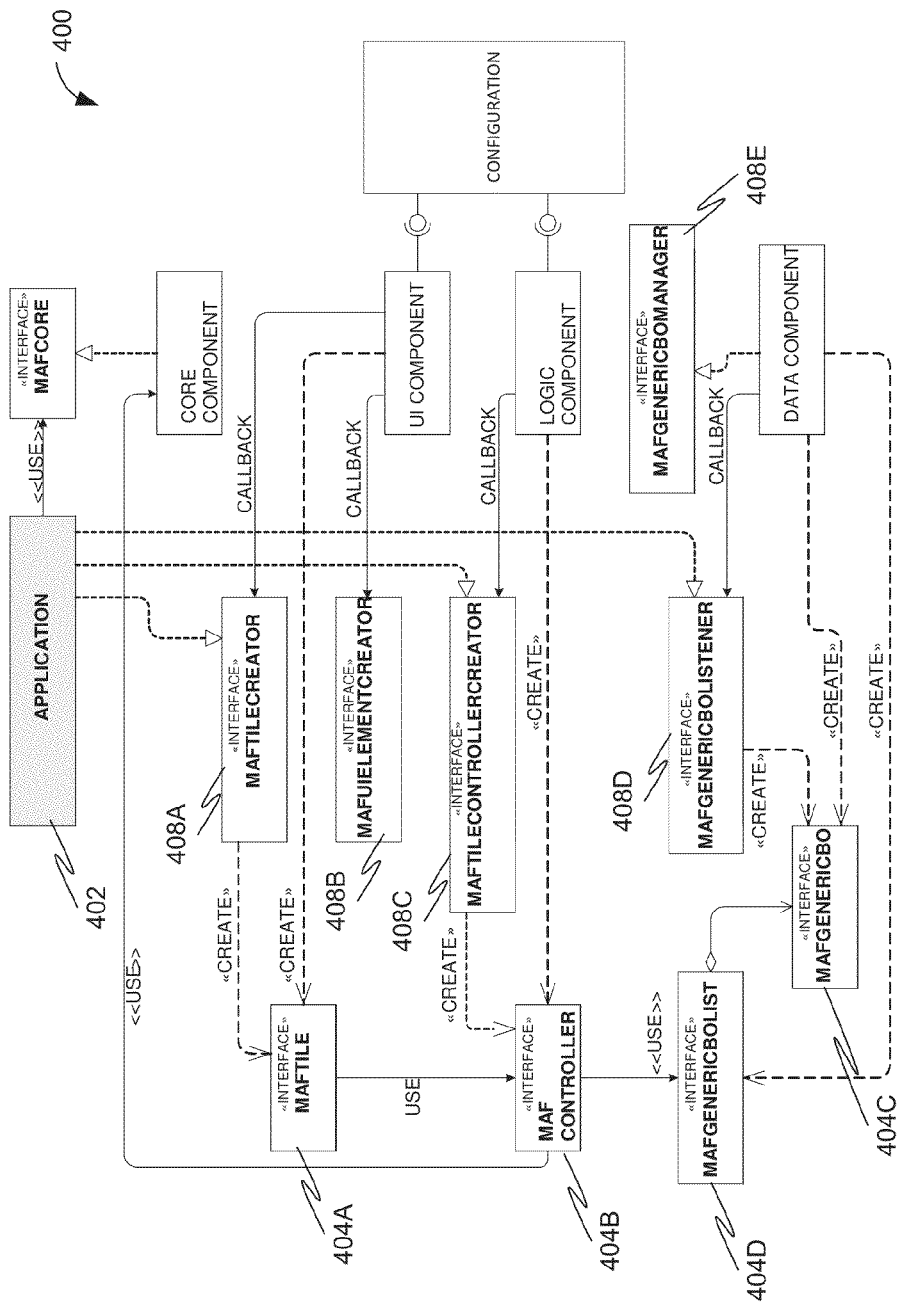
FIG. 4 is a diagram illustrating a system, in accordance with an example embodiment, of components the relations of the components, and the public API interfaces/classes.

Based on these features, the mobile application framework foundation may be divided into independent components which are loosely coupled via defined component ports. FIG. 4 is a diagram illustrating a system 400, in accordance with an example embodiment, of components the relations of the components, and the public API interfaces/classes.

The figure illustrates components and interfaces exposed to the application. The application 402 includes application code, which may in bad the mobile application framework foundation. A series of interfaces 404A, 404B, 404C, 404D of runtime classes are defined as instances of the defined configuration. A tile is the building block of the user interface and is used to define layout. Tiles can focus on parts of the user interface and can be composed to entire screens by nesting tiles to tiles. Tiles controllers are used to perform actions on forwarded events from the associated tile. A GenericBO is a key/value pair representation of business objects and is used as a common type.

An MAFCore 406 provides the main interface for the application/framework interaction.

Various creator classes may be implemented as callback and delegate interfaces 408A, 408B, 408C, 408D, 408E two theories the hook in the application-specific coding.

A UI component 410 may focus on the user interface related parts of the application and its components, which controls the device display.

A logic component 412 may create controllers associated to the tile and maintain responsibility for the behavior of the application (business logic).

A data component 414 may provide a unified facade to the underlying data access technology. The MBO and OData stack may be supported.

A configuration component 416 may provide access to the configuration data distributed to the device. The configuration component for 16 may also be used to keep the handling and parsing of the configuration data in a central place for the benefit of other components.

The core component 418 may act as a main entry point for the mobile application framework foundation, manage the lifecycle, and maintain responsibility for the flow of the application.

The following is an example mobile application framework. It should be noted that this is only an example and not all details are shown in order to keep the focus on basic concepts.

As mentioned earlier, the framework is a mix of configuration (declarative part) encoding. The configuration is the central part in starting point for application development. The configuration may comprise various information bound together, including but not limited to the definition of the user interface (controls and layout), the actions that can be triggered by the user, including the flow of the application, and the binding of business object data to the user interface and logic.

The application is responsible for initializing the framework during startup and providing a context. The context may contain information required by the framework to run a proper initialization such as how to handle the graphics engine of the platform. The code fragments above depict the possibility of the application registering a GenericBO Listener and a ControllerCreator. The framework provides one listener or creator per component as a central access point to the application. The application provided implementation may then be responsible for handling or further dispatching the requests issued by the framework. The framework may then use this listener and delegate interaction with the application as well as providing the possibility for the application to influence the behavior of the framework.

The application may implement the createController method. A parameter may be the tile identifier, which is defined in configuration. A tile may be associated with a controller, therefore the controller may use the same identifier as the tile. The application may decide if a new controller is created or a previously created controller is reduced. If a null signal is returned, then the application will not provide an application-specific implementation. The framework will instantiate an internal tile controller object.

When calling the getData method, the framework may provide a set of parameters as defined in the configuration. One value may be the business object type, which is requested and, in case it applies, the business object ID. In the code sample above, the controller uses the framework provided GenericBOManager to read the objects; this is basically what the default controller is doing. However, an application is free to read the object in different ways, for instance directly calling the MBO object layer to fetch the data. In this case, the application may also be responsible for mapping or converting the objects to GenericBO and adding them to the GenericBOList.

The method may contain a set of parameters provided by the framework to enable controller to call the desired logic. Not all the parameters required by the application-specific implementation, but some of them may be needed by the default controller. The action and event ID may be used to determine the logic triggered by the user defined in the configuration. The framework need not had any special behavior to the defined values. The few parameters provide the controller access to the user interface elements (controls) so it is possible to retrieve and change values in the user interface. Finally the parameter Parameters is a map of key/value pairs as defined in the configuration. The sample code above performs a very similar function compared with the default controller is doing. This means that the application can provide its own controller, but can also decide to use the default controller if sufficient.

The application need not provide its own controller implementation in cases where the default behavior is fitting.

The GenericBOListener can be used by the application to influence the GenericBO and its attributes requested by the user interface component. The listener interface (or protocol) defines a set of methods that reflect the various activities performed by the GenericBOManager. In cases where the application has registered a listener, the MAFGenericBOManager may use a callback function.

The onCreate method is called by the framework in case a read request for a single object is in progress. This method may be used by the application in two ways: to take over the responsibility to create the requested GenericBO and to create device local objects that are not defined in the data model. The application is free to define in the configuration BOTypes that are not part of the model. In other words the configuration is not restricted to the data model, and therefore provides the possibility to define customer calculated attributes at the user interface level.

The afterRead( ) method is called by the GenericBOManager for each GenericBO read from the underlying data provider (MBO or OData). As shown in the sample code above, the application has the possibility to modify or add new attributes that are not part of the data model but are required by the user interface. The binding of these new attributes is performed in the configuration.

The following will show how a developer can enhance an application build with the mobile application framework extensibility framework. The developer has access to the application binary (via, for example, an App Store) and the configuration artifacts (basically the configuration file). Further, the developer may have a mobile platform server installed and running and may be able to deploy applications.

One advantage of their mobile application framework extensibility framework is to enable it developer to enhance and modify an application within a well-defined bandwidth without recompiling the application. This may be performed by the developer influencing the application by modifying the configuration file. Now consider a case where a developer would like to change the content shown in a leave request list. Here, the number of days should not be shown and the leave type should be shown in the first line followed by the time range.

After the changes are performed in the layout section of the configuration, the developer may deploy the new file to the mobile server. During the next launch of the application, the modified configuration will then distribute to the device and be used by the framework. The sample code described above shows a structural change of the application. It should be noted that the framework may not perform any plausibility checks during runtime. Further there may be more limitations on the developer such as preventing the developer from changing the behavior of the application by defining a new action in the event section.

Figure 5:
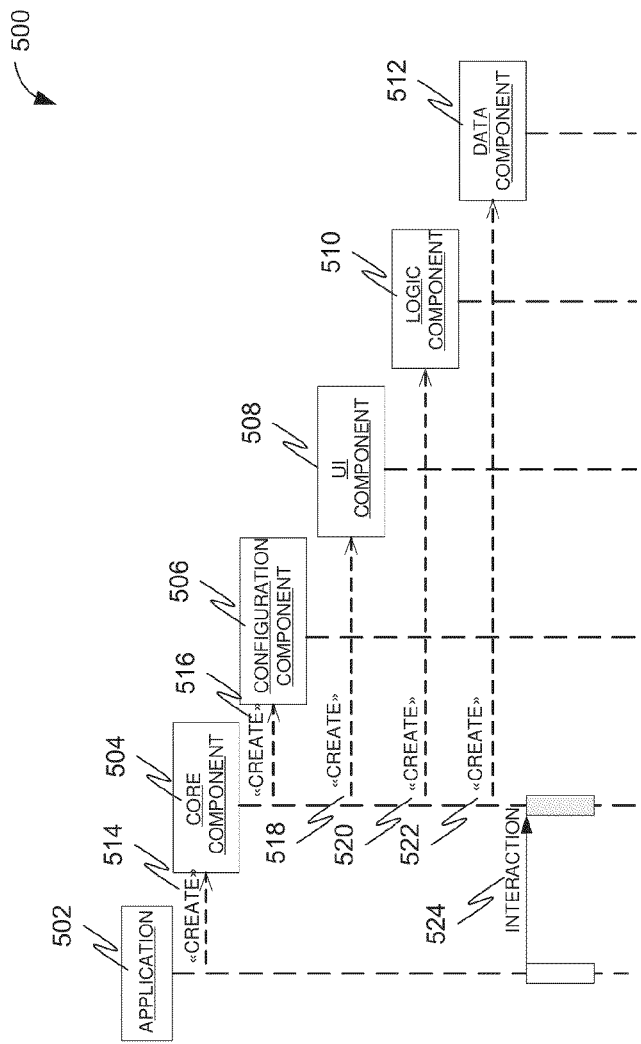
FIG. 5 is a sequence diagram illustrating a method, in accordance with an example embodiment, of instantiating the MAF foundation framework.

FIG. 5 is a sequence diagram illustrating a method 500, in accordance with an example embodiment, of instantiating the MAF foundation framework. Components in this sequence diagram include application 502, core component 504, configuration component 506, UI component 508, logic component 510, and data component 512. At operation 514, the application 502 can create an instance of the core component 504. At operation 516, the core component 504 can create an instance of the configuration component 506. At operation 518, the core component 504 can create an instance of the UI component 508. At operation 520, the core component 504 can create an instance of the logic component 510. At operation 522, the core component can create an instance of the data component 512. At operation 524, the application 502 may then interact with the core component 504.

Figure 6:
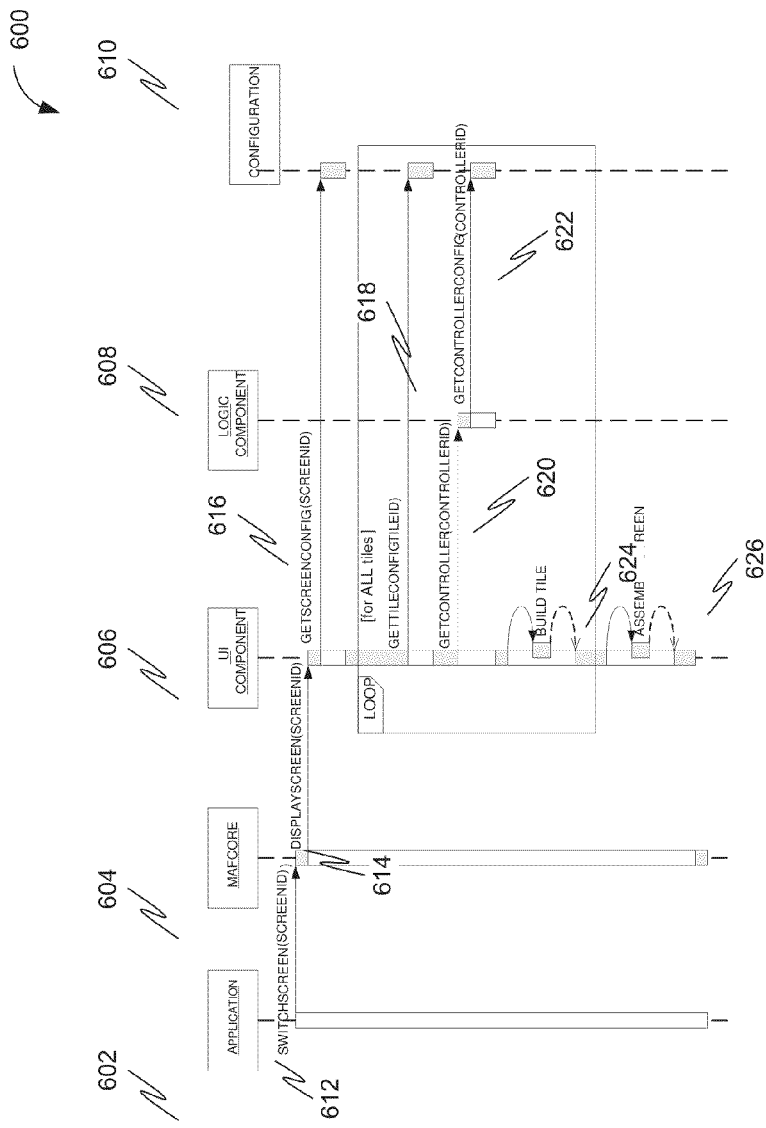
FIG. 6 is a sequence diagram illustrating a method, in accordance with an example embodiment, of creating and assembling required instances.

A request to bring up a new screen to the display (the initial as well as all subsequent) can be split into two activities:
  Creating/assembling the required instances and connecting them
  Performing the desired tasks FIG. 6 is a sequence diagram illustrating a method 600, in accordance with an example embodiment, of creating and assembling required instances. Components in this sequence diagram include application 602, MAFCore 604, UI component 606, logic component 608, and configuration component 610. At operation 612, the application 602 requests to display a new screen using the MAFCore 604 by calling a switchScreen function with a screen ID as a parameter. In should be noted that, in some example embodiments, the requested screen could be the same as the current visible screen, in which case the request could be handled by the MAFCore 604 internally. FIG. 6, however, depicts a case when a completely new screen has to be built.

At operation 614, the MAFCore 604 may call the function displayScreen, passing the screen ID to UI component 606. At operation 616, the UI component 606 may call the function getScreenConfig, which obtains a screen configuration from the configuration component 610. A loop is then begun for each tile. At operation 618, the UI component 606 may call the function getTileConfig, which retrieves the tile configuration for the current tile from the configuration component 610. At operation 620, the UI component 606 may call the function getController to the logic component 608, which in turn calls the function getControllerConfig from the configuration component 610 at operation 622. At operation 624, the UI component 606 then can build the tile. Once all the tiles have been built, at operation 626 the UI component 606 can assemble the screen.

Once the screen, all associated tiles and controllers are built, configured and connected, the UI component 606 triggers to fetch the required data: either single business object (for detail tiles) or collection of business objects (for list tiles). The request is delegated to the controller, which can be an application specific controller.

Figure 7:
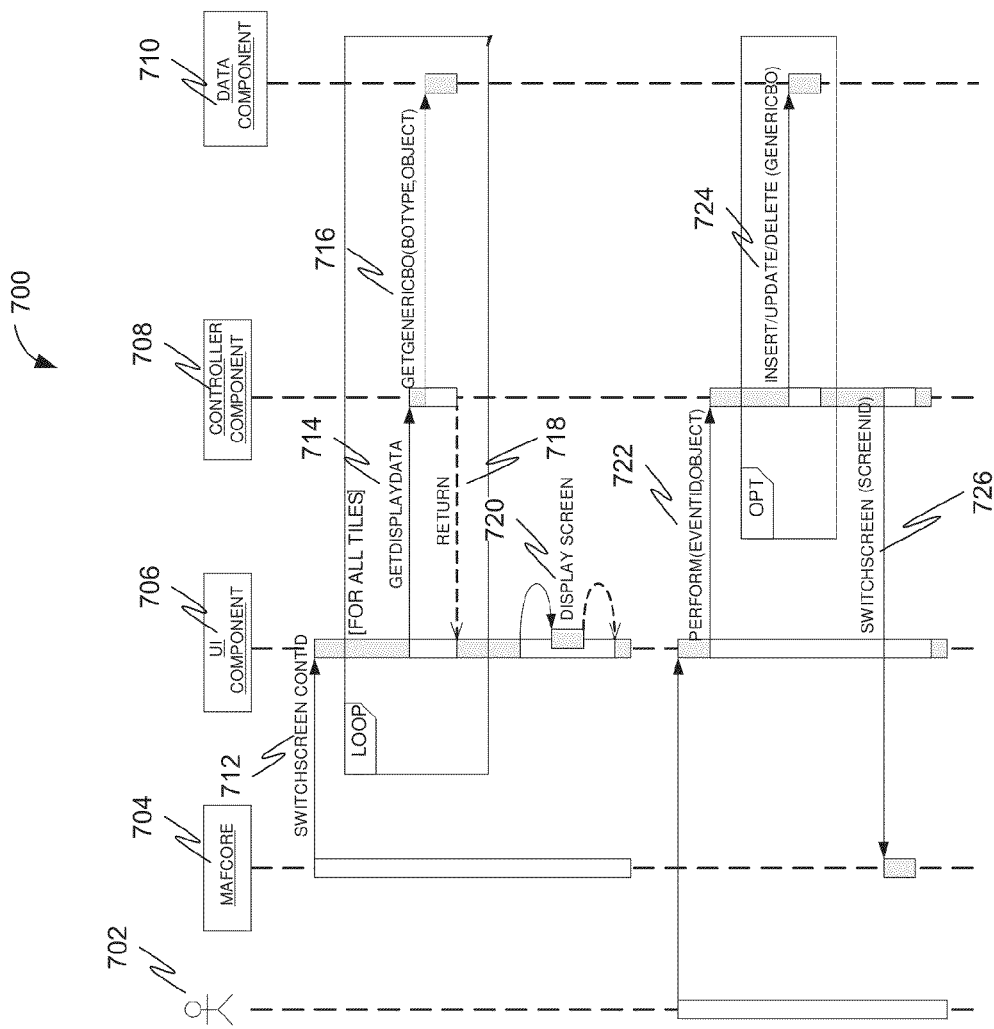
FIG. 7 is a sequence diagram illustrating a method, in accordance with an example embodiment, of fetching required data.

FIG. 7 is a sequence diagram illustrating a method 700, in accordance with an example embodiment, of fetching required data. Components in this sequence diagram include user 702, MAFCore 704, UI component 706, controller component 708, and data component 710. At operation 712, the MAFCore 704 may call the switchscreen function. A loop may then be begun for all the tiles. For each tile, at operation 714 the UI component 706 may get display data from the controller component 708. At operation 716, the controller component can obtain a generic BO from the data component 710. At operation 712, the display data can be returned to the UI component 706.

Once all the tiles have been processed, at operation 718, the screen may be displayed by the UI component 706. At operation 720, the user 702 may cause an event in the UI component 706, such as making a selection of an object. The UI component 706 may then call the perform method on the controller component 708 at operation 722. Optionally, at operation 724, the controller component can cause an insert/update/delete command on the generic BO in the data component 710. At operation 726, the controller component 708 can switch the screen for the MAFCore 702.

The sequence for using a factory callback interface is the same for all possible factory classes. For simplicity the Configuration components is not shown; as described above the Tile- and Controller component request the configuration to request the construction details for the particular object.

The components will now be described in more detail. A configuration component may act as a bridge from the various configuration files and their formats to the most efficient internal representation used by the framework components.

The configuration required on the device may comprise multiple artifacts, which are packed into an archive:
  Tile configuration(s): An XML based file which defines the tile(s) used by the application. The detailed format is described later in this disclosure.
  Styling configuration: An XML based file which defines the styling of the UI elements. The details of this file are defined by the re-usable UIComponent project.
  Image(s): Static images (icons/pictures) used by the application.
  String(s): Localized strings used by the application.
  Custom configuration(s): One or multiple files which are specific to the application. The framework does not need to perform any functionality on this file(s), except providing a handle to the application.

The generation of the archive is outside of the scope of this disclosure. The content of the configuration archive is platform dependent (e.g. image formats), but derived from a common set of configuration artifacts.

The distribution of configuration archive is supported by the mobile platform server, as briefly described below:
  One or more configuration archives can be assigned to an application
  The mobile platform server can provide a list of assigned archives to the application (the detailed API on client side is not yet released)
  The mobile platform server can provide a notification on updates of the assignment The framework is responsible to fetch the archive(s). (Note: the mobile platform server does not need to actively pushing the assigned archives)

The mobile platform server does not need to perform any functionality on the stored archives The mobile platform server may, in a specific example embodiment, expect that the archive is in format of a JAR file that contains a MANIFEST.MF entry. (Basically, this is a zip format with a mandatory MANIFEST.MF entry).

In the above example embodiment, the configuration component is based on JAR file(s). In case multiple archives are used, it may be the responsibility of the framework to handle the relation of the archives. The mobile platform server need not provide any support for this and can treat the assigned archives completely independently.

The APIs provided by the mobile platform client framework are not only for configuration handling. Specifically the notification API is designed to handle set of notifications for different purposes. Based on this fact, the MAF extensibility framework is made independent of the mobile platform API. The application may maintain responsibility for handling the general purpose API and forwarding the relevant notification to the framework. Further the application can provide a callback instance that enables the framework to retrieve configuration archives.

As mentioned above, the configuration archive may contain multiple files. In an example embodiment, it may have the following internal structure:

META-INF: The folder contains metadata; required by mobile platform Server
  MANIFEST.MF: The manifest file required by mobile platform Server.
tiles: The folder contains the tile configuration(s)
  tile_main.xml: The main tile configuration file. This file can be available and act as the central entry point.
  <xyz>.xml: Additional tile configuration file(s). The pattern <xyz> is a placeholder.
styles: The folder contains the style configuration
  style.xml: The styling configuration
img: A folder containing the static images used by the application, organized by platform.
  ios: Contains images specific to the iOS platform. The top-level folder contains images common to all iOS devices.
    iphone: This sub-folder contains images specific to the iPhone.
    ipad: This sub-folder contains images specific to the iPad.
  android: Contains images specific to the Android platform. The top-level folder contains images common to all Android devices.
    idpi: This sub-folder contains images specific to low-density Android devices.
    mdpi: This sub-folder contains images specific to medium-density Android devices.
    hdpi: This sub-folder contains images specific to high-density Android devices.
    xhdpi: This sub-folder contains images specific to extra high-density Android devices.
strings: A folder containing localized text strings, one file per locale.
ext: A folder containing configuration files required by the application.
  The entry names are defined by the application.

The configuration versioning defined below shall support a gracefully handling of multiple versions of the framework and applications. The versioning has two aspects:

The configuration definition: This aspect covers the tile configuration scheme and is in the responsibility of the framework.

The configuration content: This aspect covers the content (e.g. the tile definition) and is in the responsibility of the application and supported by the framework.

In an example embodiment, the configuration definition versioning is able to handle the below listed use-cases:

The latest version of the framework shall be able to read and parse previous versions of the configuration (Backward compatibility)

A previous framework version shall be able to read and parse newer configurations (Forward compatibility). More precisely:
  The framework should not fail (e.g. raise an exception) if a new configuration element is recognized
  It is not expected that the framework react on unknown elements The first case is handled in the way that the previous version(s) are a full subset of the newer version. In other words: A new version shall not change the previous version in any aspect.

The second case is handled based on XML namespaces. All elements defined in the tile configuration scheme are bound to a namespace. A concrete version of the framework shall support all name spaces defined at the date of release. The configuration component should silently ignore all elements bound to unknown namespaces. The supported namespaces of the configuration component are fixed per version and not modifiable with any kind of API or settings.

The building blocks of the configuration are tiles and the related properties. The TileConfiguration can contain the parts which make up definition of the tile, where some parts are optional and might not available for a particular tile.

All images required by application can be included in the configuration archive without any conversion. The configuration component can provide an API to open and read the images. In an example embodiment, it is only possible to access images stored in the 'img' folder and the image name used includes the extension.

In an example embodiment, all customer configuration artifacts are included in the configuration archive without any conversion. The formats of these artifacts depend on the application and the framework shall not be restricted to any particular format.

The configuration component can provide an API to open and read the entries. In an example embodiment, it may only be possible to access artifacts stored in the 'ext' folder and the entry name shall be used as-is including the extension.

The main purpose of the Data Component is to provide unified access to the business objects independent of the used data source. In an example embodiment, the framework will support two data sources MBO and OData.

The defined interface of the data component reflects the requirements of the framework to visualize data in an extendable way. The basic functionality to fetch, modify or delete business objects is covered. However, it is worth noting that the Data Component need not keep any state of the provided business object and may rely fully on the used specific data source. This architectural style of the Data Component enables application developers to implement specific behavior by bypassing the component (via custom controller) without any side effects.

Besides the requirement to support different data sources, the data component can be flexible enough to support various application specific data models. Because the data models (for both MBO and OData) are neither standardized nor unified, the framework need not build in any assumption on data handling.

Figure 8:
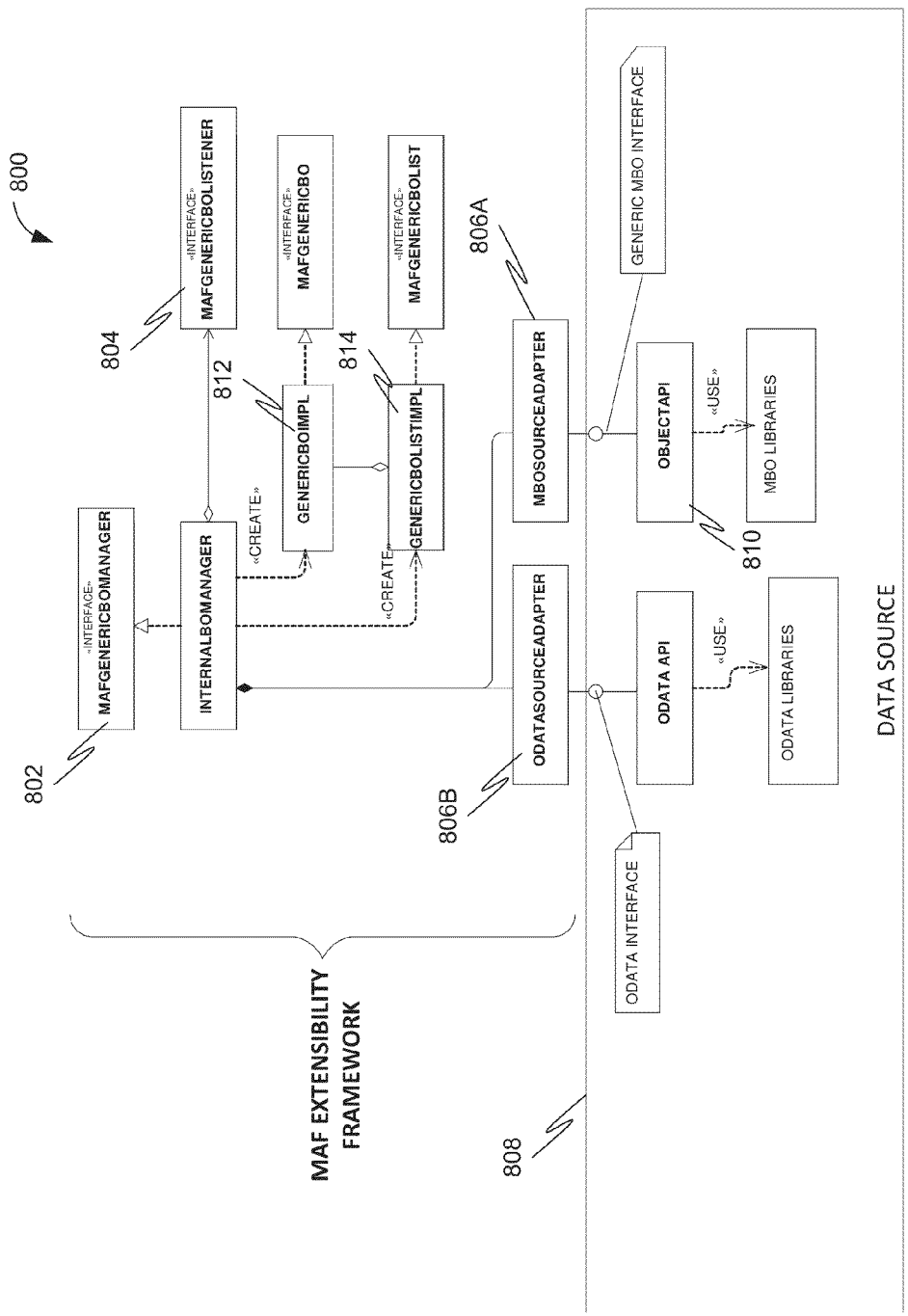
FIG. 8 is a diagram illustrating a system, in accordance with an example embodiment, of a data component.

FIG. 8 is a diagram illustrating a system 800, in accordance with an example embodiment, of a data component. The Data Component may handle one data stack at a time. While both OData and MBO are depicted simultaneously, it is not intended that an application uses OData and MBO in parallel. The combination is shown to highlight that the interface and the type of interaction is common in both cases.

- MAFGenericBOManager 802: This component is responsible to implement the defined interface MAFGenericBOManager and act as a facade of the Data Component to framework internal components and the application. Further, it is responsible for handling a registered MAFGenericBOListener 804 and dispatching the called methods to the appropriate DataSourceAdapter 806A, 806B.
- DataSourceAdapter 806A, 806B: This component acts as a mediator between the framework and the used data source 808. Therefore the component will exist in two concrete implementations; 806A for MBO data source and 806B for the OData data source. It is responsible for converting the data source specific business object representation (e.g. ODataEntry) to MAFGenericBO objects and vice versa. Furthermore the component can map the defined MAFGenericBOManager methods to the data source provided APIs.
- Data Source 808: The term Data Source is used to refer to the external software component and libraries available to retrieve, modify and store business objects. The ObjectAPI 810 provided by the mobile platform client library for MBO is an example for a data source. The data source 808 may be considered as external from the framework perspective; this implies that the data source doesn't have any reference or dependency to the MAF extensibility framework. Further, the life-cycle of the data source and the framework are completely independent. The application may perform the data source initialization steps and provide a reference to the framework (via DataSourceAdapter 806A, 806B).
- GenericBO 812: This class is a concrete implementation of the MAFGenericBO interface.
- GenericBOList 814: This class is a concrete implementation of the MAFGenericBOList interface.

The interface of the MAFGenericBOManager 802 can be split into the categories select, modify business objects and life-cycle methods. The term BOType is used in the interface and is used to identify the business object type. In MBO the BOType is mapped to an entity of the data model and in OData the BOType is mapped to a collection defined in the service document.

The data component interface defines four different ways to select a business object or a list of business objects. These include 1. Single business object: Fetch a single business object of given type and unique id. The framework may rely on the id provided by the MAFGenericBO interface.
2. Business object collection: Fetch all business object instances of a given type. No filter criteria need be defined by this method. In cases where filters are required, a business query could be used.
3. Business object relation: Fetches the named relation for the given business object. In MBO the relation is defined in the data model (e.g. SalesOrder to SalesOrderItems). For OData the relation is represented by the element link and the title attribute.
4. Business object query: A business query is used to select a set of business objects with match the defined criteria(s). The functionality of the query depends on the data source and the framework need not analyze or process the defined criteria. Based on the capability of the data source, a query can result in compound objects (the MBO ObjectAPI supports this). The concept of the MAFGenericBO allows for the handling of compound objects by forwarding attributes UI elements. The data source can handle modifications on compound objects.

In an example embodiment, the onRead( ) method defined in MAFGenericBOListener may be called for each business object in the result list. The intent of this callback is to give the application the possibility to add or modify business object attributes independent of the concrete usage The MAFGenericBOListener need not be used before the selection has been performed by the data source. The application can use the data source in case a query or relation needs to be modified.

The data component interface defines four methods to modify business objects:

1. Create: this method is used to create a new business object instance. This request is forwarded to the data source. The callback onCreate( ) defined in the MAFGenericBOListener can be called before the request is dispatched to the data source. In cases where the callback returns a MAFGenericBO instance, the framework need not dispatch the request to the data source. Additionally the callback afterCreate( ) can be called after the data source has returned a new business object.
2. Insert: this method can insert a newly created business object by forwarding the request to the data source. The framework is based on the assumption that newly created objects are not already persisted. The callback onInsert( ) defined in the MAFGenericBOListener can be called before the request is dispatched to the data source.
3. Update: this method can update a business object by forwarding the request to the data source. The callback onUpdate( ) defined in the MAFGenericBOListener can be called before the request is dispatched to the data source.
4. Delete: this method can delete a business object by forwarding this request to the data source. The callback onDelete( ) defined in the MAFGenericBOListener can be called before the request is dispatched to the data source.

For lifecycle management, the method to set the MAFGenericBOListener can be used by an application to register a specific listener implementation. It is possible to de-register a listener by providing the special parameter value null or nil. The method to register the data source adapter may instantiate an adapter independent of the framework initialization.

For asynchronous access, in general the response time of data select method will exceed the time constraints defined for the UI response. The MAFGenericBOManager interface may define for all access methods an asynchronous variant with an additional parameter of type MAFRequestListener. The data source adapter may leverage data source capabilities or spawn its own threads. The implementation of the data component may ensure that in all cases the registered MAFGenericBOListener is called. Further, all methods defined in the MAFGenericBOManager interface may be thread-safe.

A business object collection is a list of objects of the specified type. The collection name may be defined in the binding element of the configuration file and the framework can forward the name to the data source without any processing.

A configuration binding example for OData data source is provided as follows:

```
<binding bindingId="SalesOrders"
type="collection">
<parameter
parameterID="cname">SalesOrder</parameter>
</binding>
```

A business relation describes a dependency of a source business object to a single business object or a list of business objects. A BusinessRelation can express both: a 'forward' or 'backward' directed relation. Examples for business relations include SalesOrder and SalesOrderItems or Account and Contacts.

A BusinessRelation object may contain two attributes:
1. Reference business object: the (generic) business object that acts as the source of the relation.
2. Relation name: the name of the relation. The framework may handle the relation as-is and forward it to the data source. The relation name is a binding parameter in the configuration file.

A configuration binding example for OData data source may be as follows:

```
<binding bindingId="SalesOrderItem"
type="relation">
<parameter
parameterID="entity">$current</parameter>
<parameter
parameterID="relation">items</parameter>
<binding>
```

The framework may resolve the parameter before calling the MAFGenericBOManager and the DataSourceAdapter may use the BusinessRelation attributes literally.

The target business object type need not defined by business relation and the framework need not make any assumption on return type.

A business query may be used to describe a query for a set of records based on a configuration or application definition. The configuration may, in some example embodiments, only support static queries (resolvable without required logic) for the dynamic queries custom tile controller.

The framework need not make any assumptions on the data model and may use the configured values as defined, forwarding them to the data source (via DataSourceAdapter). During the creation of a business query object, the framework may perform a value resolution. The defined query values may contain structure of a business query similar to a business object. However, a business query is used only to perform queries. Each query returns a record set in the form of a business collection. If the return type is a business collection, the data component may create objects for the business collection, fill them and return the objects.

A configuration binding example for OData data source may be as follows:

```
<binding bindingId="Sample" type="query">
<parameter
parameterID="cname">Customer</parameter>
<parameter
parameterID="filter">substring(zipcode,1,2) eq
'69'</parameter>
<parameter parameterID="top">10</parameter>
</binding>
```

The framework may resolve the parameter before calling the MAFGenericBOManager and the DataSourceAdapter may use the BusinessRelation attributes literally.

The target business object type need not be defined by business relation and the framework need not make any assumption on return type.

The discussed interactions below cover the basic operations provided by the component. These activities include 1) creating a new local, plain business object of a given type and 2) inserting the local object. A local new object may only exist in memory as a GenericBO and may have no relation to the persistence.

For a read operation, the GenericBOManager may dispatch the request to the DataSourceAdapter, which in turn may map the request to the data source. The DataSourceAdapter may, after receiving the result set from the data source, create new GenericBO objects. In cases where a listener is registered by the application, the onRead( ) callback method may be called.

The create method may instantiate a new blank GenericBO. The application can set some initial values by listening to the corresponding notify methods. The created object only exists in memory and is not associated with the used data access layer (MBO or OData). The GenericBO can be used in the UI Component to feed an edit-tile.

The update method may expect a GenericBO as parameter. The ODataManager may look up the business object, merge the content and generate the URL used for the POST request. The merge of existing business object with the GenericBO ensures that the payload sent to server is valid and that subsequent request will for the GenericBO contain the latest values.

The API provided by OData data source libraries (aka ODataManager) should follow the OData specification and recommendations. As mentioned above the framework need not make any assumption on the data model, and any application specific deviation can be handled by the application development team. In order to support this, the ODataManager may provide additional APIs for listeners/callbacks etc.

The API defined here is merely an example and reflects a requirement of the extensibility framework and specifically the DataSourceAdapter.

The extensibility framework need not require either the service document or the meta-data document. The required collection or relation names can be defined in the configuration.

The extensibility framework need not generate the URI used to access OData resources; the URI required for some interface methods can be retrieved from previously selected SDMODataEntries.

The mapping of a Business Object Collection can be performed with the single parameter getCollection( ) method, Business Relations with the getRelation( ) methods and Business Queries with the two parameter getCollection( ) method. The second parameter of the getCollection( ) method is described below.

The interface may provide access to subset of the URI parameter defined by the OData specification. The framework need not generate these values and use the captured values of the configuration.

The UI and Logic Components are different components with well decoupled roles and responsibilities. However as their communication plays a significant role in the whole process flow, it makes sense to describe their contact and interaction in one section.

The UI Component's purpose is to build up and display the User Interface for the End User based on the UI Configuration. It may be responsible for translating Tile definitions to native UI description. It may also act like a mediator between native UI elements of the device and the Logic Component and finally the Data Component. It may have direct interaction with the Configuration Component and the Reusable UI Control Library.

The Logic Component's main goal is to react on User Actions coming from the UI components. It has the responsibility to communicate with the Data Layer and aggregate the returned Data. In some cases it also has the responsibility to notify the UI Component if the Data Set is changed and the UI needs to be refreshed.

Figure 9:
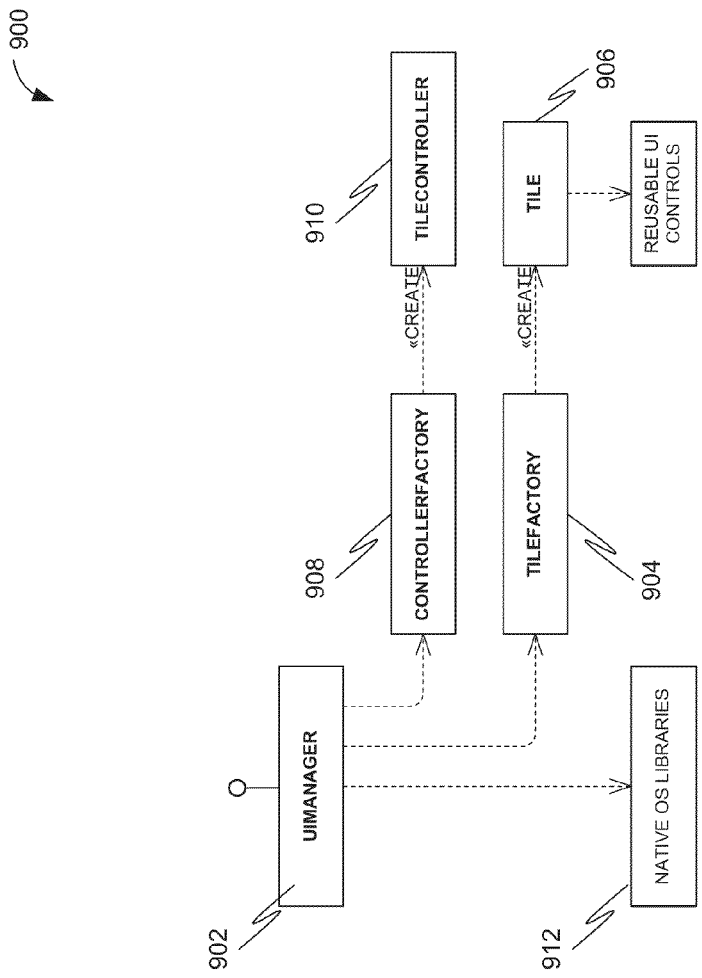

FIG. 9 is a block diagram illustrating a system 900, in accordance with an example embodiment, including main parts of the UI and Logic Components and the other Components they interact with.

UIManager 902 provides a public interface for displaying a new screen for a given TileID. It has the responsibility for communicating with the device's native libraries to accomplish this. In an example embodiment, the TileID that is passed for the DisplayScreen and DisplayDialog method refers to the Tile that is used as a root Tile of the Screen/Dialog. Tile configuration holds information on what other screen element (Navigation Panel Element, Header Text, etc.) should be used if the given Tile is the root Tile of the Screen.

TileFactory 904 may provide the appropriate Tile 906 for the given TileID via the TileFactory's main Creator class. Application developers have the opportunity to register their own custom Creator class to override the standard Tile creation behavior that is based on the UI related Configuration.

ControllerFactory 908 may provide the corresponding Tile Controller 910 for the given TileID via the ControllerFactory's main Creator class. Application developers have the opportunity to register their own custom Creator class to override the standard Controller Creation behavior. Otherwise the Default Tile Controller can be used, which handles several predefined Actions (like navigation to new screen, opening the device's phone or messaging application, etc.) and able to retrieve the appropriate Data from the Data Component Tiles may hold the layout information that is required for native OS libraries 912 to display the appropriate UI elements. A Tile can contain other Tiles and/or simple or complex UI elements. A Tile could contain other screen related information like required elements in the Navigation Panel and/or Text to use in the Header Area of the screen if the Tile is used as a main Tile of the Screen. In an example embodiment, by default Tile Layout information may be based on the corresponding UI Configuration.

TileController 910 may contain the logic as to how to handle the different Actions, mainly triggered by the End User. It may also have the responsibility to retrieve and aggregate the data coming from the Data Component. A default Tile Controller may be able to handle several predefined Actions and may be able to retrieve and aggregate Data as it's described in the Configuration.

Figure 10:
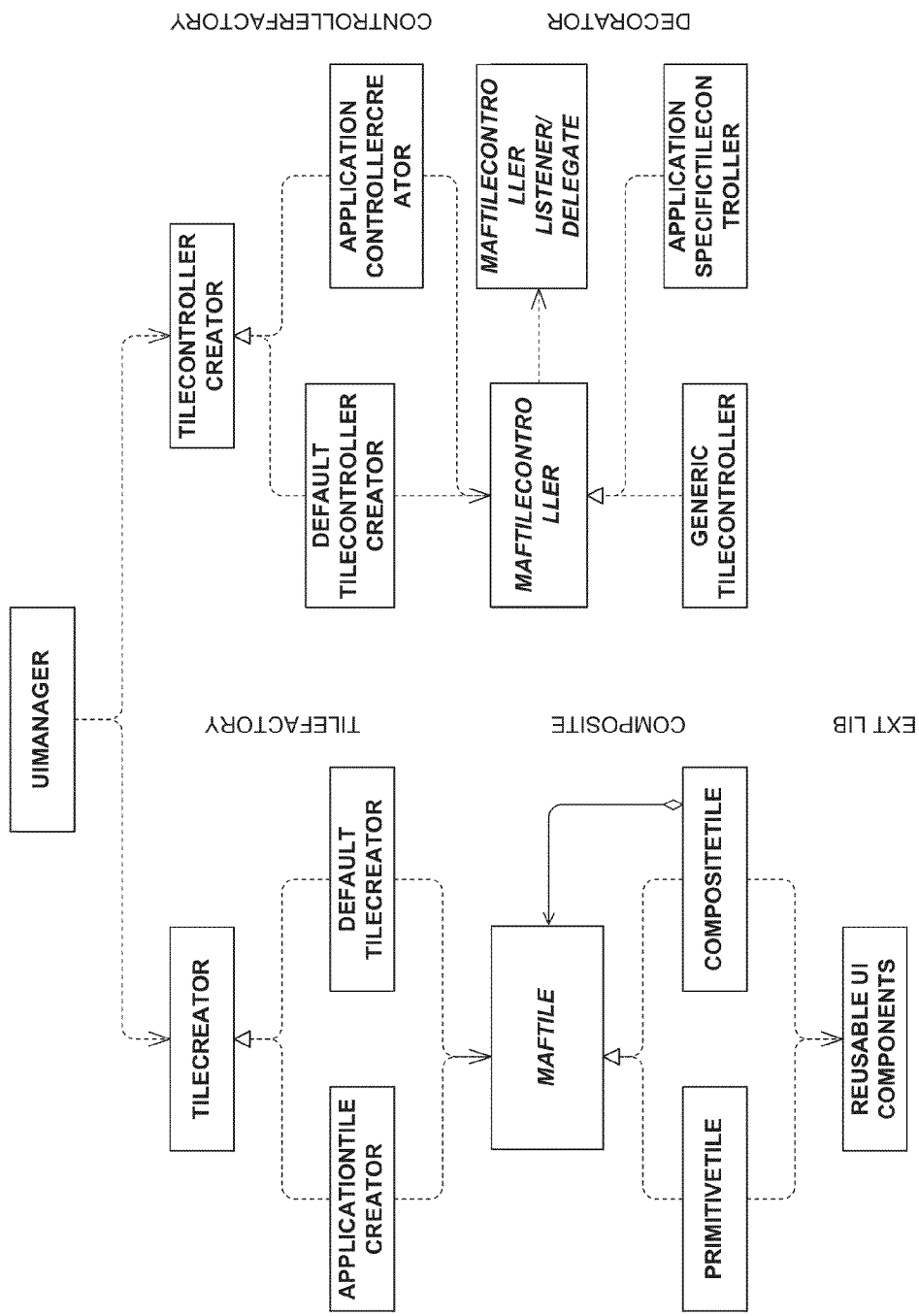
FIG. 10 is a class diagram, in accordance with an example embodiment, illustrating the main parts of UI and Logic Components on Class level emphasizing the extension point where the application developers can step into the interaction.

FIG. 10 is a class diagram, in accordance with an example embodiment, illustrating the main parts of UI and Logic Components on Class level emphasizing the extension point where the application developers can step into the interaction.

The configuration that describes UI Layout, Data Binding and Action are provided from the Configuration Component. So the Configuration Component may be responsible for the lifecycle for this Configuration.

Application Developers can extend the set of UI controls, Tiles, Actions that are usable in the UI and Logic Configuration. They also may have the option to override the default behavior of such elements via one of the legal extension points of MAF Extensibility.

From an interaction point of view, the UI Component may have the responsibility to communicate with the Configuration Component to retrieve the appropriate UI Configuration. It may need to catch Actions triggered by the End User and transmit the appropriate information to the Logic Component.

The Logic Component may process the Actions that come from the UI Component, originally triggered by the End User. To accomplish this goal, the Logic Component can communicate with the Configuration Component to read the appropriate configuration. It can communicate with the Data Component to request Data Read and/or Write if it is needed, and it can communicate with the UI Component to request UI related changes, such as displaying a new screen or refresh the currently displayed data.

Figure 11:
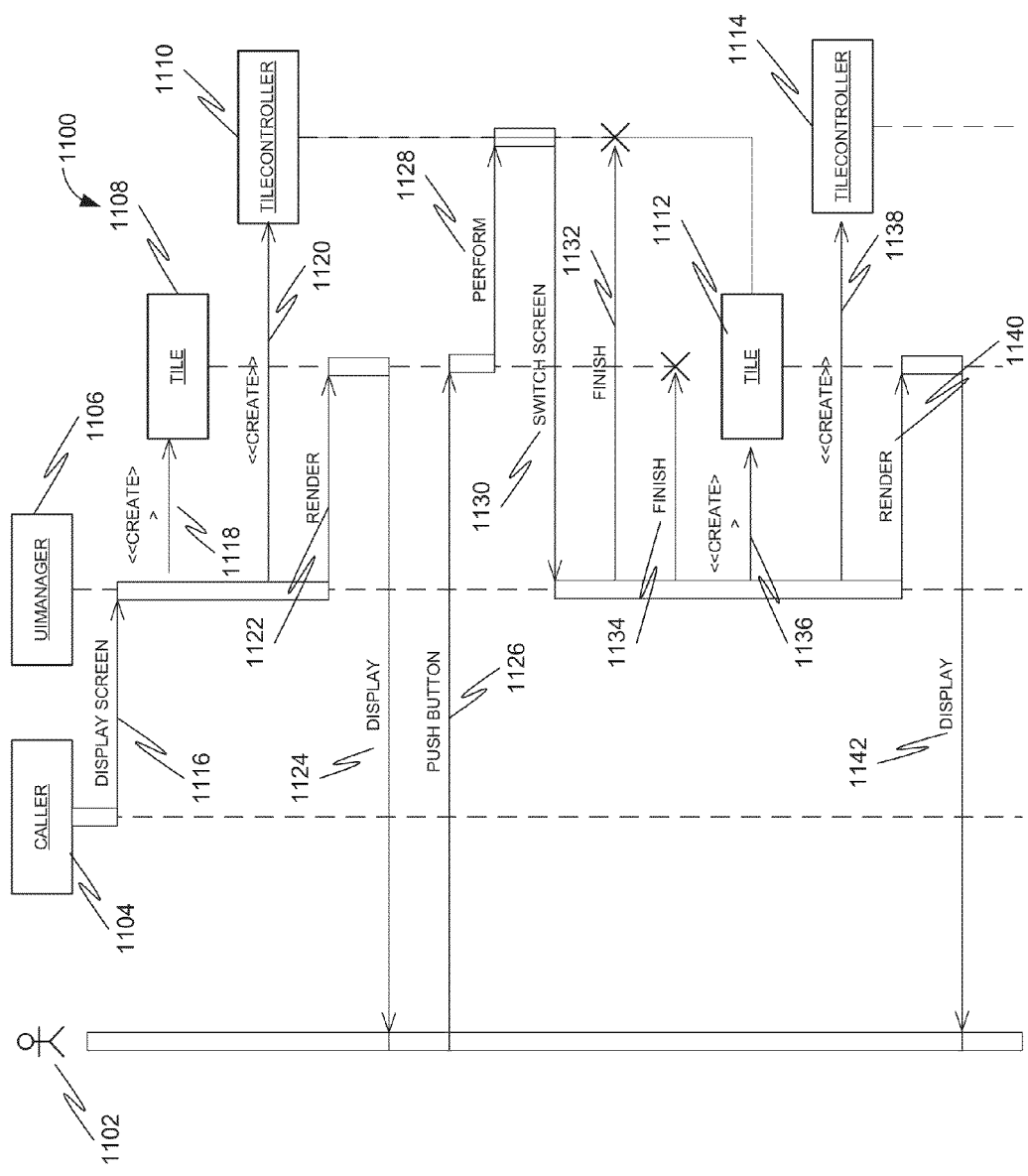
FIG. 11 is a sequence diagram illustrating a method, in accordance with an example embodiment, of interacting between a UI component and a logic component.

FIG. 11 is a sequence diagram illustrating a method 1100, in accordance with an example embodiment, of interacting between a UI component and a logic component. Here, the execution of a navigation action is displayed. Components in this sequence diagram include end-user 1102, caller 1104, UI manager 1106, tile 1108, tile controller 1110, tile 1112, and tile controller 1114. At operation 1116, the caller 1104 may execute a display screen command for the UI manager 1106. At operation 1118, the UI manager 1106 may create the tile 1108. At operation 1120, the UI manager 1106 may create the tile controller 1110. At operation 1122, the UI manager 1106 may render the tile 1108, which may be displayed to the end-user 1102 at operation 1124.

At operation 1126, the end-user 1102 may push a button of the tile 1108. At operation 1128, the tile 1108 may perform the corresponding action via the tile controller 1110. At operation 1130, the tile controller 1110 may then update the screen in the UI manager 1106. At operation 1132, the UI manager 1106 may finish the tile 1108, and at operation 1134 the UI manager 1106 may finish the tile controller 1110.

At operation 1136, the UI manager 1106 may create tile 1112. At operation 1138, the UI manager 1106 may create tile controller 1114. At operation 1140, the UI manager 1106 may render the tile 1112. At operation 1142, the tile 1112 may be displayed to the end-user 1102.

Figure 12:
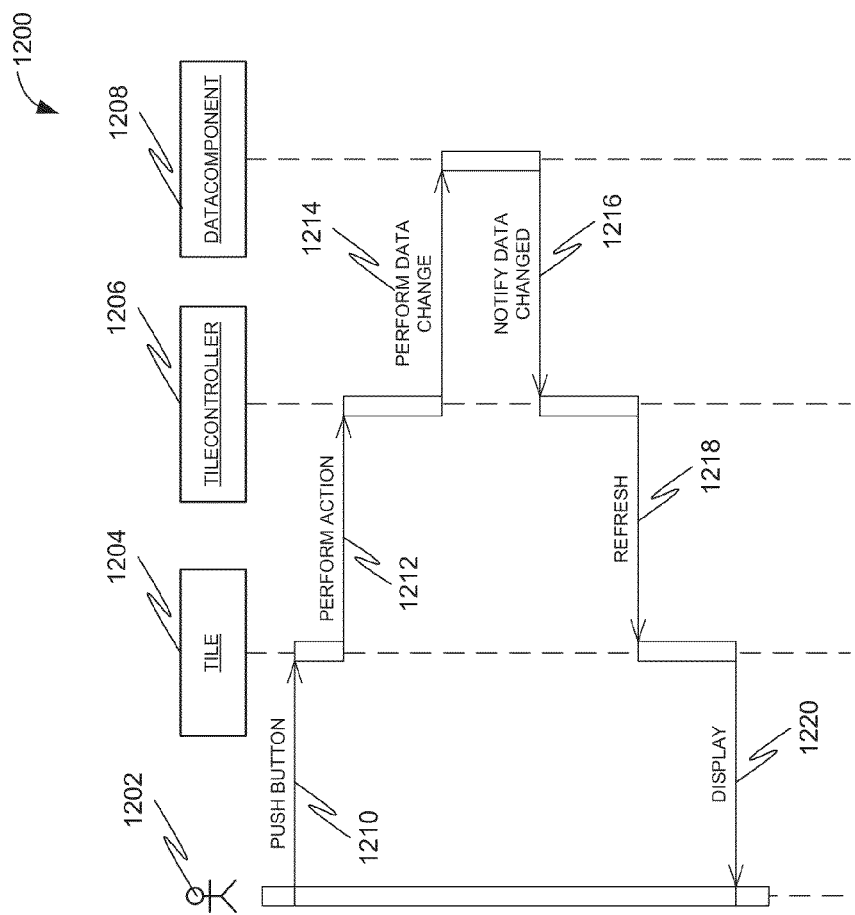
FIG. 12 is a sequence diagram illustrating a method, in accordance with another example embodiment, of interacting between a UI component and a logic component.

FIG. 12 is a sequence diagram illustrating a method 1200, in accordance with another example embodiment, of interacting between a UI component and a logic component. Here, the execution of a data change action is displayed. Components in this sequence diagram include end-user 1202, tile 1204, tile controller 1206, and data component 1208. At operation 1210, the end-user 1202 may press a button of the tile 1204. At operation 1212, the tile may perform a corresponding action via the tile controller 1206. At operation 1214, the tile controller 1206 may perform the data change via the data component 1208. At operation 1216, the data component 1208 may notify the tile controller 1206 of the data change. At operation 1218, the tile controller 1206 may refresh the tile 1204, which at operation 1220 may be displayed to the end-user 1202.

In an example embodiment, each Tile's controller (except the main controller of the screen) has reference to the parent Tile's controller, so it has the option to delegate any action execution to its parent controller. Furthermore each Composite Tile (a Tile that contains further Tiles) has reference to all child Tiles. So in case of notification about Data Change, notification can be forwarded to each child Tile.

Figure 13:
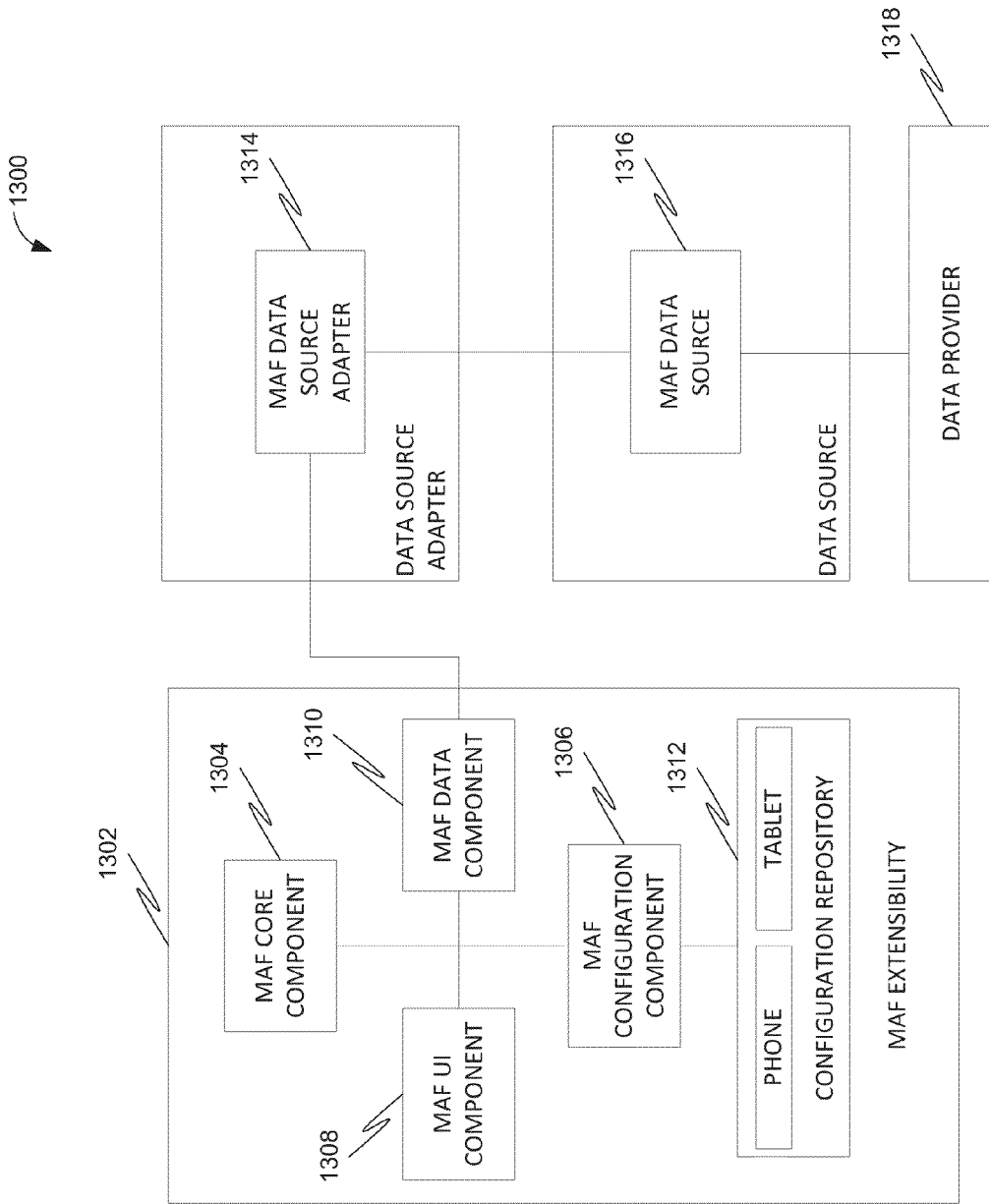
FIG. 13 is a block diagram illustrating a system, in accordance with another example embodiment, providing a mobile application framework extensibility framework.

FIG. 13 is a block diagram illustrating a system 1300, in accordance with another example embodiment, providing a mobile application framework extensibility framework. Within a mobile application framework (MAF) extensibility framework 1302 lies a MAF core component 1304, which exposes APIs that initialize the framework and accesses additional functionality provided by internal components. Also included in the MAF extensibility framework 1302 is a MAF configuration component 1306, which reads and parses all the metadata required by the application, such as UI definitions, data bindings, UI elements and controls, events, and actions (built-in and custom) from a configuration repository 1312. The MAF Configuration component 1306 may also transform metadata to native ObjC constructs using wrapper classes, dedicated parsers, and validators A MAF UI component 1308 may encapsulate the metadata-drive view, controller, and data binding generation functionalities. A MAF data component 1310 may interface with a MAF data source adapter 1314. The MAF data source adapter 1314 may provide unified access to business objects, independent of the used data model. The MAF data source adapter 1314 may also convert between generic business objects and specific model objects. The data source 1316 itself may be a wrapper on top of a specific data model. The data source 1316 may be fed data from a data provider 1318.

An example will hereby be provided for the iOS operating system. This is merely intended as an example and is not intended to be limiting.

Figure 14:
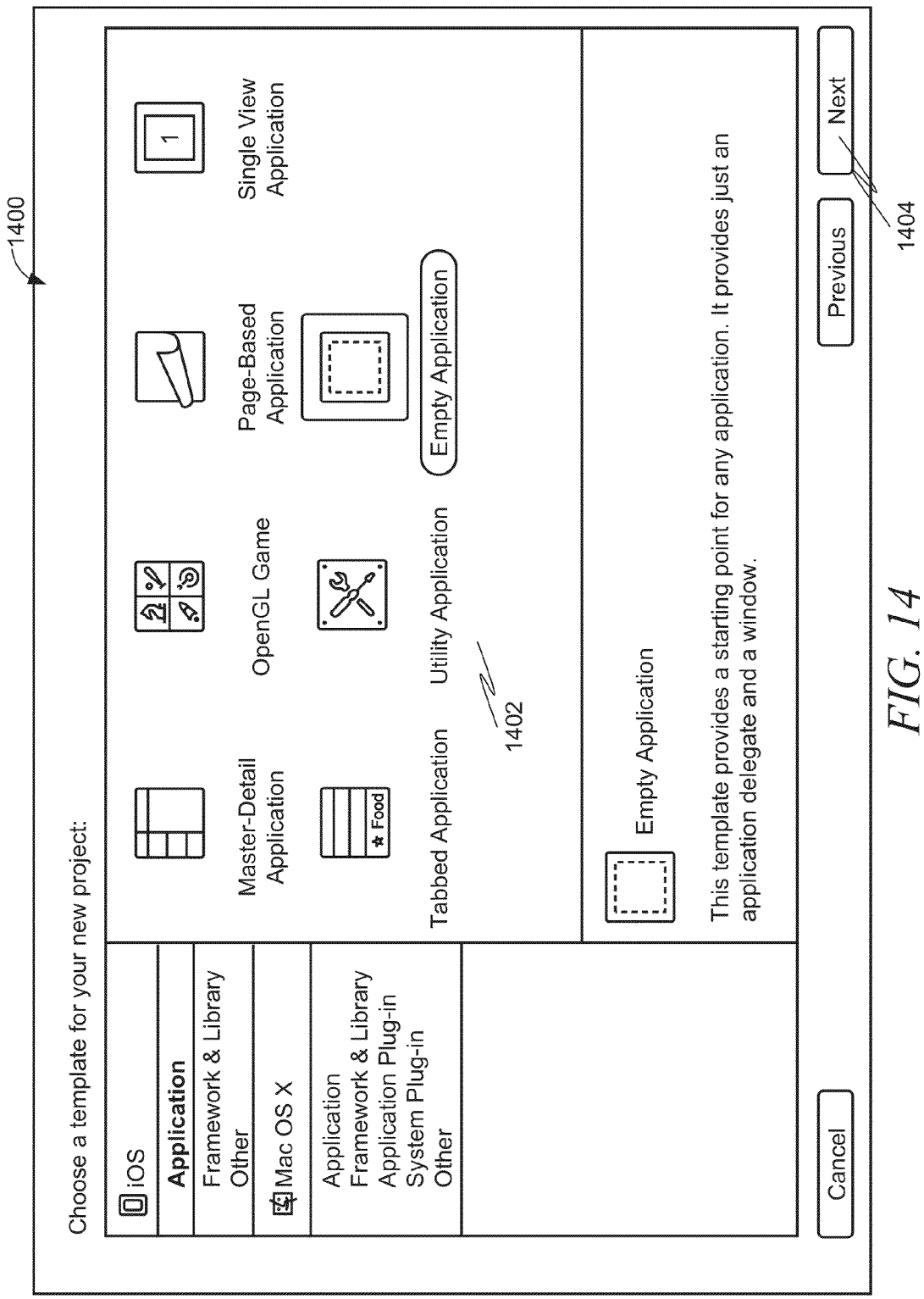
FIG. 14 is a screen capture illustrating a method, in accordance with an example embodiment, of creating a new project.

FIG. 14 is a screen capture illustrating a method 1400, in accordance with an example embodiment, of creating a new project. Here, a developer may have launched the framework code and selected to begin a new project. The developer may then select an appropriate template from the template area 1402 of the display, and select next 1404.

Figure 15:
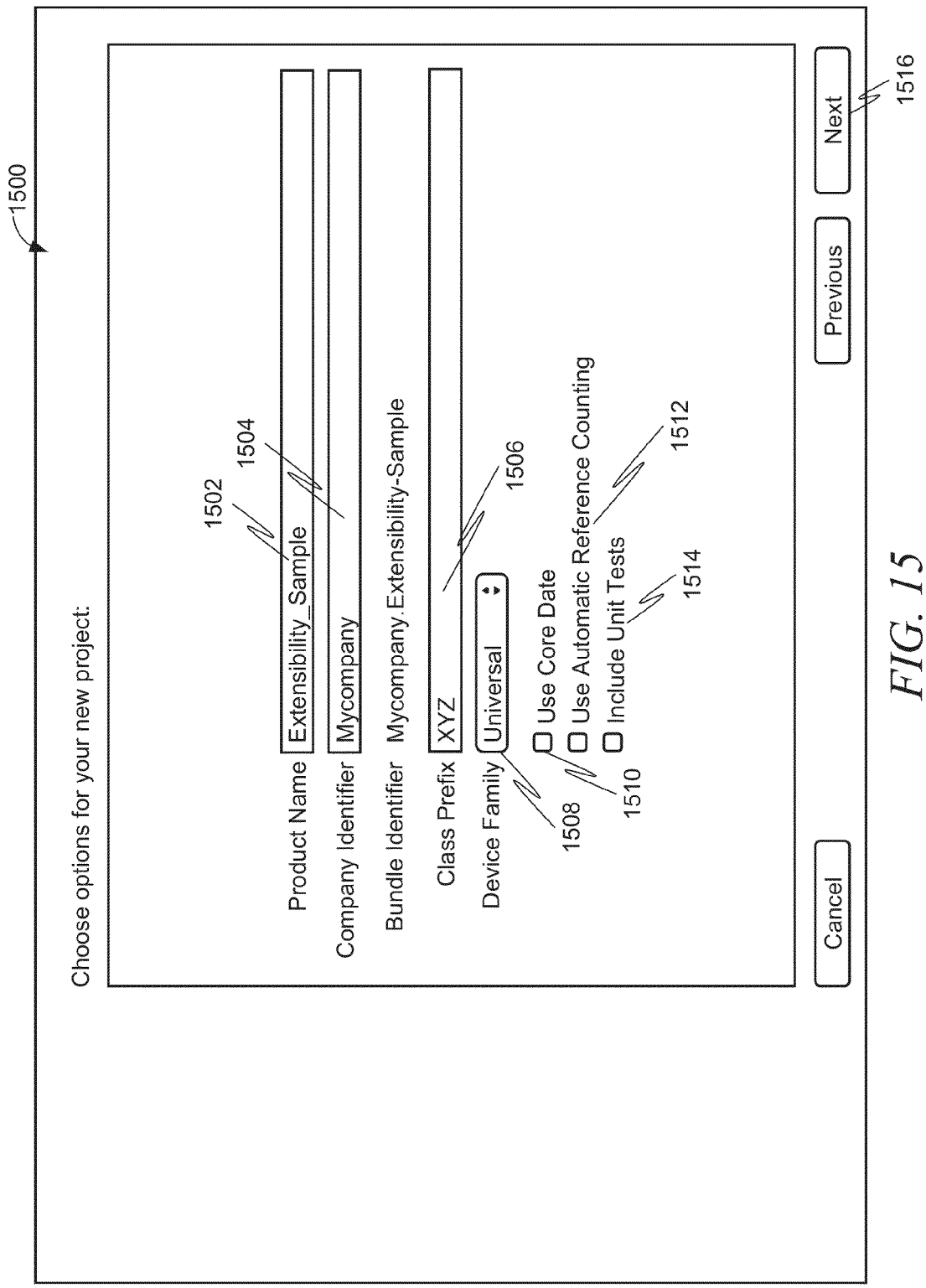
FIG. 15 is a screen capture illustrating a method, in accordance with an example embodiment, of entering product information.

FIG. 15 is a screen capture illustrating a method 1500, in accordance with an example embodiment, of entering product information. Here, once next 1404 was selected in FIG. 14, the developer has the opportunity to ender a product name 1502 and a company identifier 1504. Additionally, the appropriate settings for class prefix 1506 and device family 1508 may be selected, as well as specifying whether to use core data 1510 or automatic reference counting 1512, or to include test units 1514. Once the next button 1516 is selected, the developer can then specify a folder in which to save the new application and create the new application.

Following this, the developer may add the required dependencies. In an example embodiment, the developer may:
1. Copy the library and the included .h files to a dedicated folder (for example, MAFExtLib).
2. In Xcode, open the client app. Right-click Frameworks and select Add Files to "<project name>".
3. Browse to the directory containing the Extensibility library, then select Copy items into destination group's folder. This copies the .a file and the headers under the project's directory structure.
4. Click Add.

Figure 16:
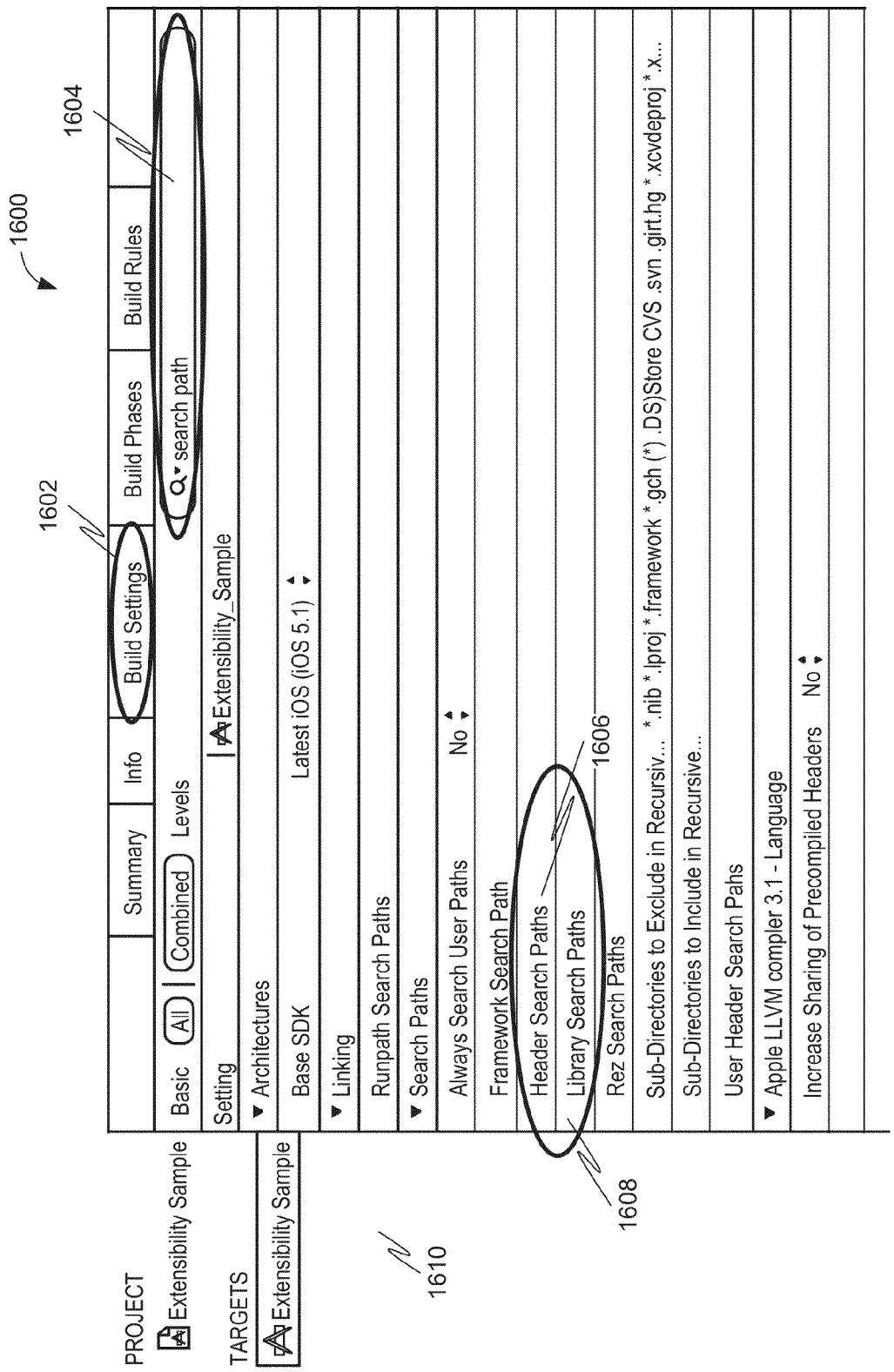
FIG. 16 is a screen capture illustrating a method, in accordance with an example embodiment, of building settings.

FIG. 16 is a screen capture illustrating a method 1600, in accordance with an example embodiment, of building settings. The developer may select build settings 1602 and search for a search path in the search bar 1604. Then the developer may select header search paths 1606 and insert "${PROJECT_DIR}/target/headers/${BUILD_STYLE}-${PLATFORM_NAME}/**"

Then the developer may select Library Search Paths 1608 and insert: "${PROJECT_DIR}/target/libs/${BUILD_STYLE}-${PLATFORM_NAME}/**"

Figure 17:
FIG. 17 is a screen capture illustrating a method, in accordance with an example embodiment, of setting required linker flags.

Then the developer may set the required linker flags. In the left pane 1610, the developer may select the project's root and then select build settings 1602. FIG. 17 is a screen capture illustrating a method 1700, in accordance with an example embodiment, of setting required linker flags. In the linking section 1702, the developer may locate other linker flags 1704 and add "-ObjC-all_load."

The default configuration is the layout and the style metadata that is delivered by the mobile platform together with the mobile application binary. Such configuration can be created using a Mobile Application Workbench or other XML tools.

To create the default style configuration, the developer may define all the identified MAF tiles, the layout of the controls within a MAF tile, and the data binding information.

Figure 18:
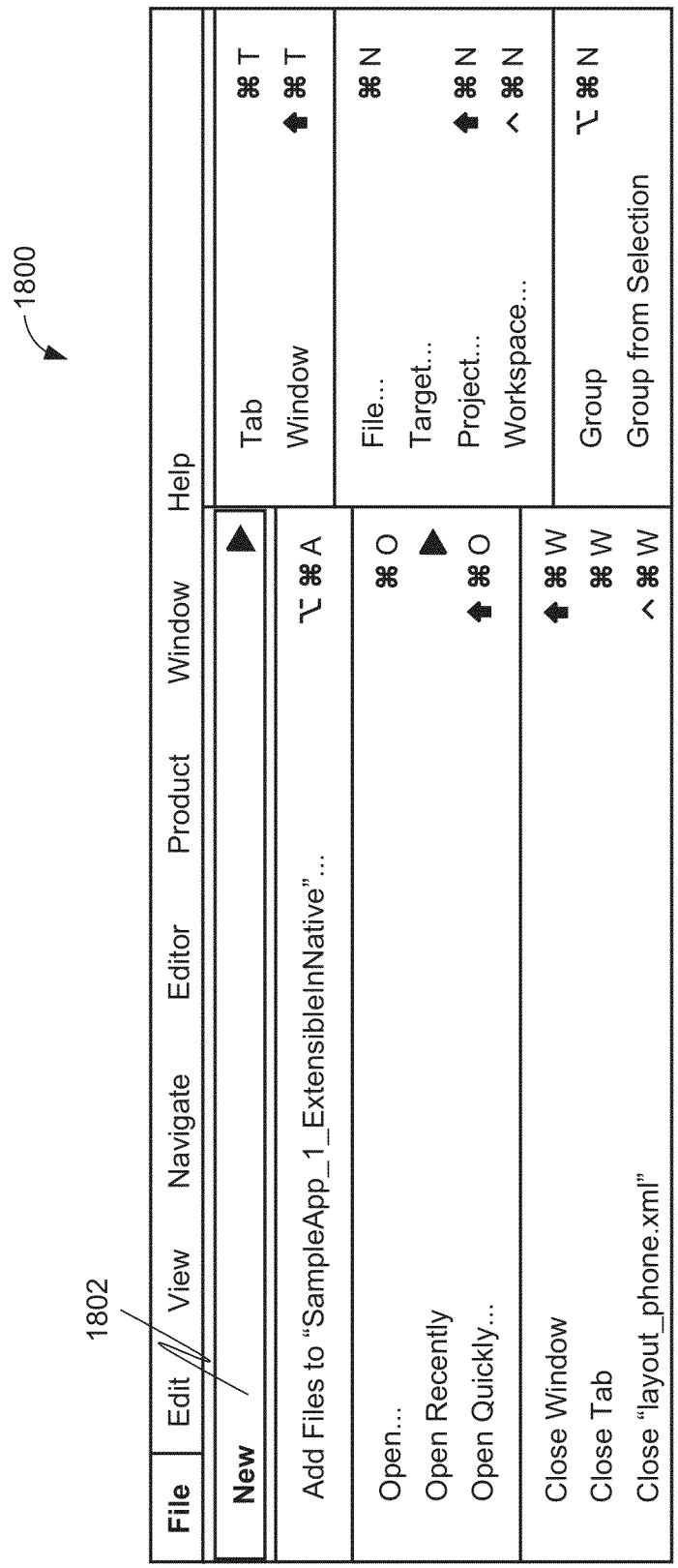
FIG. 18 is a screen capture illustrating a method, in accordance with an example embodiment, of creating a new project.

A series of screen captures will follow depicting setting up a new project. FIG. 18 is a screen capture illustrating a method 1800, in accordance with an example embodiment, of creating a new project. The developer may select "New" 1802 to create the project.

Figure 19:
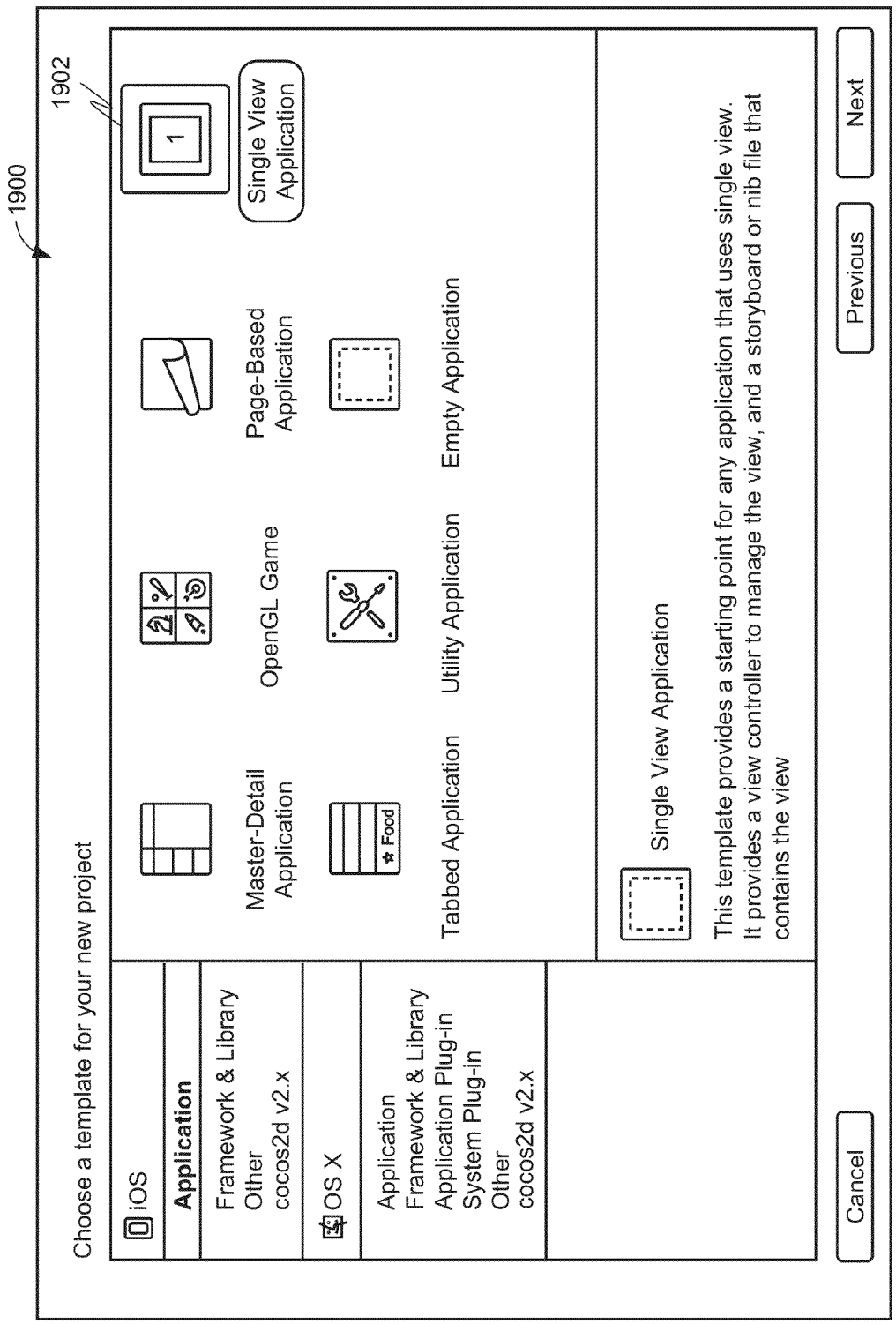
FIG. 19 is a screen capture illustrating a method, in accordance with an example embodiment, of selecting a template.

FIG. 19 is a screen capture illustrating a method 1900, in accordance with an example embodiment, of selecting a template. The developer may select a single view application 1902.

Figure 20:
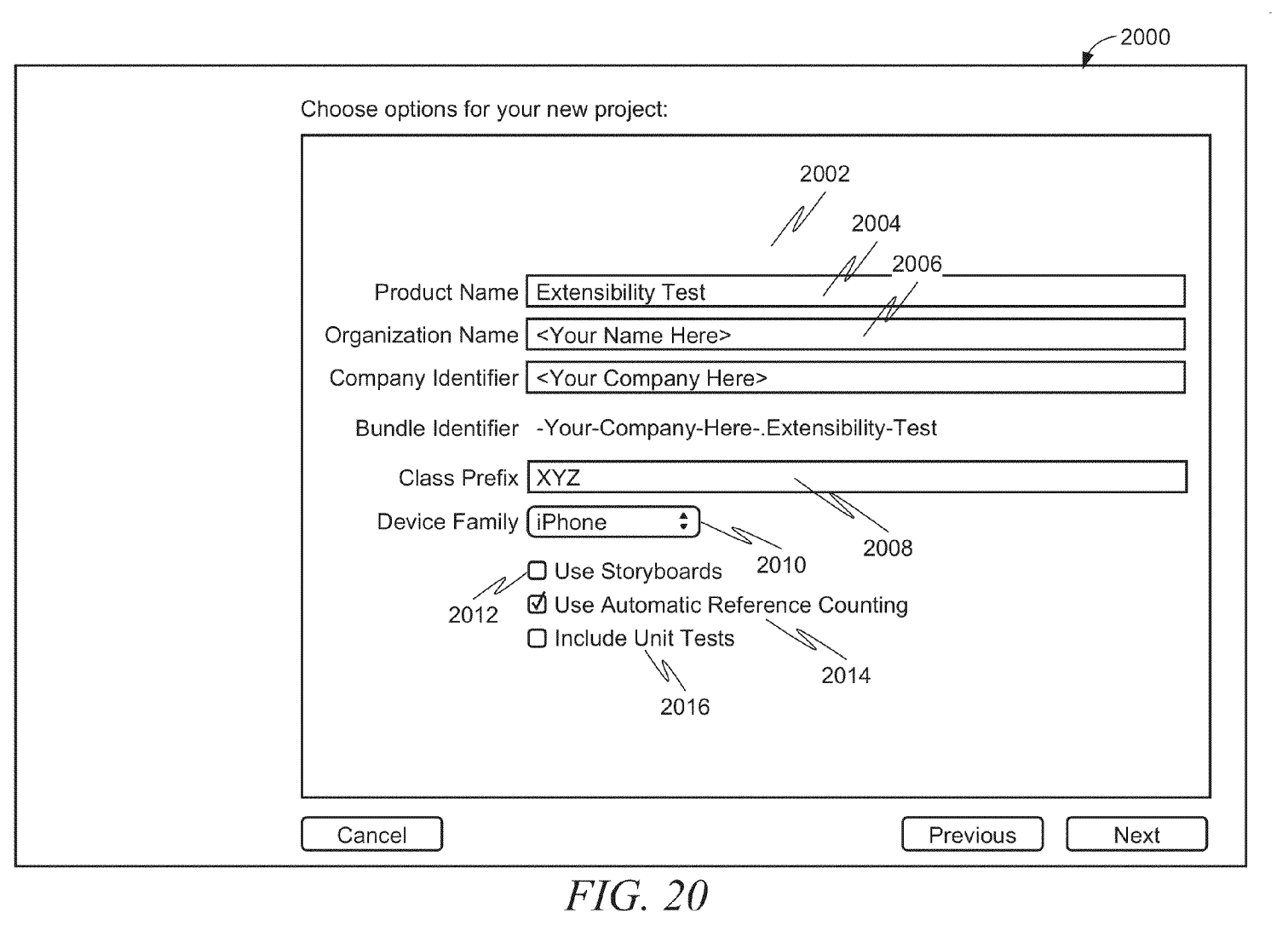

FIG. 20 is a screen capture illustrating a method 2000, in accordance with an example embodiment, of selecting options for the template. The developer may select a project name 2002, organization name 2004, company identifier 2006, class prefix 2008, devices 2010, whether to use storyboards 2012 or automatic reference counting 2014, and whether to include unit tests 2016. Using automatic reference counting is not mandatory, but if a developer uses manual reference counting he or she should be careful in retaining and releasing objects.

Figure 21:
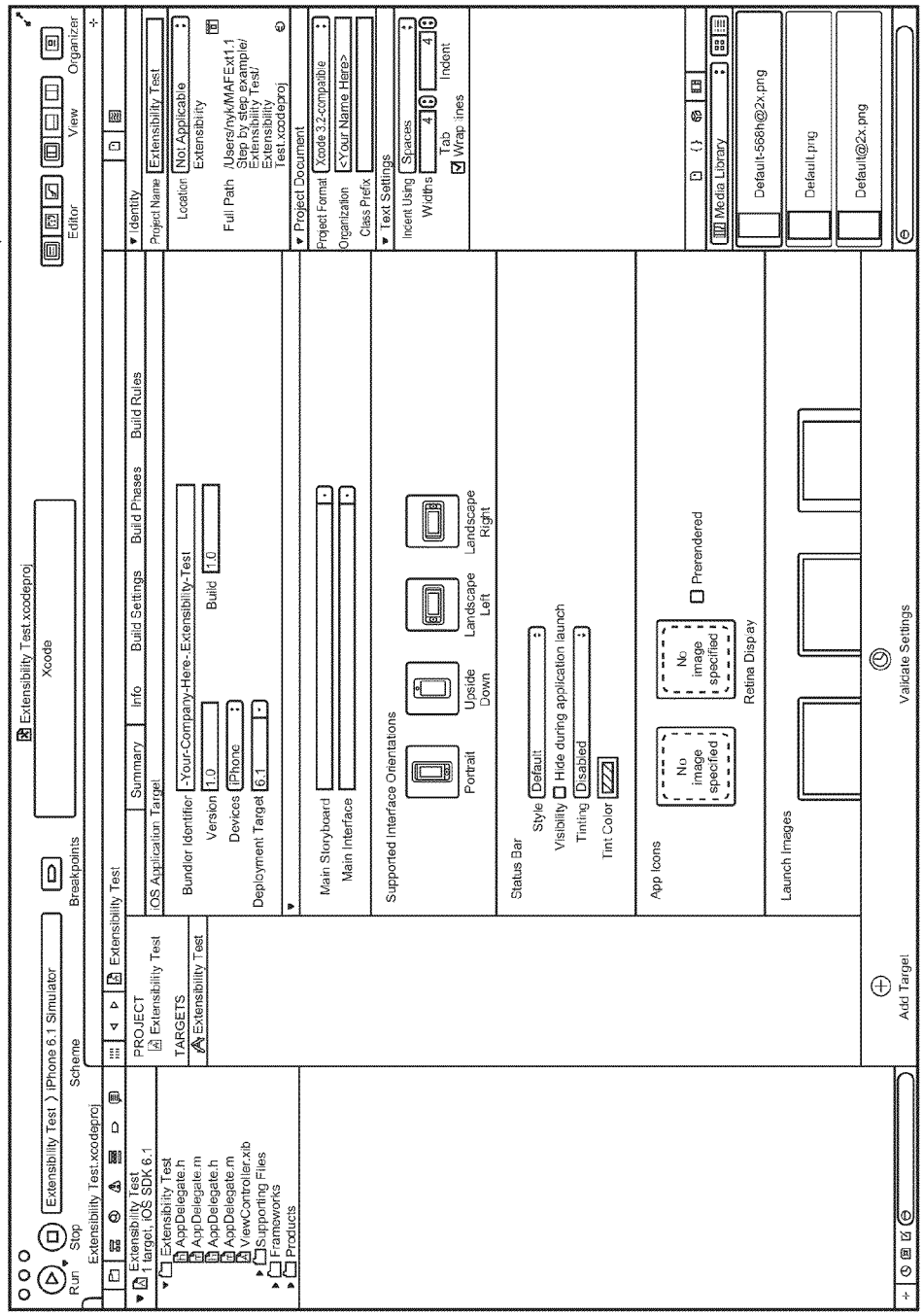
FIG. 21 is a screen capture illustrating a method, in accordance with an example embodiment, of displaying a created project. The developer sees this screen capture after the project has been created.
Figure 22:
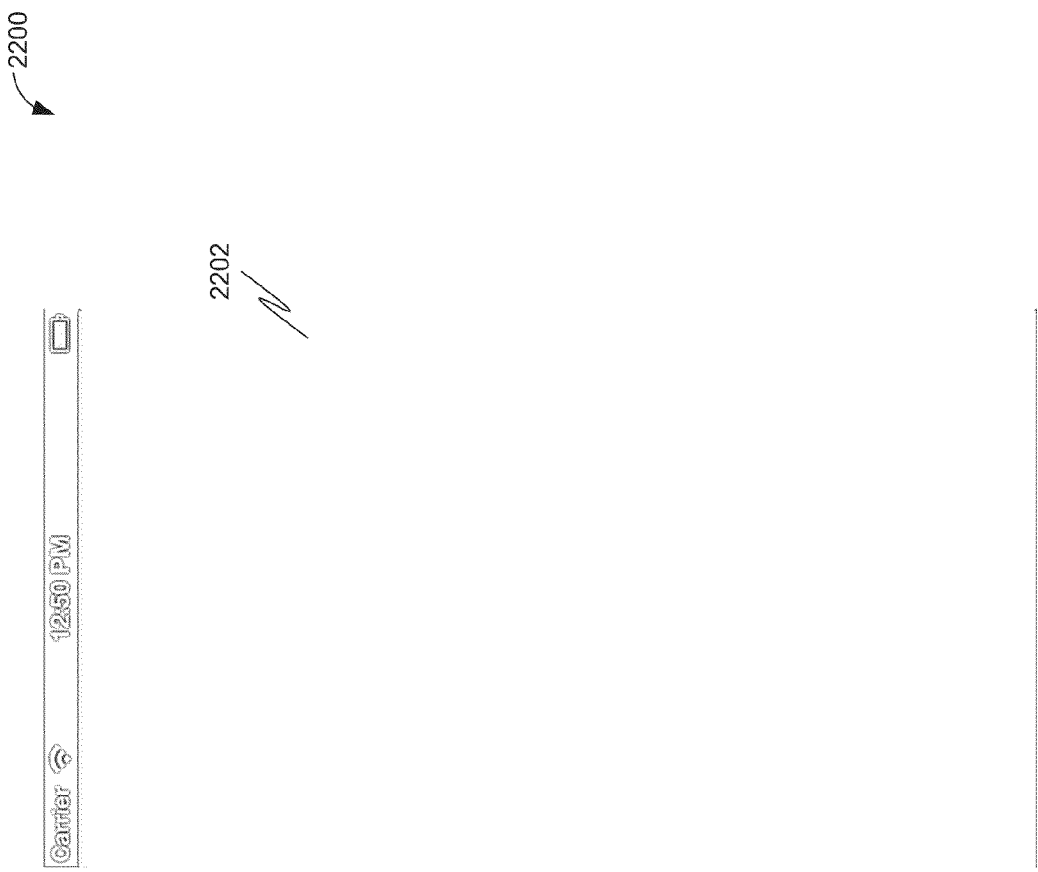
FIG. 22 is a screen capture illustrating a method, in accordance with an example embodiment, displaying a current run of the application.

FIG. 21 is a screen capture illustrating a method 2100, in accordance with an example embodiment, of displaying a created project. The developer sees this screen capture after the project has been created. This tool may automatically create some classes, such as an application delegate, a view controller, and a belonging xib. FIG. 22 is a screen capture illustrating a method 2200, in accordance with an example embodiment, displaying a current run of the application. As can be seen, the developer would only see a gray screen 2202 if the application was run at this time, reflecting that the auto-generated logic shows only an empty view, with no controller logic implemented yet.

The ViewController gets instantiated in the AppDelegate's didFinishLaunchingWithOptions: method; it can then be assigned to the app's window as root view controller, and finally the window can be made visible.

A developer can add MAF styling and extensibility features to the app, by adding the required static libraries and headers to the project. Then, the required bundles, libraries and public headers can be reorganized in a comprehensive, logical folder structure.

This approach can automatically sets the right path for the library whether the developer compiles for the device or simulator, and in release or debug mode. For example, if the application is built for the device in release mode, the path

```
"${PROJECT_DIR}/target/libs/${BUILD_STYLE}-
${PLATFORM_NAME}/"
becomes
<path_to_app_folder>/Extensibility Test/target/libs/Debug-iphoneos
```

Figure 23:
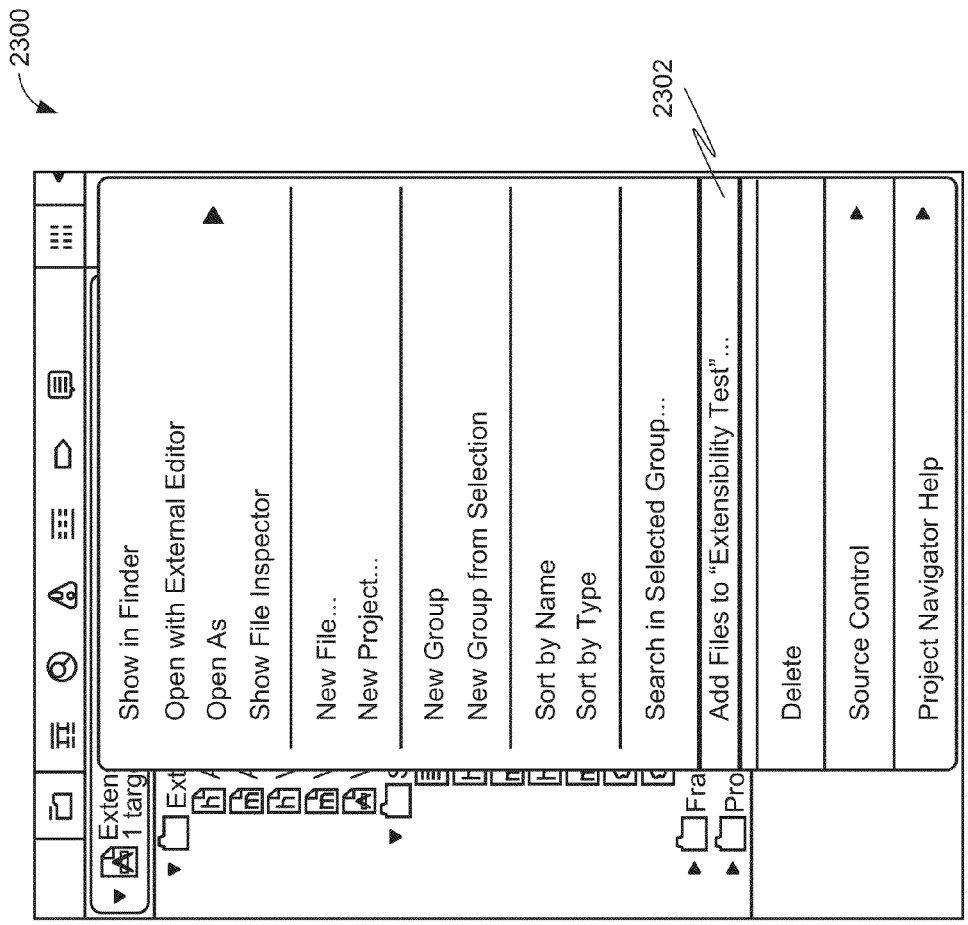
FIG. 23 is a screen capture illustrating a method, in accordance with an example embodiment, of adding resources.

FIG. 23 is a screen capture illustrating a method 2300, in accordance with an example embodiment, of adding resources. The developer may select add files 2302 and add MAFUIComponents bundle to the project using the add button.

Figure 24:
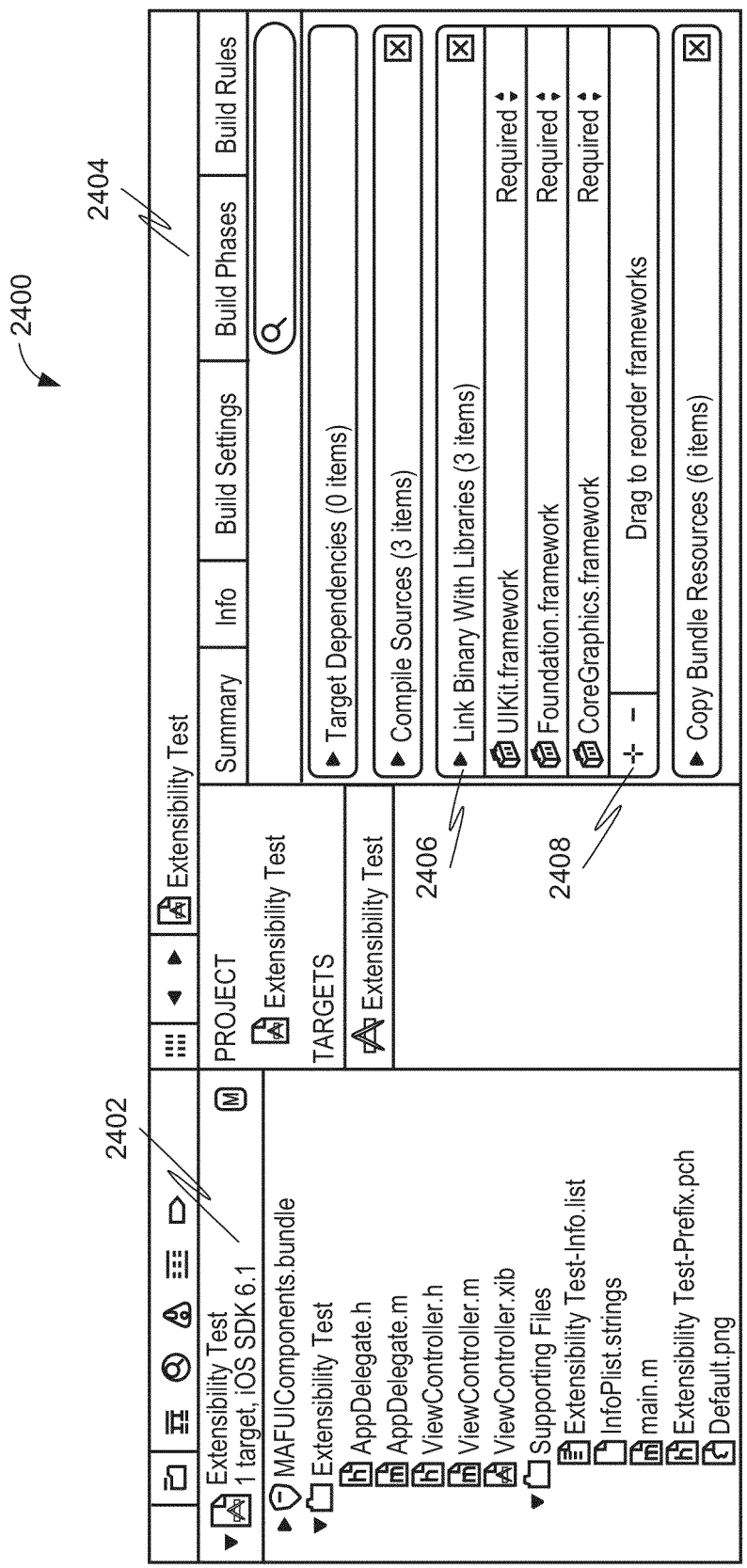
FIG. 24 is a screen capture illustrating a method, in accordance with an example embodiment, of adding binary dependencies.

FIG. 24 is a screen capture illustrating a method 2400, in accordance with an example embodiment, of adding binary dependencies. When the project is selected in a project navigator, the developer can select the app target in the middle pane 2402. Then the build phases tab 2404 can be selected, followed by the link binary with libraries drop-down 2406. The developer may then select the + sign 2408 to add the required libraries.

Figure 25:
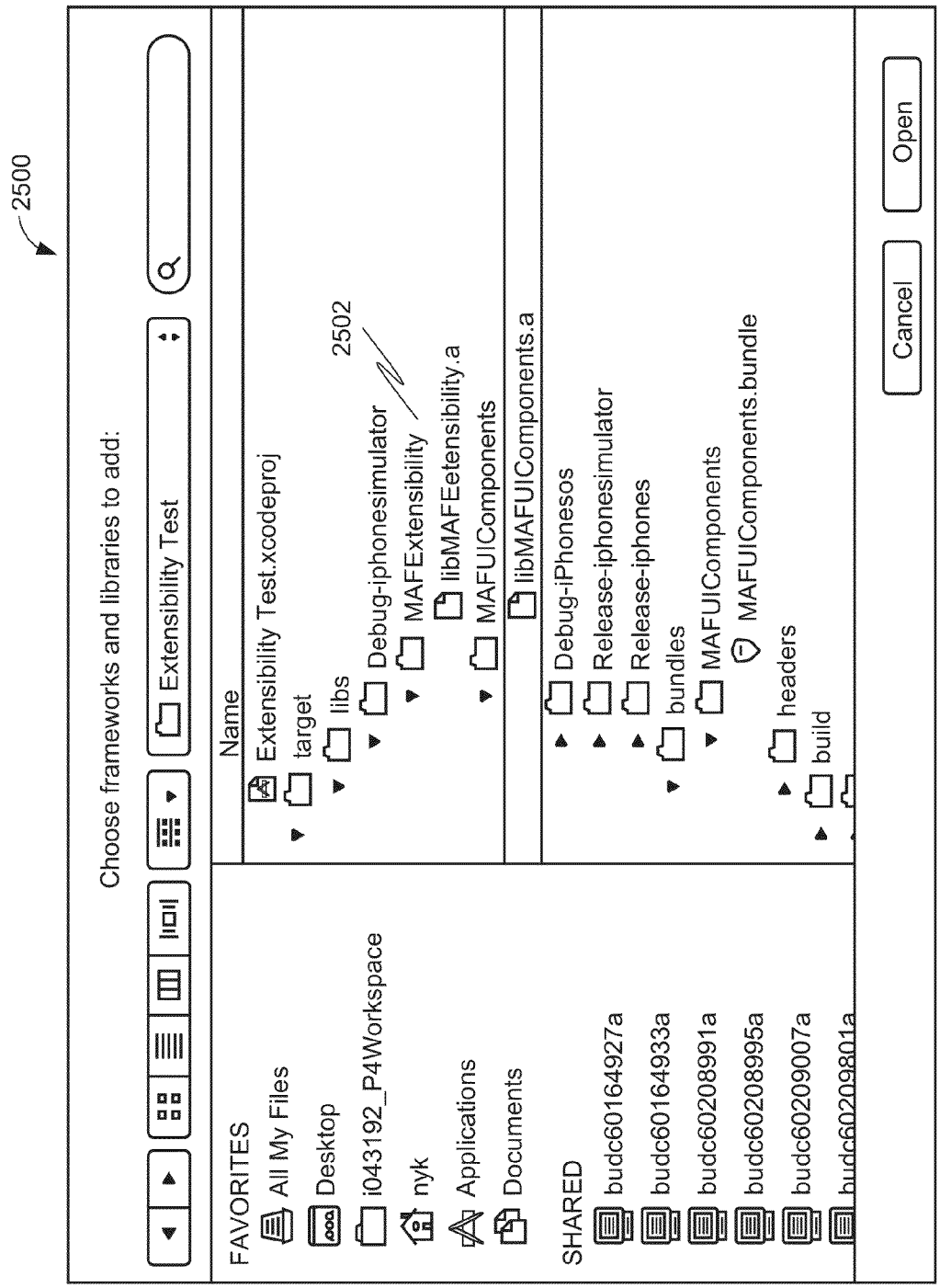
FIG. 25 is a screen capture illustrating a method, in accordance with an example embodiment, of adding required libraries.

FIG. 25 is a screen capture illustrating a method 2500, in accordance with an example embodiment, of adding required libraries. The developer may browse to a directory 2502 containing the libMAFUICommponents.a and libMAFExtensibility.a and add them one by one.

Additionally, the following libraries and their headers may be used, following the same pattern as for the previous two libs:
[MAF] libMAFFormatters
libMAFLogger.a
libMAFZipHelper.a
Add the following three frameworks/system libs, as well:
[iOS] QuartzCore.framework
[system] libstdc++.dylib
libz.dylib
Then the developer can select Build Settings, and make sure all settings are visible by clicking All (rather than Basic). The developer can then scroll down to Library Search Path and double-click the corresponding line.

The paths for the libraries that have been added then have been automatically added. However, these constant paths are only valid for the current platform and build type. To make this setting generic, it can be adapted by using the ${PROJECT_DIR}, ${BUILD_STYLE}, and ${PLATFORM_NAME} environment variables. The two paths inserted by the tool can be deleted, and the following line can be added:

```
"${PROJECT_DIR}/target/libs/${BUILD_STYLE}-
${PLATFORM_NAME}/**".
```

This will point to the parent libs directory in the project's directory, which holds the library files. The result is a library path configuration that has two lines.

Figure 26:
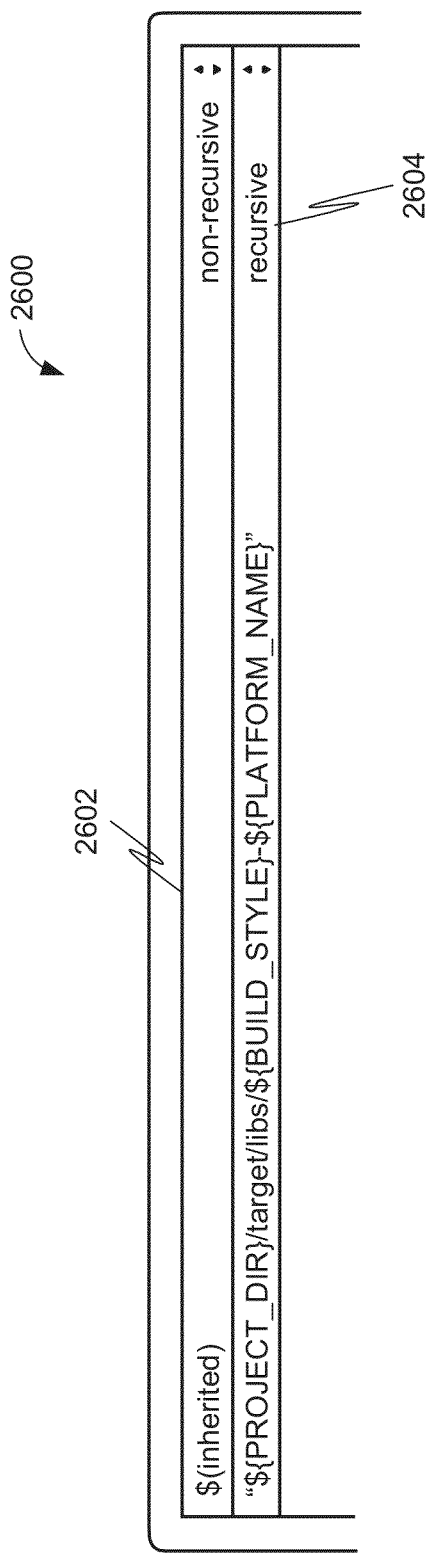
FIG. 26 is a screen capture illustrating a method, in accordance with an example embodiment, of setting a path as recursive.

The path can then be set as recursive to tell the linker to search for libraries recursively. This way the developer does not have to specify each path separately. FIG. 26 is a screen capture illustrating a method 2600, in accordance with an example embodiment, of setting a path as recursive. As can be seen, the developer may select the path 2602 and set it as recursive 2604.

Figure 27:
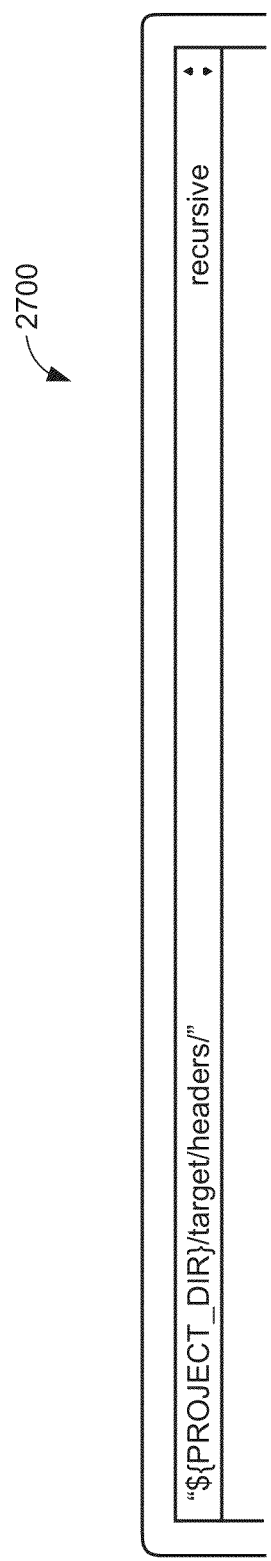
FIG. 27 is a screen capture illustrating a method, in accordance with an example embodiment, of setting pointers of a path.

After the libraries are set up, the developer can set up the header path next. The developer can double click the header search path and, using the same pattern as above, set the path to point to the MAF Extensibility and MAFUIComponents headers ("${PROJECT_DIR}/target/headers/**"). FIG. 27 is a screen capture illustrating a method 2700, in accordance with an example embodiment, of setting pointers of a path.

Figure 28:
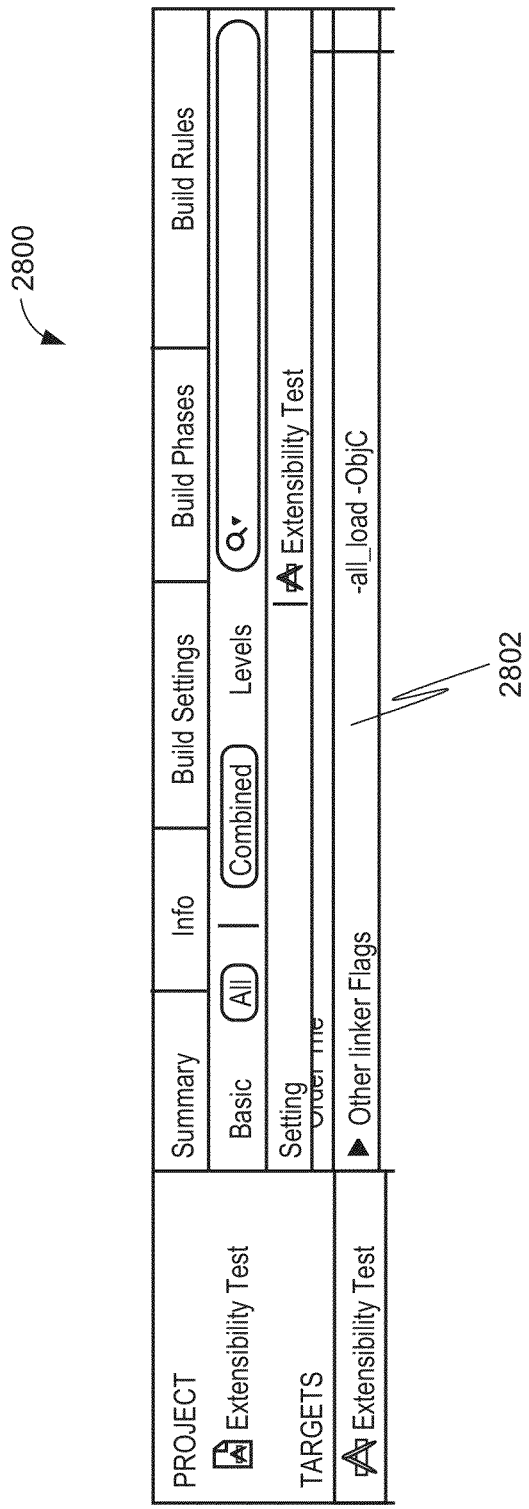
FIG. 28 is a screen capture illustrating a method, in accordance with an example embodiment, of adding linker flags.

Finally, the developer can add linker flags. FIG. 28 is a screen capture illustrating a method 2800, in accordance with an example embodiment, of adding linker flags. The developer can add -all_load-ObjC linker flags 2802. Now the developer has everything set up to start adding MAF styling and extensibility features.

The extensibility framework may rely on metadata stored in an XML file to build its UIs and perform data bindings at runtime. The XM file may be named, for example, laout_phone.xml or layout_tablet.xml, depending upon the app type. Both these files are used to build a universal app that runs both on a phone and on a tablet. The following refer to the phone version, although similar functionality is used for the tablet version.

Figure 29:
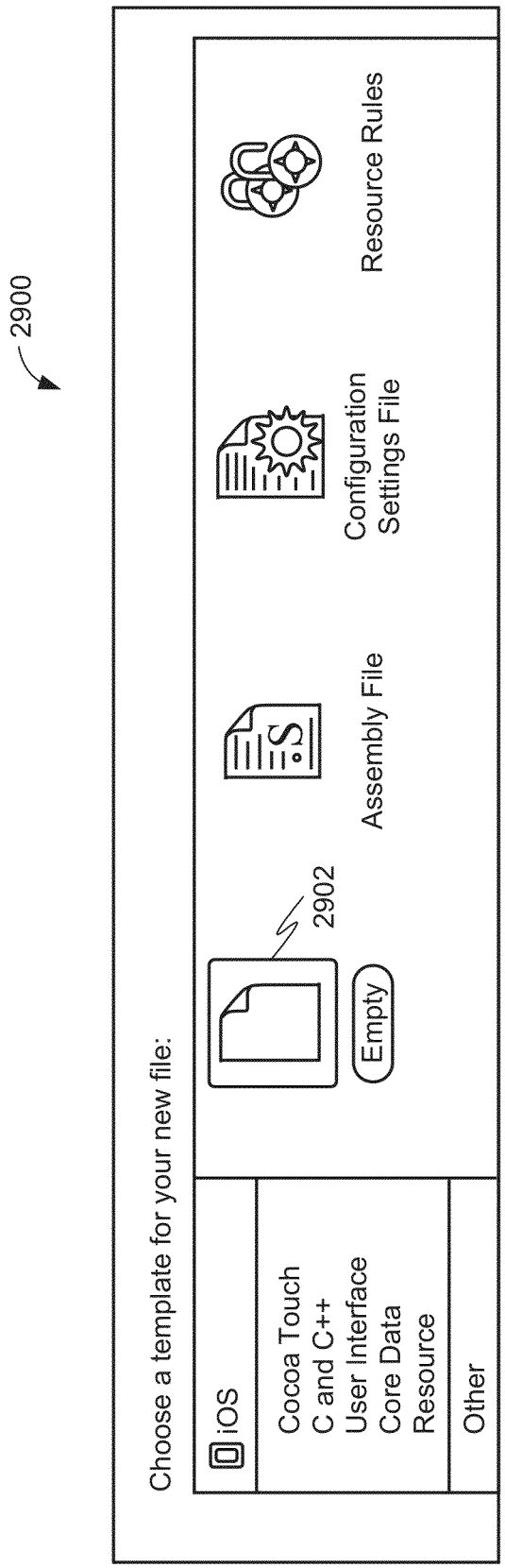
FIG. 29 is a screen capture illustrating a method, in accordance with an example embodiment, of adding an empty template.

First, a new file can be added to the file by selecting an empty template. FIG. 29 is a screen capture illustrating a method 2900, in accordance with an example embodiment, of adding an empty template. Here, the user selects empty 2902. The user can then name the file (e.g., layout_phone.xml) and click create.

The developer may then modify an app delegate, remove a few lines of boilerplate code and add a single API call to have an extensible app running.

The above code adds a single MAFCore API call, which instantiates the extensibility engine, and additional MAF libraries used for styling, value formatting, and so on. In an example embodiment the MAFCore loadWithWindow API is asynchronous, therefore it does not block a main thread when executing and other UI related tasks can be performed while the extensibility framework initializes.

Once the loadWithWindow API execution is complete, a completion block may be invoked. This example checks whether everything performed correctly and logs both the error and success case. There may be additional functionality offered by the extensibility framework to provide advanced possibilities to intercept runtime issues. The app can be built and executed now.

Figure 30:
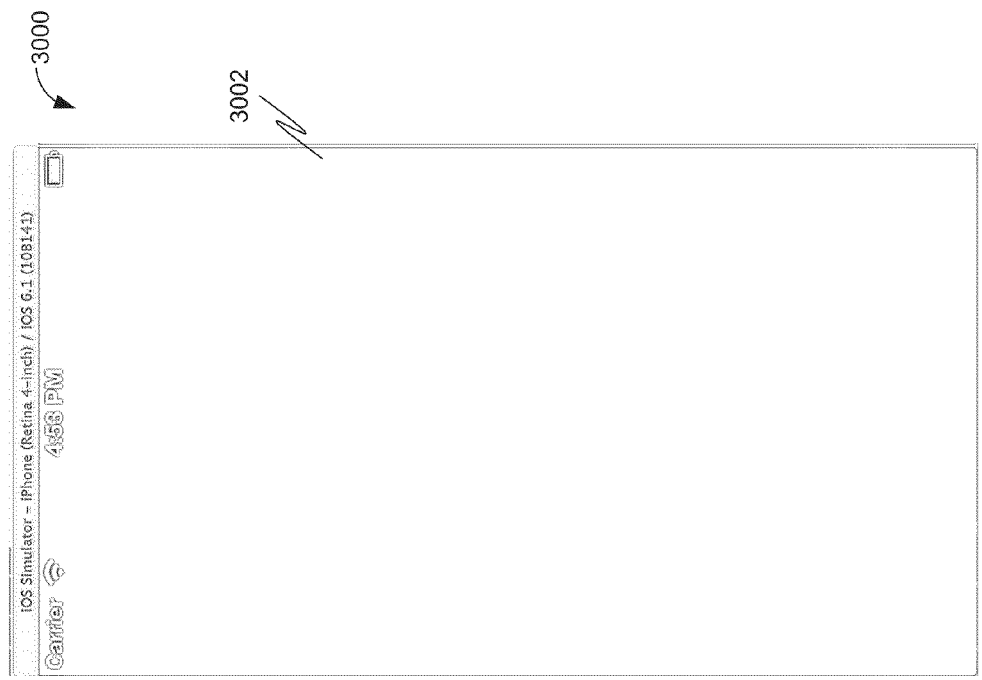
FIG. 30 is a screen capture illustrating a method, in accordance with an example embodiment, of executing the application.

FIG. 30 is a screen capture illustrating a method 3000, in accordance with an example embodiment, of executing the application. As can be seen, the screen 3002 is blank, which indicates that the extensibility engine works as expected.

Figure 31:
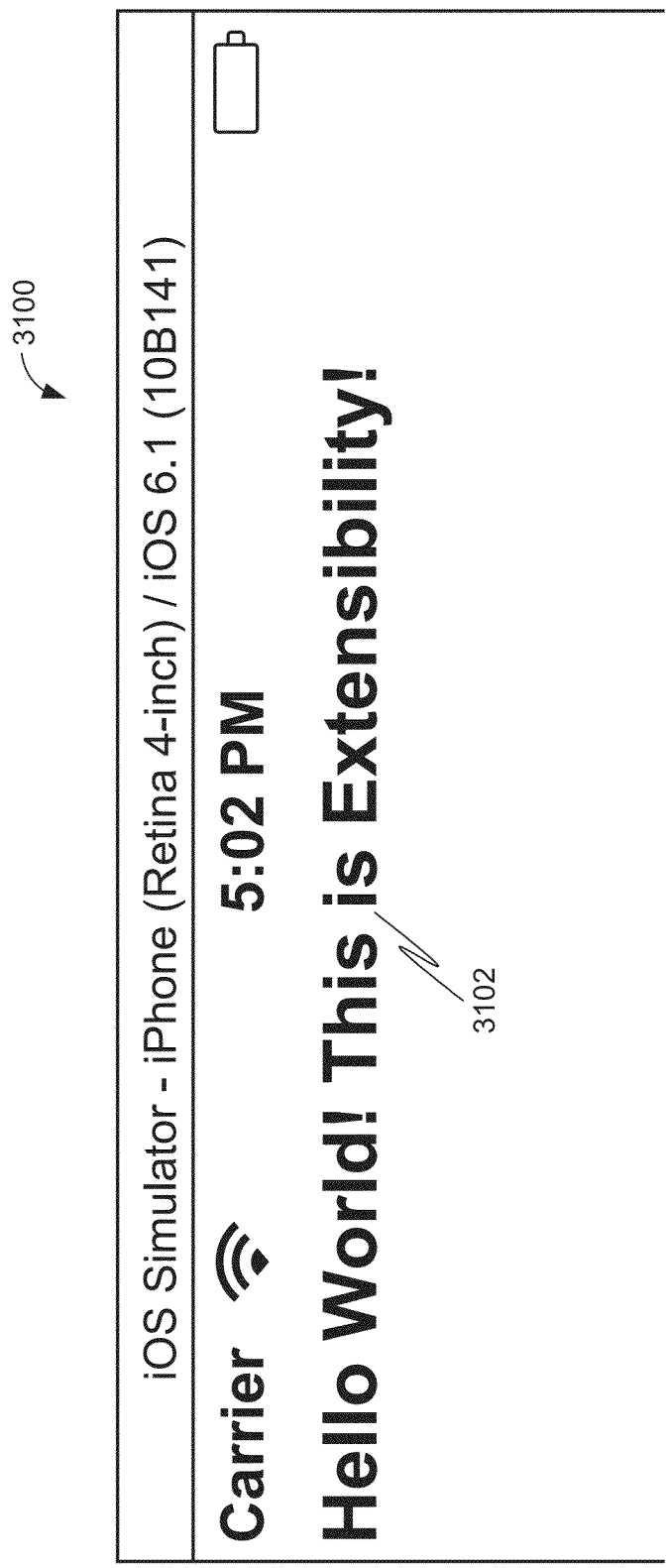
FIG. 31 is a screen capture illustrating a method, in accordance with an example embodiment, of executing the application.

FIG. 31 is a screen capture illustrating a method 3100, in accordance with an example embodiment, of executing the application. As can be seen, the text 3102 is visible on the screen. The label with the text has been added without performing any code changes. The position and dimensions of the label can be changed, by inserting, for example, the following lines in the UIElement section:

```
<P pid="halign" value="center"></P>
<P pid="margin_top" value="20pt"></P>
```

The code centers the label horizontally on the screen, and adjusts it vertically 20 points below the toolbar. To move the text to the center of the screen, the developer can comment out the line with "margin_top" and add this line:
<P pid="valign" value="center"></P>

The Extensibility Framework does not impose any restrictions on developers:custom code can be mixed with extensibility features.

The UI may, in some example embodiments, automatically apply the default style defined in SAPDefaultStyle.xml located in the MAFUIComponents.bundle.

The custom style can then be applied by setting the applicationSpecificStylePath MAFCore property before initializing the Extensibility Framework.

Figure 32:
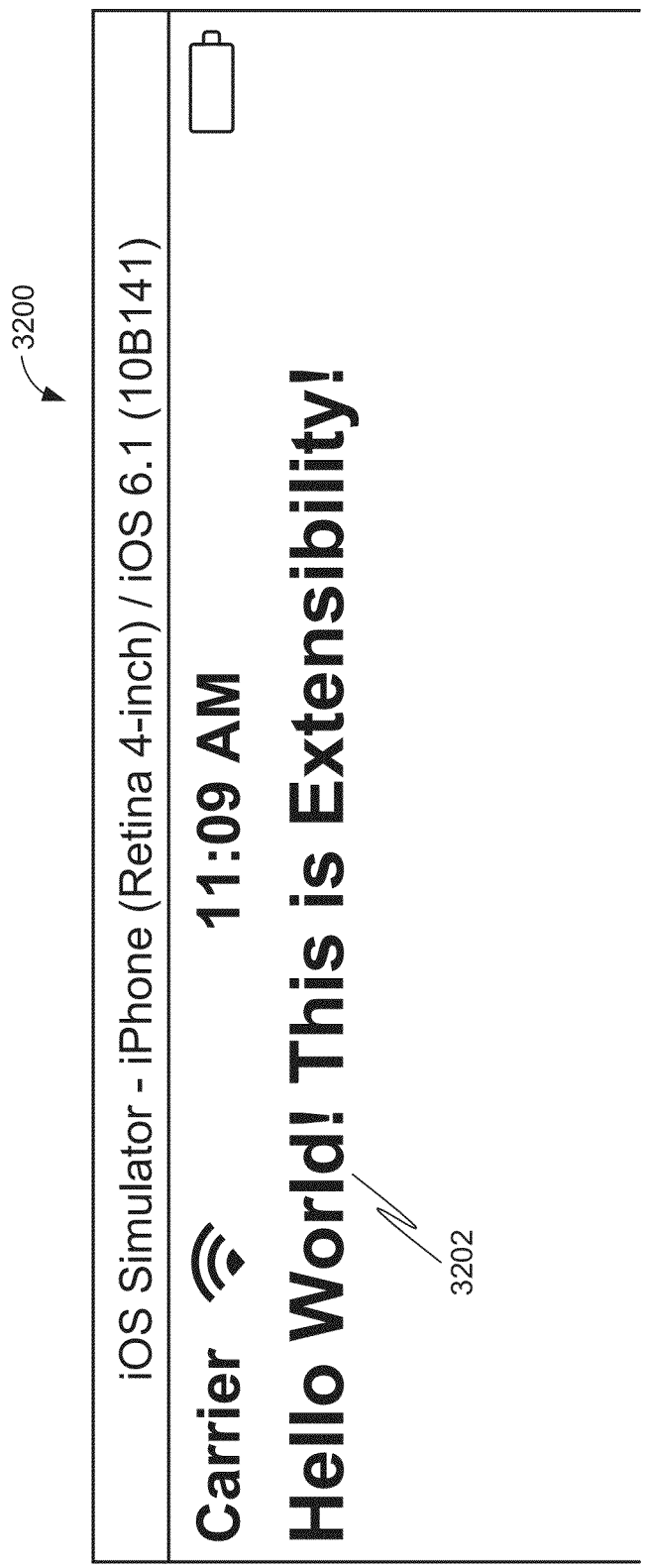
FIG. 32 is a screen capture illustrating a method, in accordance with an example embodiment, of executing the application.

FIG. 32 is a screen capture illustrating a method 3200, in accordance with an example embodiment, of executing the application. As can be seen, the style of the text 3202 has been altered (recognizing that this figure is a black and white depiction of what would ordinarily be a color screen). The developer could also change background color, font family, size, and so on.

Figure 33:
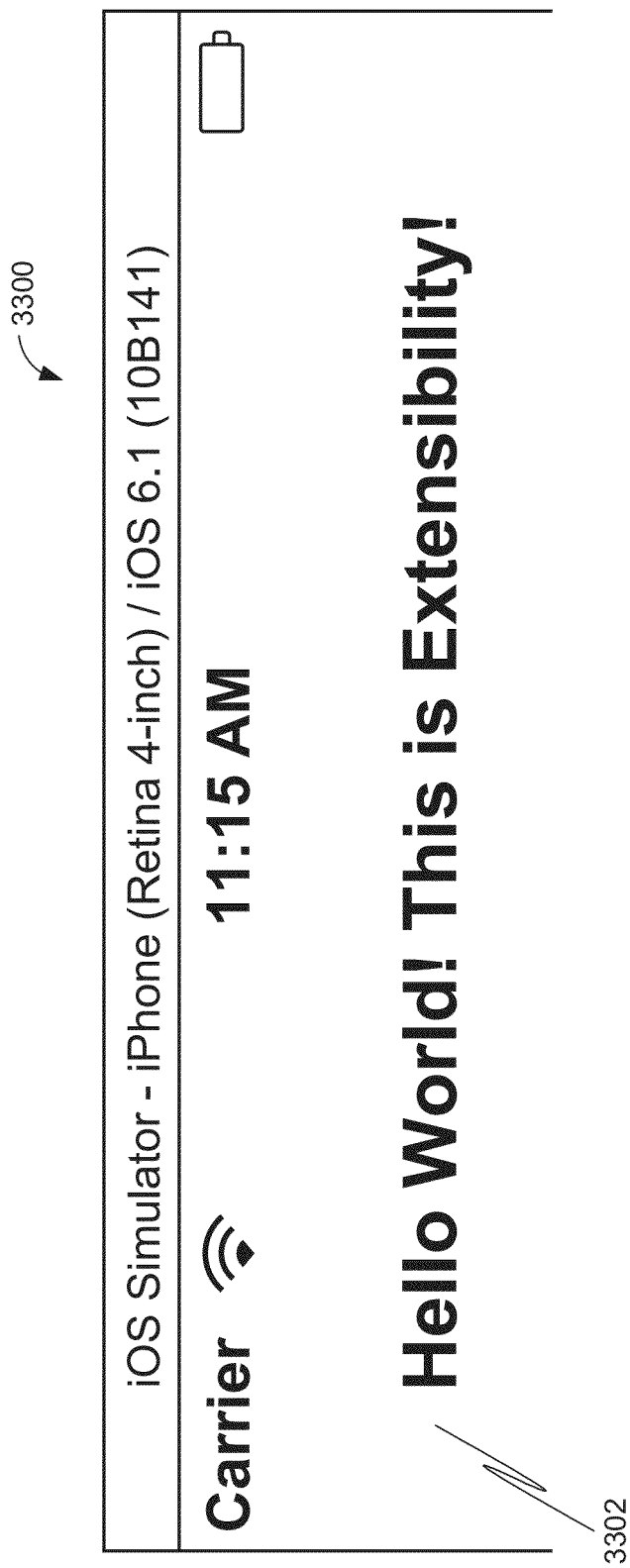
FIG. 33 is a screen capture illustrating a method, in accordance with an example embodiment, of executing the application.

FIG. 33 is a screen capture illustrating a method 3300, in accordance with an example embodiment, of executing the application. As can be seen, when the application is run again the UI 3302 has changed. The Styles can also be modified in the SAPDefaultStyle.xml directly.

The above example assigned static text to a label. What follows is an example where the label is fed with data from an OData stream, fetched via the Internet from a server. The setup requires some additional libraries for connectivity, OData parsing and caching, user authentication, etc.

Figure 34:
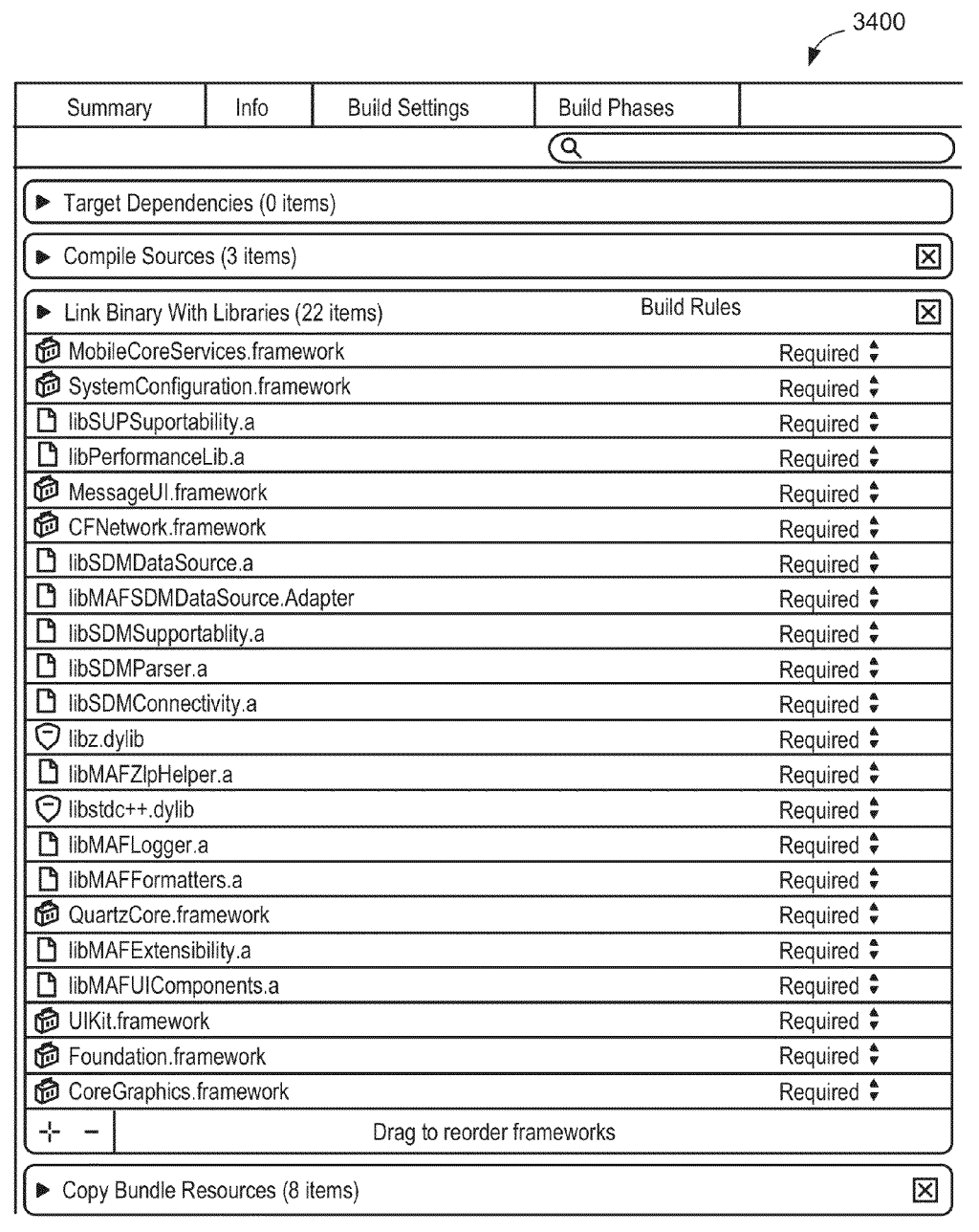

The public headers and the library files can be placed in the previously described folder structure. Since the header and the library paths are already set up and the search is recursive, the build settings do not need to be updated. However, the libraries should still be added to the project. FIG. 34 is a screen capture illustrating a method 3400, in accordance with an example embodiment, of displaying a complete list of libraries and frameworks.

The Extensibility Framework may come with two libraries that make working with OData easy:

MAFSDMDataSourceAdapter—a data source adapter converting between generic data format and OData.

SDMDataSource—a facade on top of the SAP Mobile Platform/SDM libraries acting as a wrapper, simplifying the sequence of fetch and parse calls, and providing additional features, such as caching and demo data support.

The OData feed contains a set of collections; this example uses the ApproverCollection. A binding definition can be added at the beginning of the layout_phone.xml. The binding describes the business objects that feed data to the tile's UI.

The {$Approvers.ApproverEmployeeName} syntax refers to the employee name. Curly brackets indicate that the content should be evaluated by the Extensibility Framework. The $ sign denotes a binding (or expression, see later on), followed by the collection and the entry name separated by a period.

Now some coding may be performed. A strong property may be provided for the SDMDataSource instance, otherwise it is released prematurely when the SDMDataSource loadModel async API is called.

FIG. 35 is a screen capture illustrating a method 3500, in accordance with an example embodiment, of executing the application after this last step.

The following example adds a label that displays the current date and time. The label's text is set by an expression. No additional coding is required, the developer only has to enhance the layout XML.

Figure 36:
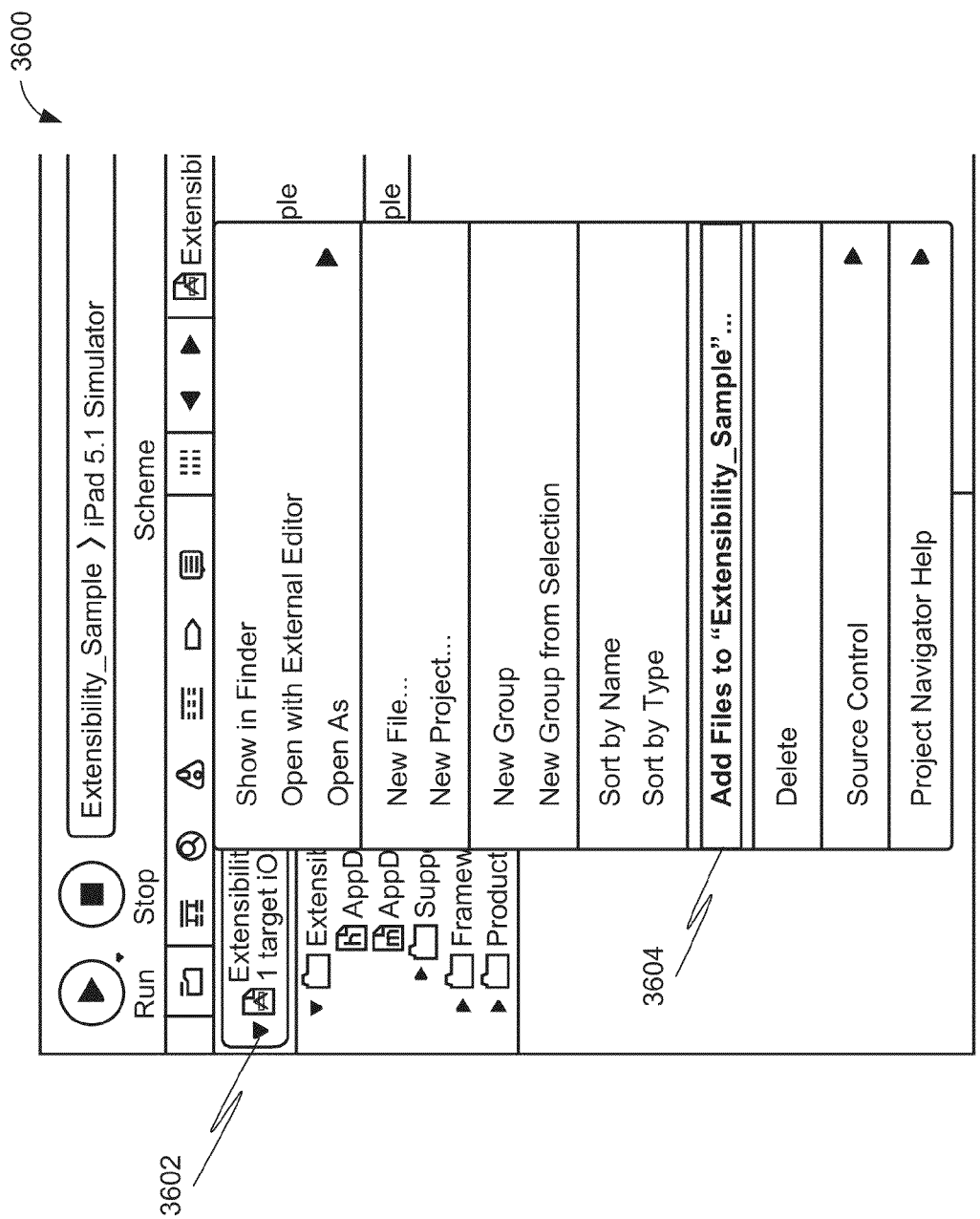
FIG. 36 is a screen capture illustrating a method, in accordance with an example embodiment, of adding default styling to the project.
Figure 37:
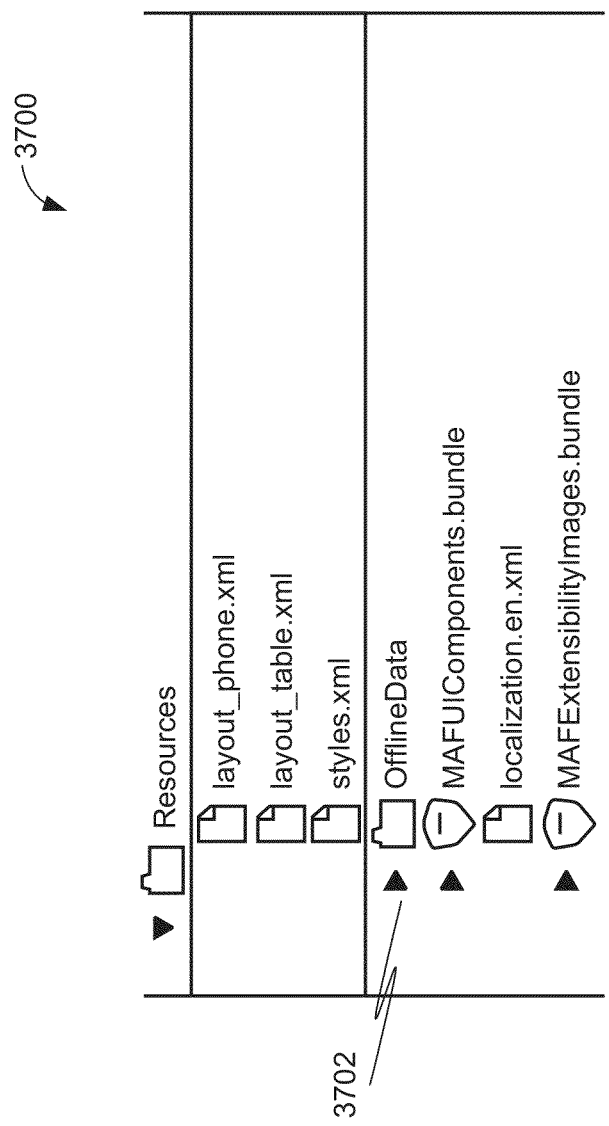
FIG. 37 is a screen capture illustrating a method, in accordance with an example embodiment, of adding configuration files to the project.
Figure 38:
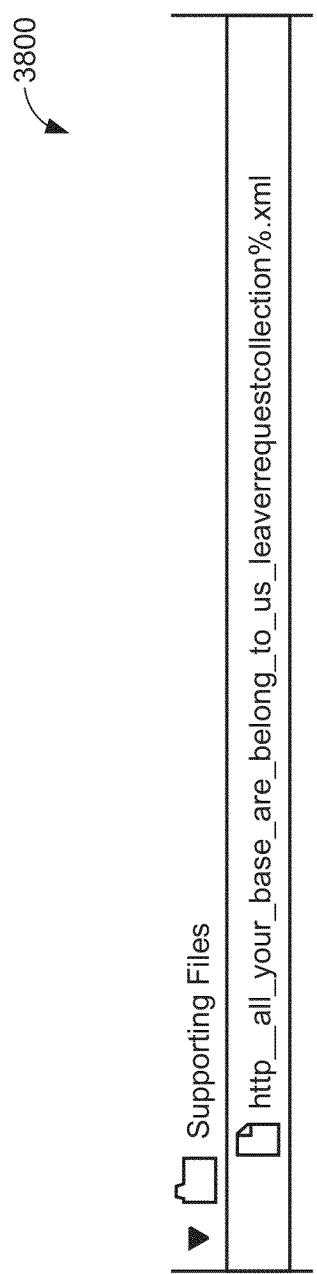
FIG. 38 is a screen capture illustrating a method, in accordance with an example embodiment, of selecting a project in a navigator.
Figure 39:
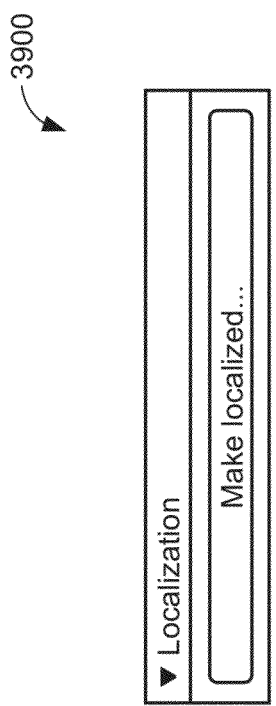
FIG. 39 is a screen capture illustrating a method, in accordance with an example embodiment, of selecting make localized.
Figure 41:
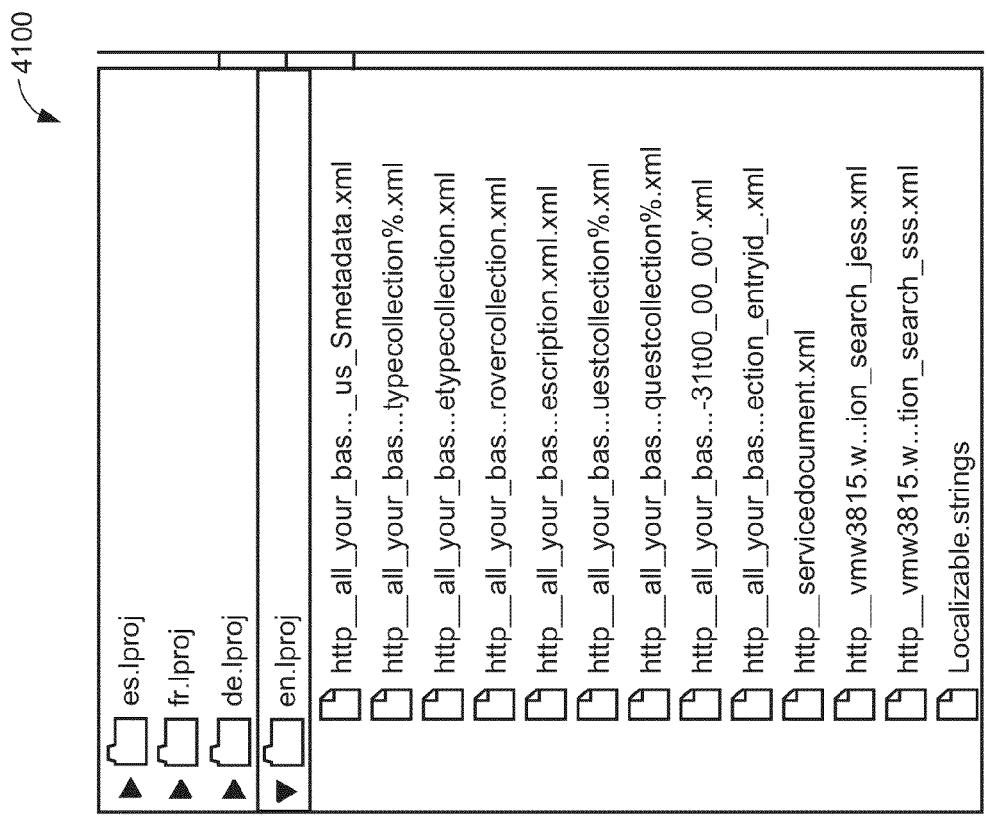
FIG. 41 is a screen capture illustrating a method, in accordance with an example embodiment, of overwriting the contents of a directory with localized XMLs.
Figure 42:
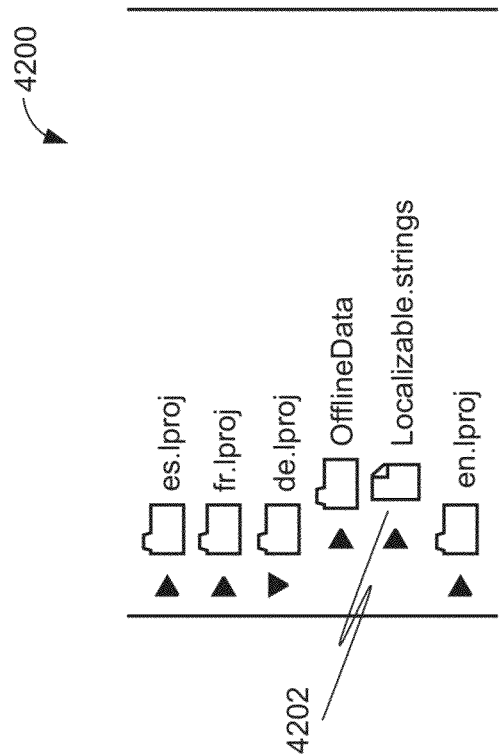
FIG. 42 is a screen capture illustrating a method, in accordance with an example embodiment, of creating folder references.
Figure 43:
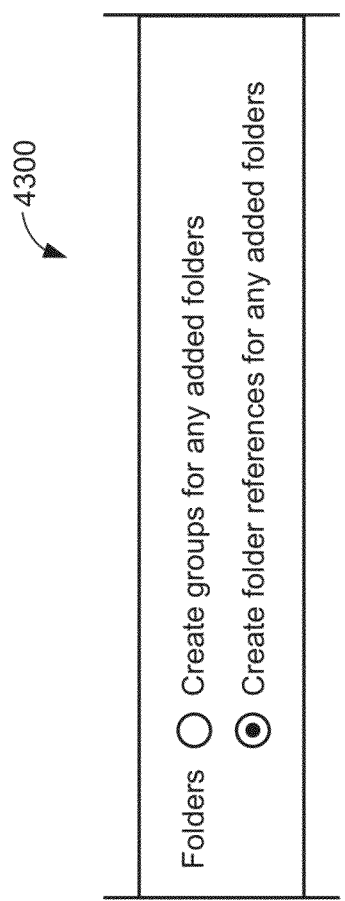
FIG. 43 is a screen capture illustrating a method, in accordance with an example embodiment, of selecting to create folder references for added folders.
Figure 45:
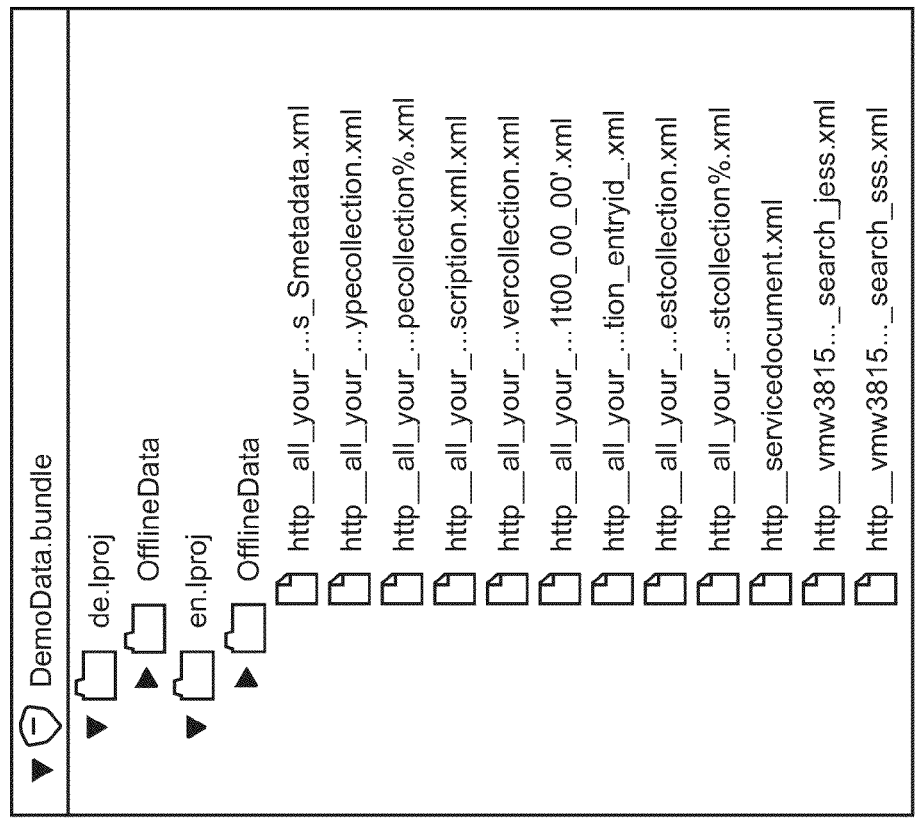
FIG. 45 is a screen capture illustrating a method, in accordance with an example embodiment, of packing an app's localizable demo data in a bundle and directory.
Figure 46:
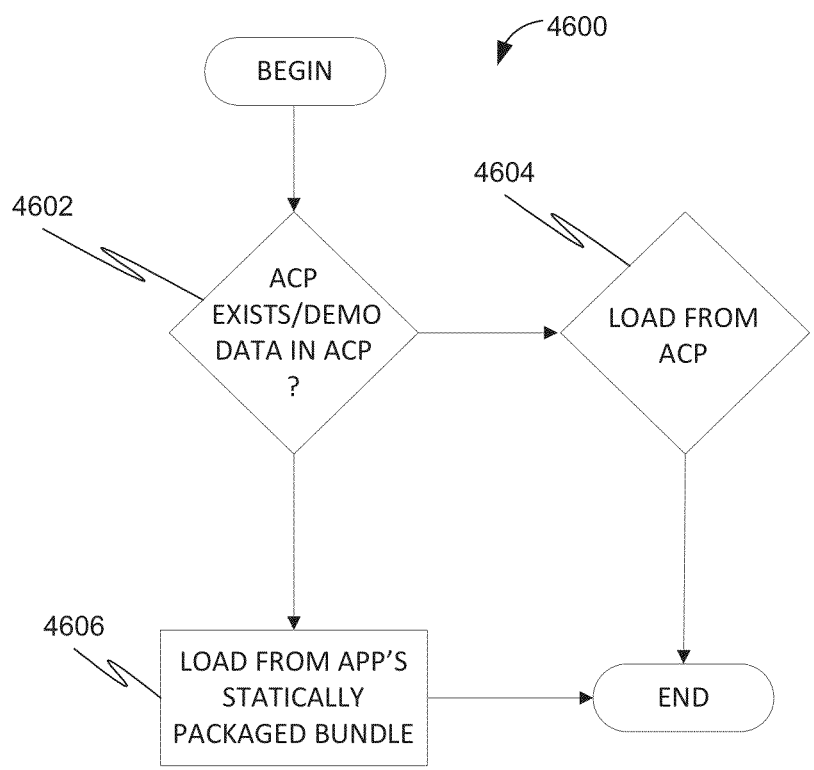
FIG. 46 is a flow diagram illustrating a method, in accordance with an example embodiment, of handling offline demo data.
Figure 47:
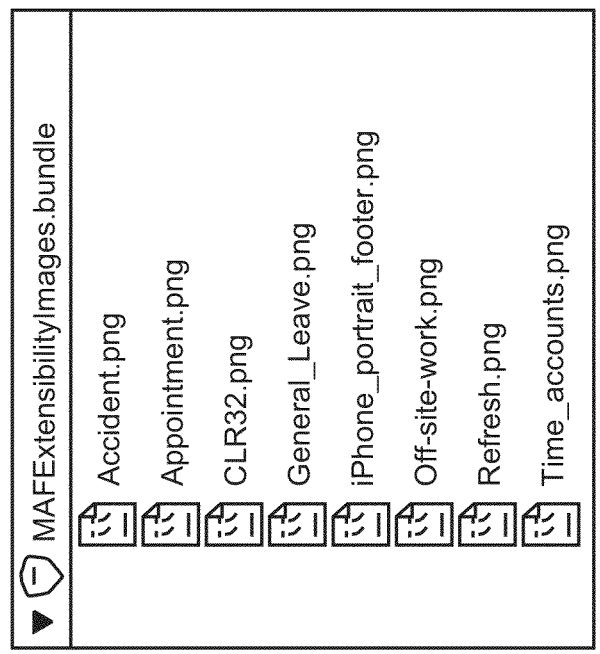
FIG. 47 is a screen capture illustrating a method, in accordance with an example embodiment, of displaying an MAFExtensibilityImages bundle.

Then a default styling and layout configuration can be added to the project. FIG. 36 is a screen capture illustrating a method 3600, in accordance with an example embodiment, of adding default styling to the project. As can be seen, the developer may right click the project file 3602 and select Add files to <project name> 3604. FIG. 37 is a screen capture illustrating a method 3700, in accordance with an example embodiment, of adding configuration files to the project. Here, the developer can select the configuration files 3702 and click add.

Adding localized texts to an app using MAF may be the same as for any native device application development environment. Adding MAF Extensibility or Reuse Components to the projects does not interfere with managing native localizable strings on iOS. Rather, it enables the developer to manage all, or a subset of the localizable strings, without having to recompile the app.

To localize the string resources, native localization files can be used by maintaining Localizable.strings files. Keys and the corresponding translatable strings can be added. MAF Extensibility supports keys that contain spaces.

All translated files can be included in the application project.

The translation process may comprise the following steps:
1. Use the converter to convert the native localization files into XLIFF files.
2. Upload the translation files to the translation system.
3. Download the translated files.
4. Convert from XLIFF to the native localization file.
5. Include all translated files in the application project.

Extensibility-specific localizable files may be named according to the localization.<language code>.xml pattern and they may be placed in the strings directory in the ACP.

The library automatically assigns the associated localized texts to the UI elements and controls, as defined per configuration. Keys in the Extensibility localization file may override any matching keys that are defined in the native Localizable.strings resource. This allows customization of native localized strings.

The developer can use the MAFCore—localizedText: API to access localized texts from both the native and the extensibility-localized string resources. The developer can also use the NSLocalizedString macro, but it may not be able to resolve the extensibility string keys.

In an example embodiment, the framework provides support for localized offline data, which allows apps to start in demo mode, allowing developers to have a look at an app without having to set up a connection.

Creating offline demo data may be accomplished using the following steps:
1. Query the service document in a browser and save the content.

Name the service document file based on the download URL. Replace all special (?, :, \, /, =, *) characters with underscores.

When the browser finishes downloading the content, click (in most browsers) File>Save as.

Internet Explorer:
   In the Save Webpage dialog, choose:
      Webpage, source only (*.xml; . . . ) for the service document and metadata, or
      XML Files (*.xml) for feeds and data requests in the Save as type combo box.

Firefox:
   Select File>Save Page As. In the Save As dialog, choose:
      Web Page, XML only or XML (*.xml) (depending on your Firefox version) for the service document and metadata.
      WebPage, XHTML only for feeds and data requests in the Format combo box.

Safari:
   Select File>Save As. Enter the file name in the Export As field.

For Format, select Page Source.

Note: Safari shows only the values of the XML elements. Since the metadata does not contain element values, the page displayed is empty, but the metadata is downloaded properly.
2. Query the metadata document in a browser.
3. Execute an OData data request in a browser.

Follow the naming procedure described in step 1. If the URL contains parameters, remove them from the file name and append a % character at the end.

In an example embodiment, the extensibility framework internally fetches and converts data based on the data bindings defined in the configuration. A subscription may be set up to be notified about the execution of these time-consuming tasks, so that the developer can, in turn, notify the user, or intercept any issues occurring during data fetching and processing. The framework may communicate with the app's delegate by invoking the delegate methods defined by the MAFExtLoadingDelegate.

For example, in the online OData scenario when the service document and the metadata fetch is started, the Framework invokes the mafExtLoadingStartedForBindingDescriptor delegate method, if it is implemented by the app delegate. At this point, the developer can show a progress bar or an alert view to notify the user that something is happening. Once the loading process completes, the mafExtLoadingFinished delegate is called; the developer can dismiss the alert view here.

Applications may also handle cases when the loading process fails. In such cases, the mafExtLoadingFailedWithError: delegate method may be called, which lets the developer handle the error and notify the end user about the issue. The supplied NSError object contains problem details, and can be used for debugging, logging, and tracing.

In an example embodiment, it is possible to develop applications that rely purely on configuration. The developer can develop a fully metadata-driven app by describing the UIs, data bindings, screen transitions, and actions in the layout XML. The extensibility framework resolves the bindings, creates the UIs and inserts them into the navigation chain, and manages the default actions when the user interacts with the controls.

Figure 48:
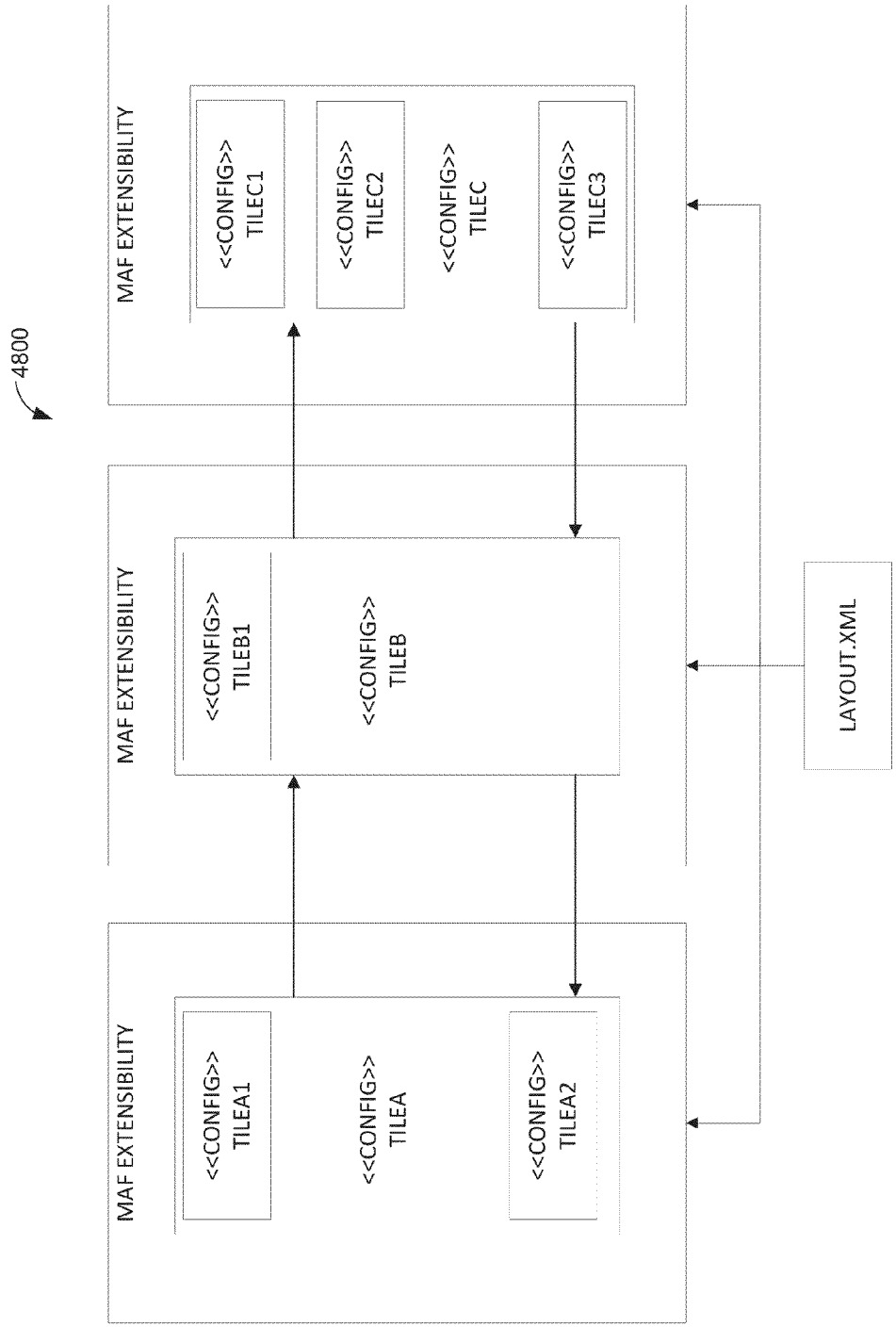
FIG. 48 is a block diagram illustrating a sample layout, in accordance with an example embodiment, of a purely metadata driven navigation chain.

FIG. 48 is a block diagram illustrating a sample layout, in accordance with an example embodiment, of a purely metadata driven navigation chain. This is an example of a layout that allows the app to be fully functional as soon as a few lines of code are added to the app delegate.

Figure 49:
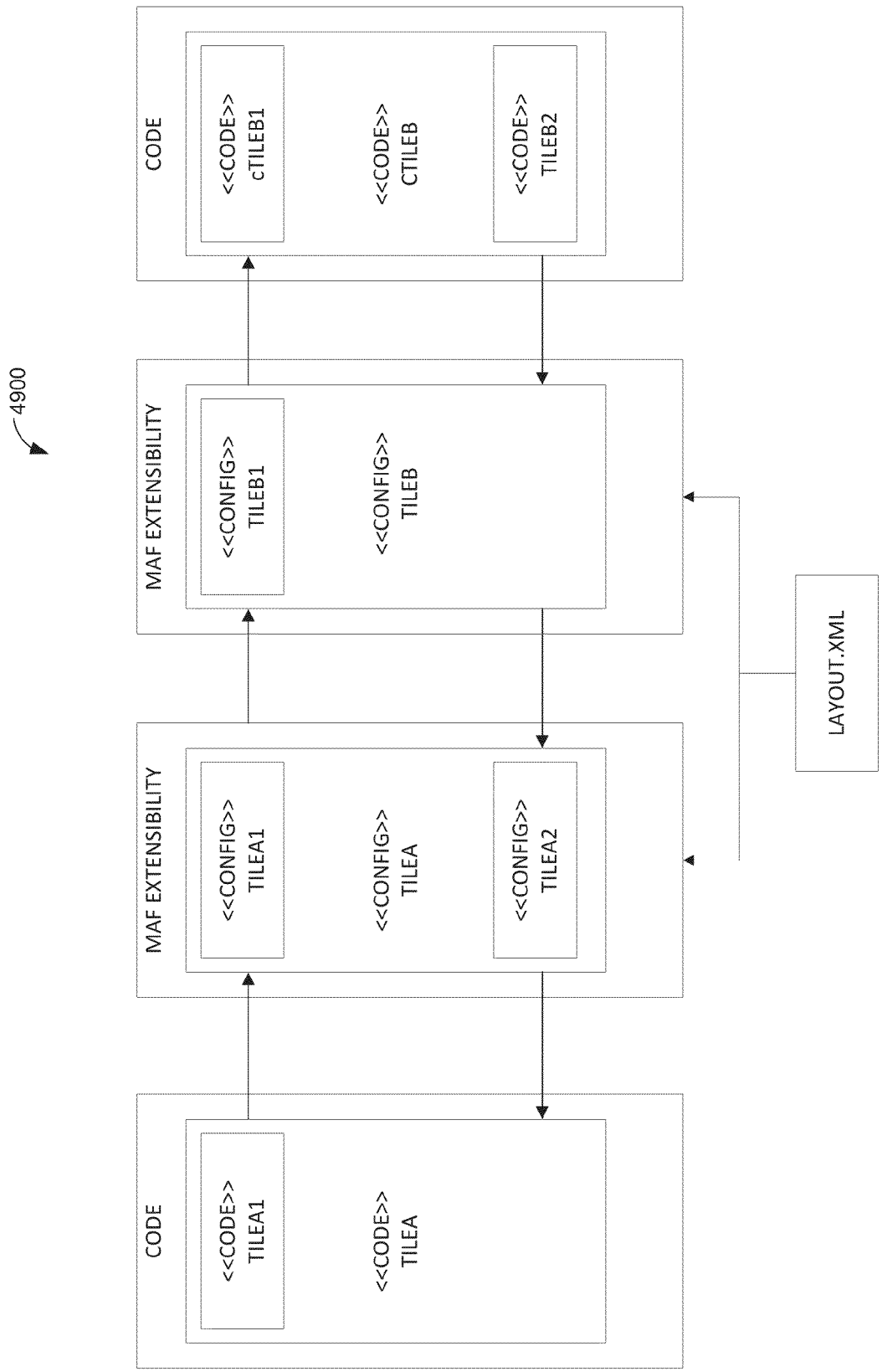
FIG. 49 is a block diagram illustrating a sample layout, in accordance with an example embodiment, of a mixed code and metadata driven navigation chain.

In another example embodiment, it is possible for the developer to freely combine metadata-driven tiles and native iOS view controllers and views and controls. Coded UIs and UIs from the layout XML can be added in the same navigation chain. The root tile itself (the app's initial UI) can also be metadata driven. FIG. 49 is a block diagram illustrating a sample layout, in accordance with an example embodiment, of a mixed code and metadata driven navigation chain.

Figure 50:
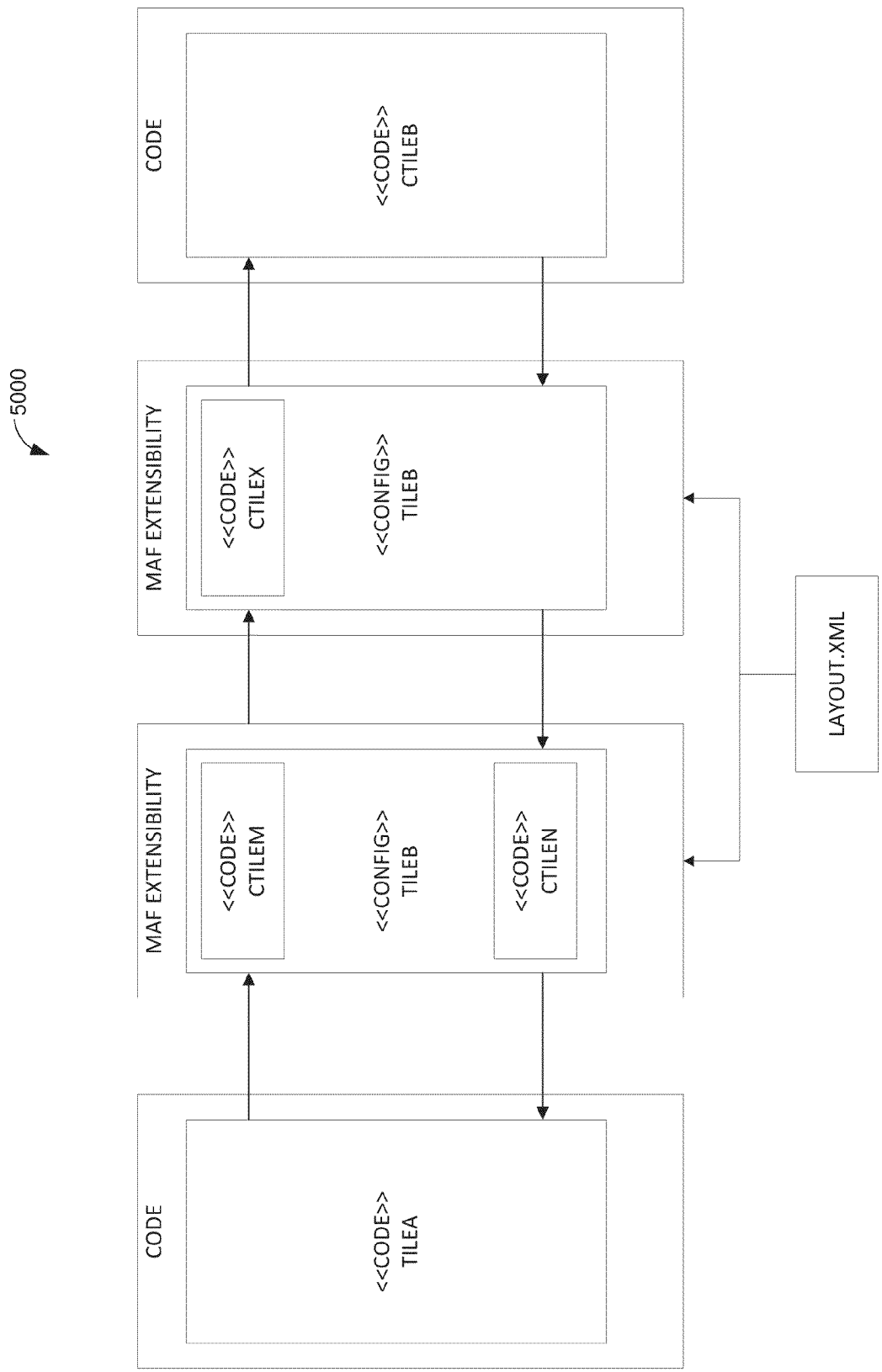
FIG. 50 is a block diagram illustrating a sample layout, in accordance with an example embodiment, of a mixed code and metadata driven navigation chain with a manually coded view added to a metadata driven tile.

The developer can add a manually coded view to a metadata-driven tile. The subview is positioned according to the provided coordinates. FIG. 50 is a block diagram illustrating a sample layout, in accordance with an example embodiment, of a mixed code and metadata driven navigation chain with a manually coded view added to a metadata driven tile.

Figure 51:
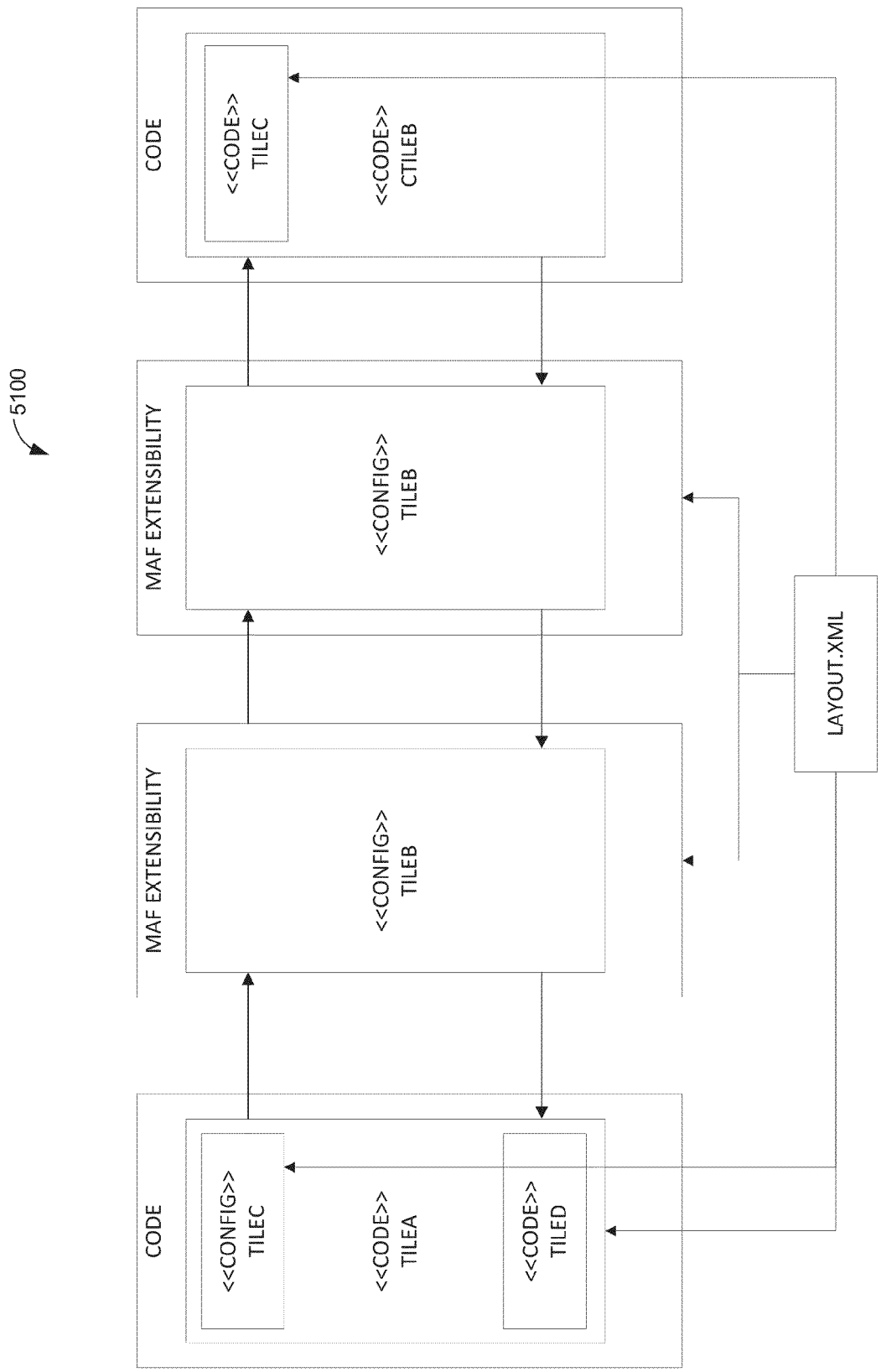
FIG. 51 is a block diagram illustrating a sample layout, in accordance with an example embodiment, of a mixed code and metadata driven navigation chain with a metadata driven subview added to a programmatically built UI.

The developer can also add a metadata driven subview to a programmatically built UI. FIG. 51 is a block diagram illustrating a sample layout, in accordance with an example embodiment, of a mixed code and metadata driven navigation chain with a metadata driven subview added to a programmatically built UI.

The developer can also combine configuration-based tiles and subviews, which represents a freestyle combination of the above scenarios. The developer can also create custom tiles by taking over the creation of specific tiles or tile controllers. The Extensibility Framework notifies the client when a tile is about to be created. The developer can implement and register a MAFTileCreatorDelegate for this, which allows the developer to take over the creation of specific tiles. Additionally, the developer can customize controller logic by intercepting notifications about data management and action messages sent by the various controls.

In an example embodiment, the developer can register delegates that are called by the Extensibility Framework before and after tile creation. This lets the developer provide a custom tile, or modify the one that has been created by the framework. The developer may have two options:
1. Make the app delegate a MAFTileCreatorDelegate; the framework checks whether the app delegate responds to the tile creator delegate APIs, and calls them if available.
2. Create a specific class that adheres to the MAFTileCreatorDelegate protocol, and implements its delegate methods.

If the developer implements the MAFTileCreatorDelegate didCreateTile: API, the framework may invoke this delegate method each time a tile is built. This allows the developer to add custom subviews or controls to a metadata-driven tile, or to modify the tile's content.

In order to make only certain parts of the app extensible, the developer can follow a different approach than the one described above. For example, the developer can add a metadata-driven tile as a subview to a manually programmed UIViewController, or insert it into the navigation chain.

The developer can use the tile in the same way as the UIViewController: push it to the navigation chain, display it modally, retrieve its subviews, and so on.

In order to add a manually coded view or control to a tile, the developer may implement the didCreateTile: delegate method in the AppDelegate (see Intercepting Tile Creation Events). This method may be invoked by the framework when a tile is created. Since the tile is also passed as a parameter, you can freely modify it: add subviews (views and controls), reorder existing subviews, and so on.

The developer can retrieve a configuration-based tile using the MAFUIManager tileByIdentifier: API. The Extensibility Framework may generate the required tile, or return nil if it cannot be built due to a malformed or missing configuration.

The developer can provision the data for the metadata-driven tile by either:
  Assigning a custom data source adapter delegate for the tile, or,
  Passing the context to the tile upon creation.

The code below defines a custom data object of the TimeSheetEntry type, and feeds the metadata-driven tile with this model. First, the data is converted from TimeSheetEntry to a TimeSheetEntryBO class that implements the MAFGenericBO protocol so that the Extensibility Framework can digest it. he TimeSheetEntryBO can map the attributes to the ones defined in MAFGenericBO.

Similarly to adding a custom subview to a metadata-driven tile, the developer can embed a custom UIControl element in a tile. The framework renders the control, but the developer handles the events and the actions (described in the configuration) according to his or her own needs.

The developer can add custom controls (UIButton, UIPickerView, and so on) as subviews to a metadata-driven tile. Action messages generated by these custom controls can be routed back to the custom view controller that built the controls, and can be processed as usual.

The developer can set a delegate to intercept messages sent by the UI controls after a user interaction, for example, after tapping a button. Implement the MAFTileActionHandlerDelegate protocol, and register the delegate via MAFTileCreatorDelegate's registerActionHandlerDelegateForTile: API.

The developer can provide custom data for specific tiles, that is, the developer can feed the tile with custom data from a database of choice. To use a global custom datasource adapter, implement a class that adheres to the MAFDataSourceAdapter protocol, using either the MAFCore setDataSourceAdapter: API, or the MAFCore—loadWithWindow:dataSourceAdapter:andCompletionBlock: API.

In an example embodiment, data is fetched, validated and transformed to generic business objects. The extensibility layer may display the data on its views and subviews. When the developer modifies or creates data, the developer validates and transforms the generic BO back to the database-specific format (OData, in this case) before committing it to the database. The validation step may fail, for example, because of malformed, non-OData-compliant date/time values. If the developer sets an error handler delegate property exposed by the datasource adapter library, the developer can listen for and fix conversion-related issues.

When developers upload a new Application Configuration Profile to the mobile platform server, the app may be notified about the change via the LiteSUPMessagingClientConfigListener onConfigurationChange:value: delegate. The application can implement the delegate method, download, and pass the compressed data to the extensibility framework. This example adds the required logic to the app delegate. However, the developer can add the required coding to any other "god object," as long as it stays alive while the app is running.

In an example embodiment, the extensibility framework is independent of the underlying data model. Data is represented by generic business objects; the generic business object is an abstraction introduced on top of the currently supported OData and upcoming data models.

The generic business object may have a type and a unique identifier, and it exposes APIs for assigning key-value pairs; additionally, the developer can query a business object's state, which can be one of:

Transient: exists only on the client, has never been persisted.
Persistent: exists in the database, but has not been modified on the client.
Dirty: has been modified on the client, but the changes have not yet been committed to the database.

Generic business objects also provide undo management capabilities. The MAFSDMDataSourceAdapter defines the OData-specific MAFSDMBO class, which inherits from the MAFGenericBO. If the designer implements a custom datasource adapter, the developer also can implement a custom MAFGenericBO specialization, and convert the data model to the generic object format.

Figure 52:
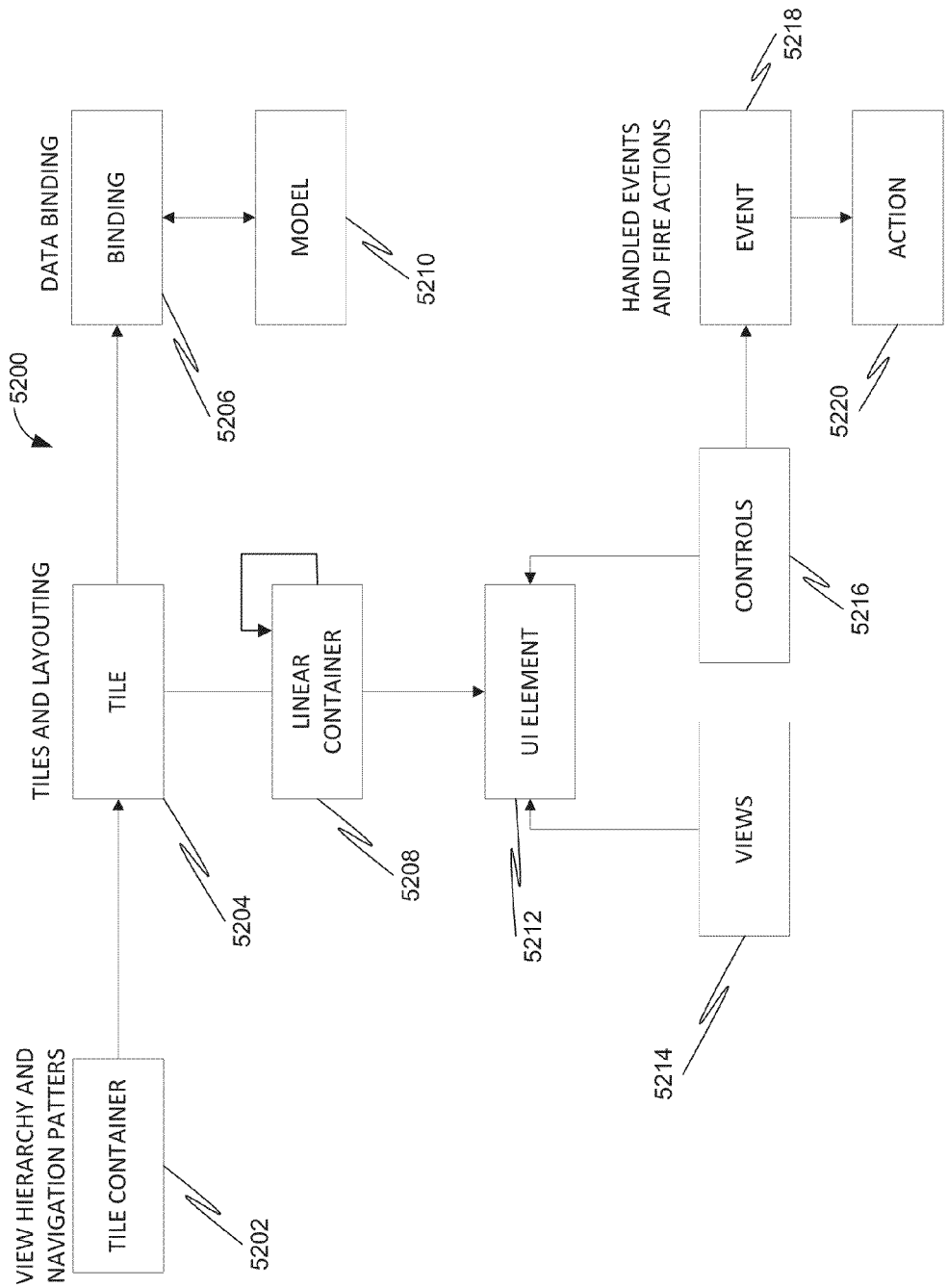
FIG. 52 is a block diagram illustrating an example extensibility layout, in accordance with an example embodiment.

In an example embodiment, configuration is the core of the Extensibility Framework. Configuration metadata may be presented in the form of XML files, which describe:

The TileContainer, which defines the view hierarchy setup and the navigation pattern
The tiles, including their subviews, controls, and layout parameters
Data binding information, which describes the model that feeds the tiles
The default or custom actions to be performed when interacting with a control FIG. 52 is a block diagram illustrating an example extensibility layout 5200, in accordance with an example embodiment. The layout 5200 may include a tile container 5202 referencing a tile 5204, which in turn can reference a binding 5206 and a linear container 5208. The binding 5206 may reference a model 5210. In this example embodiment, the linear container 5208 may reference a UI element 5212, which has corresponding views 5214 and controls 5216. A control 5216 may be linked to an event 5218, which in turn may correspond to an action 5220.

In an example embodiment, the MAFExtensibility.xsd and the corresponding metadata configuration XML provide details about the attributes and values a developer can use to define a valid Extensibility Framework configuration.

In an example embodiment, the binding describes the business objects that feed data to the tile's UI. The developer provides the binding definitions at the beginning of the layout XML.

The binding definition may have a unique ID. Each binding can have several parameters, which are documented in the XSD schema. Some of the most frequently used parameters include:

boType—type of business objects or collection name (OData).
sourceBo—a business object (for which related data is queried).
relationId—identifies the related collection or entry.
orderby—returned entries are ordered by the given criteria.
top—limits the number of entries to be returned simultaneously.
skip—the number of items to be skipped before a fetch; used for paging.
filter—OData filtering string.

In an example embodiment, by default, bindings are resolved at runtime by the framework, but the developer can add custom control logic to manage the model for specific tiles.

In an example embodiment, the tile container represents the container view controller in iOS terms. Container view controllers let the developer group together view controllers that work together. This is a task-based approach, where each container controls how the associated view controllers interact. Container view controllers also define transition patterns between the view controllers, resulting in seamless interface patterns. The extensibility framework provides support for the most frequently used standard iOS containers:

Single view (UIViewController based)
Navigation based (UINavigationViewController)
Tab (UITabBarController)
Split or master-detail (UISplitViewController)

The developer can specify multiple tile containers if the app contains different navigation patterns. However, the framework may consider only the first root tile. The developer is not required to define a tile container. In some cases, the root container is specified by the hosting app. The tile container definition may include the tile references belonging to it. The rules for defining tile containers may, in some example embodiments, include:

Single-view and modal apps having a UIViewController as a root view controller cannot include a tile container in their configuration. Instead, define the corresponding root tile and mark it as root. The root tile must enclose further tile references and supported events and fired actions, which are brought up modally.
Navigation-based tile containers can contain only one tile reference. The referenced first tile must enclose the further tile references to where the user can navigate, and supported events and fired actions.
Split-tile containers must include two tile references: the master tile and the detail tile (the same rules apply as for a UISplitViewController).
Tab-based tile controllers must enclose all tile references.

In an example embodiment, a tile is a UI element that has a visual representation on the iPhone's or iPad's screen. It can be an entire screen, a composite tile, or a simple view element. A basic tile can be described by these parameters:
  (Required) Unique identifier—precisely identifies the tile inside the framework or on the client side by the app developer.
  (Optional) Title—a localizable string ID, text.
  (Optional) imageSrc—the image to appear on the tile; can be either a bundled resource or an image URL.

This example describes a navigation-based application that contains two tiles. The developer can add more sibling or child tiles by following the same pattern.

Figure 53:
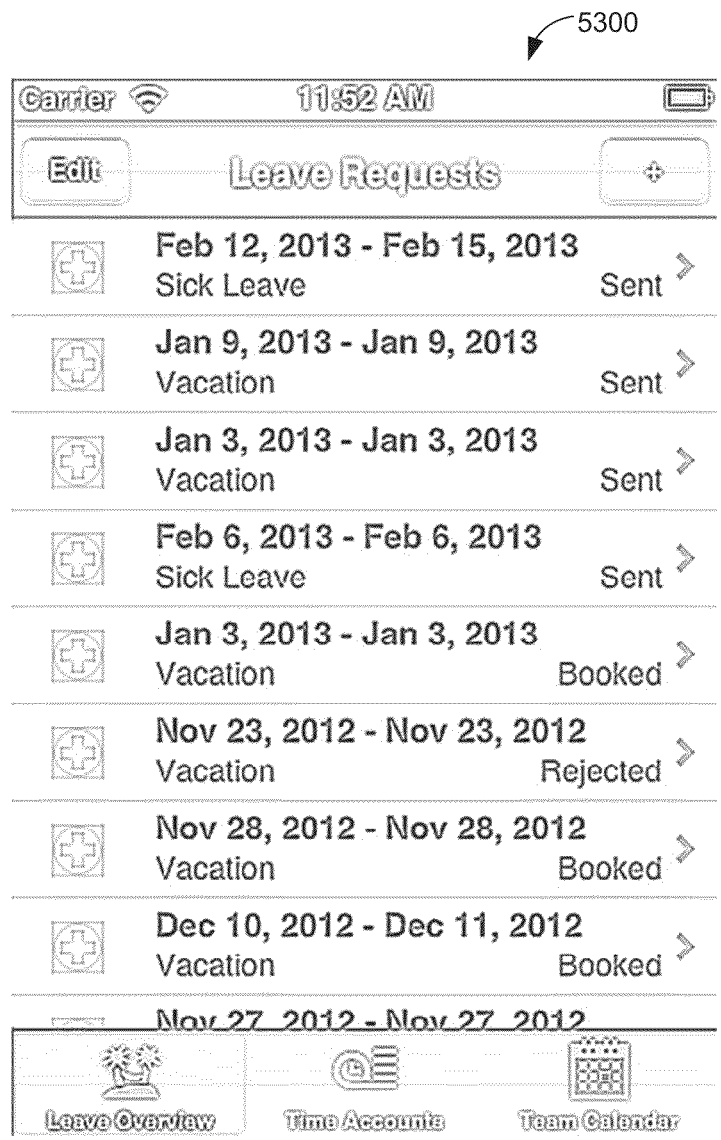
FIG. 53 is a screen capture illustrating a method, in accordance with an example embodiment, of presenting a tile's layout.

In an example embodiment, the framework enables the developer to build complex metadata-driven UIs in the same manner as with native UIKit elements. FIG. 53 is a screen capture illustrating a method, in accordance with an example embodiment, of presenting a tile's layout.

The UI contains a flat UITableView (ListContainer) with sections (ListSection). Each section contains a label.

In an example embodiment, the Extensibility Framework provides an easy way to define a list container (translates to UITableViewController) via configuration.

Although the developer can define cells one by one, it is possible to create a configuration which automatically renders a cell for each BO coming from the binding. This feature is widely used with Master-Detail application types, which follow a drilldown approach. The creator of the configuration can choose from the two approaches or mix them, but can only use one ListItem (UITableViewCell) with feed in a ListSection, which is used to group cells within the definition.

In an example embodiment, the extensibility framework provides support for grouping table view cells in sections, based on a chosen property of the BO. This feature can be used per ListSection by adding the autoGroupBy attribute.

In an example embodiment, the context acts like a cache holding the content that is relevant for one or more tiles. There are two types of contexts:
  Local—the context that belongs to a specific tile, which is updated with binding data or with data passed from or updated by other tiles.
  Global—acts like a versatile, central in-memory cache, from which you can manage any custom objects that are identified by a unique ID.

In an example embodiment, the tile's local context can be updated in two different ways.
  Automatically, with data passed from another tile when a navigation action occurs.
The developer can pass BO attributes, references to context or global context data, or free text. Use $_context.<attribute> to refer to an existing local context attribute, and $_global.<attribute> for a global context attribute. This example shows how context parameters are passed when the navigate action is triggered. The target tile's (TileB) local context is updated with the two values: a free text and a value coming from a binding.
  Explicitly, via the updateContext action. Use updateContext to update the local context of tiles that appear on the same screen, where navigation is impossible. Similarly, the key-value pairs may be designed to be passed to the target tile as properties.
The designer can pass BO attributes, references to local or global context data, or free text. Use $_context.<attribute> to refer to an existing local context attribute, and $_global.<attribute> for a global context attribute. To pass the same objects to several different tiles, add a new updateContext action for every tile and repeat the context parameters. This example demonstrates the updateContext action bound to the onClick event of a button. When the user taps the button, the Tile3 target tiles's context is updated for the "platform" and "type" keys.

In an example embodiment, the target tile can access the passed values in its local context using the {$_context.<value>} syntax. To update the UI whenever the context changes, hook in for the onContextChanged event and perform the uiRefresh action.

This example shows how to feed Tile3's labels from the local context.

In some cases, the tile cannot proceed until the context is updated by other tiles. While the master view is retrieving data, there is nothing to show in the detail view. Once the master tile has all the required data, it can update the detail tile's context by firing an updateContext action. The detail tile, which has been on hold if waitForContext is enabled, can now resolve its bindings and refresh its UI.

In an example embodiment, the global context is a central repository for custom key-value pairs that developers can manage. A developer can place, retrieve, and delete global context values based on their unique keys. To update the global context, use the updateGlobalContext action. The same syntax and parameters apply as for the local context. The developer can insert or update the global context with BO attributes, free text, or custom data.

Although tiles can use the local context, they can also access data available in the global context. To access global context elements, use the {$_global.<value>} syntax.

In an example embodiment, actions define how a control reacts to user interactions or internal events. In iOS, events and actions defined in the configuration serve the same purpose as achieved via the UIControl addTarget:action:forControlEvents API when writing native code.

In an example embodiment, these event types may be used:
  onClick (touch—UIControlEventTouchUpinside)
  onLongClick (touch and hold)
  onOrientationChange (on phone orientation change)
  onEnter (on Enter pressed)
  onDidLoad (viewDidLoad)
  onViewWillAppear
  onChange
  onSearch (search pressed)
  onDataLoaded
  onCreate
  onDidAppear
  onProgressCanceled
  onContextChanged
  onGlobalContextChanged The actions that define what happens when an event is triggered include:
  navigate—navigates to another screen with a given target tile.
  back—returns to the previous screen.
  edit—places the view in edit mode.
  copy—copies attributes from the source object to the target object.
  save—saves the changes made to the current object.
  delete—deletes the current object.
  uiRefresh—refreshes the current tile's views.
  dataReload—reloads the data.
  showModal—presents the tile modally.
  dismissModal—closes a modal screen.
  updateContext—updates the tile's context.
  clearContext—the context is purged
  updateGlobalContext—updates the global context cache with values provided as action parameters.
  clearGlobalContext—the global context is cleaned up
  waitForContext—tells the tile to stop further activities until the context arrives.

pushUndoBuffer—starts an undo group; changes made in an undo group can be undone simultaneously.

popUndoBuffer—closes a previously opened undo group.

emptyUndoBuffer—reverts all BO changes.

showProgressView—shows an alert view; the alert view's parameters are provided in the binding and the BindigRef.

dismissProgressView—closes the alert view previously opened via showProgressView.

In an example embodiment, with the extensibility framework, a developer can format currency, address, phone number, date, and time based on the locale settings of the device.

In an example embodiment, the developer can use functions when configuring for concatenating strings, formatting strings, counting records in a collection, and setting default values on a control. Functions may begin with "$_". This section provides details about the some example functions:

$_concat(param1, . . . ): string

Converts all parameters to string and concatenates them into one string:

$_now( ): date

Returns the current date and time as dateTime.

$_format.date(date value, format option): string

Returns the formatted string of a date value.

Parameters:
  date value—date typed value.
  format option—valid values are: short, medium, long (or 1, 2, 3 respectively).

The phone's region setting is used to format the date.

$_format.datetime(date value, format option): string

Returns the formatted string of a date and time value.

Parameters:
  date value—date typed value.
  format option—valid values are: short, medium, long (or 1, 2, 3 respectively).

The phone's region setting is used to format the date and time $_date(year, month, day): date Creates a date typed value from parameters.

Parameters:
  year—year value as int or float.
  month—month value as int or float.
  day—day value as int or float.

$_count(binding_id):int

Returns the number of entries in a collection.

$_is Null(value):int

Checks whether the parameter is a null value, or nonexistent. Returns 0 (false) or 1 (true).

$_is NotNull(value):int

Checks whether the parameter value is a null value or not. The function returns 1 (true) if the parameter value is not a null value, or 0 (false) otherwise.

$_is Empty(value):int

The function returns true (1) if:
  Its parameter is a null value.
  The referred variable or data field of a BO in its parameter does not exist.
  The referred variable or data field of a BO exists, but its value is either an empty string ('') or an NSData instance with zero length.

Returns false (0) otherwise.

$_is NotEmpty(value):int

Returns true (1) for values for which $_is Empty returns false (0).

$_is Existing(value):int

The function returns true (1) if its parameter refers to an existing variable or data field of a BO; false (0) otherwise.

The function also returns true (1) when the referred variable or data field of a BO is null, or empty string, or if it is an NSData instance with zero length, because the parameter refers to an existing object.

$_is NotExisting(value):int

Returns true (1) for values for which $_is Existing returns false (0).

$_setValues(data_reference, value, [data reference, value], . . . , return value): any Sets one or more values in a business object with a given value and returns a value chosen by the developer.

The developer can use this to initialize fields of a new BO with default values before showing it on a create screen. For example, in a new leave request BO, you can write the start date, end date, approved ID, approver name, and absence types into the proper fields before showing the BO on the screen.

$_year(date value):int

Returns the year as int from a date value.

In an example embodiment, the developer can use functions in a configuration in the same places you can use a string literal. The data source adapter exposes a set of APIs that cover all data management needs:
  Data retrieval
  Data filtering
  Creation of DB entries
  Updating existing entries
  Deletion of entries
  Fetching of related entries
  Conversion to and from generic objects to the database specific structures The developer can also implement a custom data source adapter if your data model is different from OData In an example embodiment, the Extensibility Framework relies on several configuration files. By default, each application ships with a predefined set of configuration data, which is added to the project as a resource bundle. The developer can override the defaults by using external configuration files, which let the developer modify and enhance the look and feel of the app, add or remove UI elements and screens, modify data bindings and so on, that is, extend the app without having to recompile it.

Currently, the developer can distribute the configuration files from a Mobile Platform server in compressed form, which is called the Application Configuration Profile (ACP).

In an example embodiment, the Application Configuration Profile contains several files that are organized in this directory structure:
  META-INF—this folder contains versioning-related metadata.
    MANIFEST.MF—the manifest file required by the SAP Mobile Platform Server.
  tiles—this folder contains the extensibility-related configurations:
    layout_phone.xml—extensibility configuration file for iPhone and iPod Touches.
    layout_tablet.xml—extensibility configuration file for iPad.
  styles—this folder contains the style configuration file.
    style.xml—the styling configuration file.
  img—this folder contains the static images used by the application, organized by platform.
    Ios—contains images specific to the iOS platform. The top-level folder contains images common to all iOS devices.
      Iphone—contains images specific to iPhone.
      Ipad—contains images specific to iPad.

Native iOS naming conventions apply, that is, <filename>.png for low-resolution images, and <filename>@2x.png for hi-resolution images.

Android—contains images specific to the Android platform. The top-level folder contains images common to all Android devices.

Ldpi—contains images specific to low-density Android devices.

Mdpi—contains images specific to medium-density Android devices.

hdpi—contains images specific to high-density Android devices.

Xhdpi—contains images specific to extra high-density Android devices.s strings—this folder contains localized text strings, one file per locale.

ext—this folder contains configuration files required by the application. The entry names are defined by the application. The developer can place any kinds of files in this directory. Although the framework does not process files in the ext folder, it exposes the APIs required to retrieve their content.

Demo—contains offline data used by the application in demo mode.

Ios—platform-specific offline XML files.

Android—platform-specific offline data.

In an example embodiment, the ACP can be delivered to devices using a Mobile Platform server. The application can be registered with the mobile platform.

Figure 54:
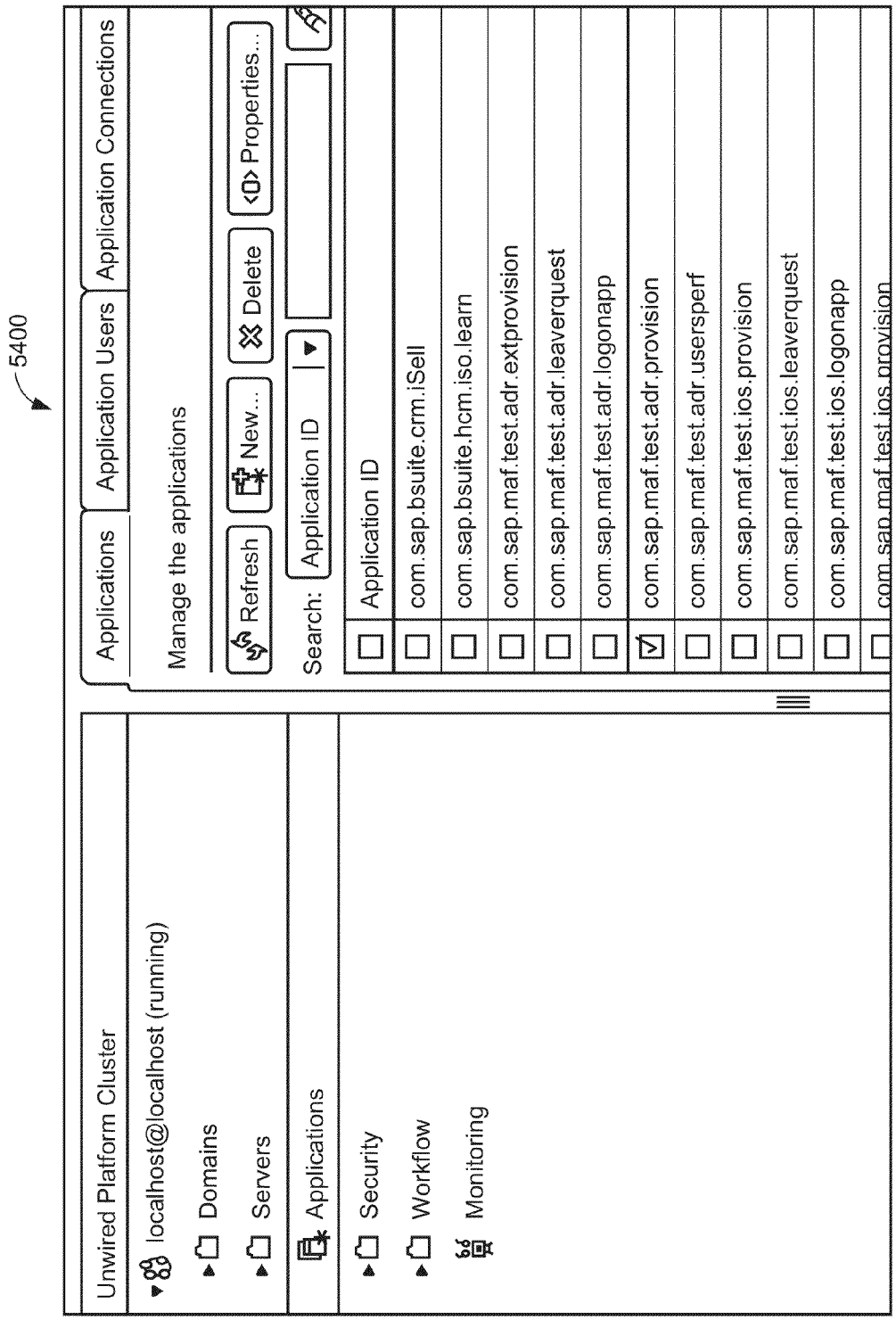
FIG. 54 is a screen capture illustrating a method, in accordance with an example embodiment, of uploading a configuration profile.
Figure 55:
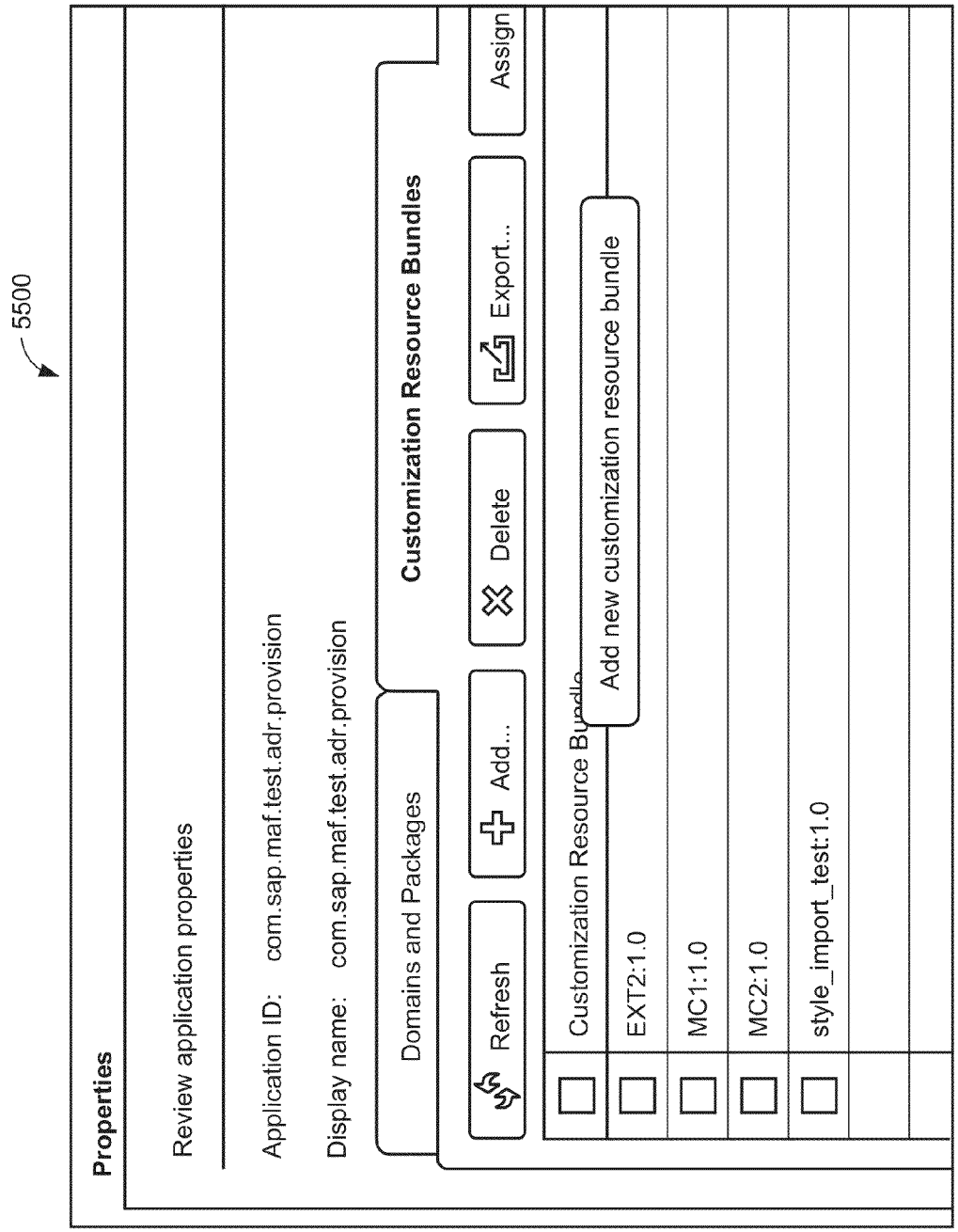
FIG. 55 is a screen capture illustrating a method, in accordance with an example embodiment, of selecting a customization resource bundles tab.

FIG. 54 is a screen capture illustrating a method 5400, in accordance with an example embodiment, of uploading a configuration profile. After logging in to the Mobile Platform Server, the developer may click Applications, select the app and click Properties. Then the developer may select the Customization Resources Bundles tab and click Add to upload the compressed resource bundle. FIG. 55 is a screen capture illustrating a method 5500, in accordance with an example embodiment, of selecting a customization resource bundles tab.

After the resource is uploaded, the Mobile Platform notifies the app about the change. This can happen while the app is running, if the user is logged in to the Mobile Platform, or the next time the user logs in.

In an example embodiment, the MAF Extensibility Framework libraries rely on MAFLogger APIs for logging and tracing purposes.

The MAFLogger provides built-in loggers: a console logger, and a file logger, and also acts as a wrapper on top of the SDMLogger (see the SDMSupportability library). By default, noncritical logs are disabled, and therefore, only exceptional cases appear in the log. The developer can use the MAFLogger enableNonCriticalLogging: API to enable verbose logging; however, enabling this API will significantly increase the number of log files.

Serious issues, such as exceptions and validation problems are logged with Error level, while non-critical issues are marked as Warnings.

Figure 56:
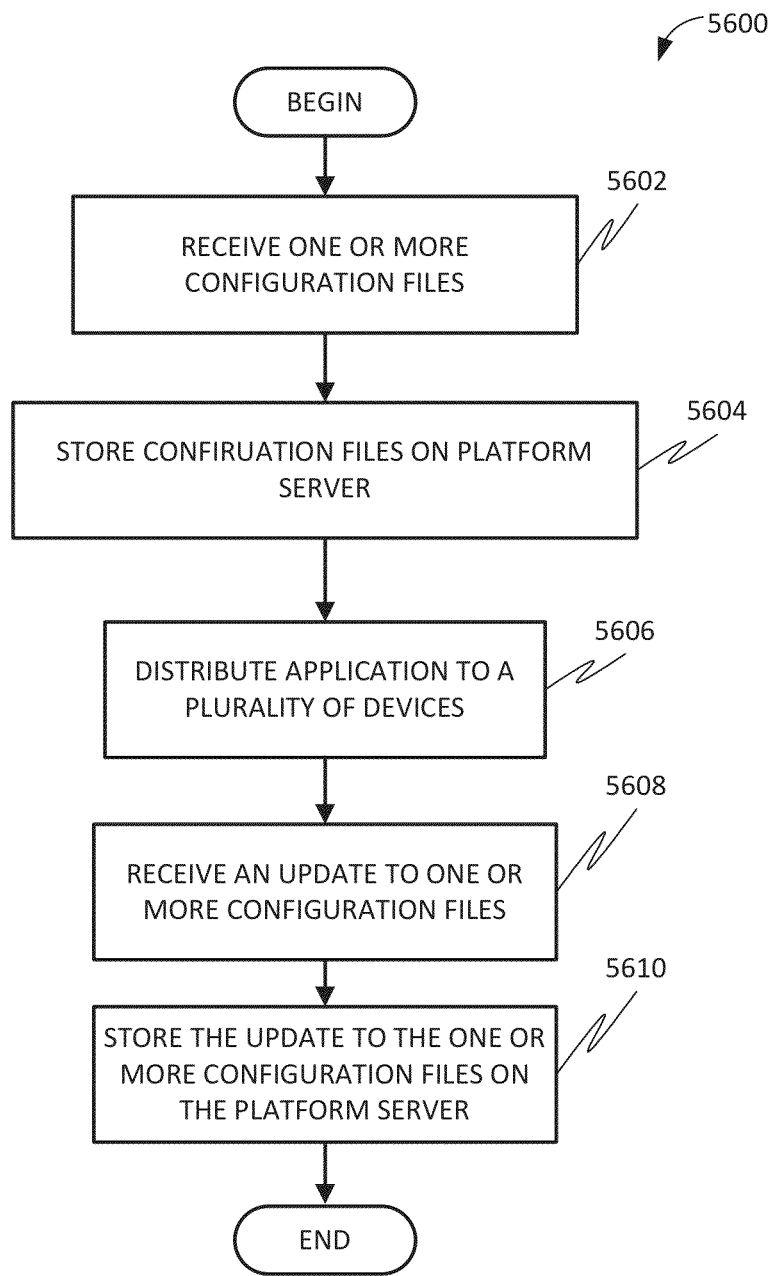
FIG. 56 is a flow diagram illustrating a method, in accordance with an example embodiment, of extending an application distributed to a plurality of devices.

FIG. 56 is a flow diagram illustrating a method 5600, in accordance with an example embodiment, of extending an application distributed to a plurality of devices. At operation 5602, one or more configuration files are received. These may be received from, for example, an application developer. At operation 5604, the configuration files are stored on a platform server. At operation 5606, the application may be distributed to the plurality of devices, the application containing code performing one or more calls to the one or more configuration files. At operation 5608, an update to the one or more configuration files may be received. This may be received from, for example, the developer (although not necessarily the developer in operation 5602). At operation 5610, the update to the one or more configuration files may be stored on the platform, thereby altering the application distributed to the plurality of devices without recompiling the application.

Figure 57:
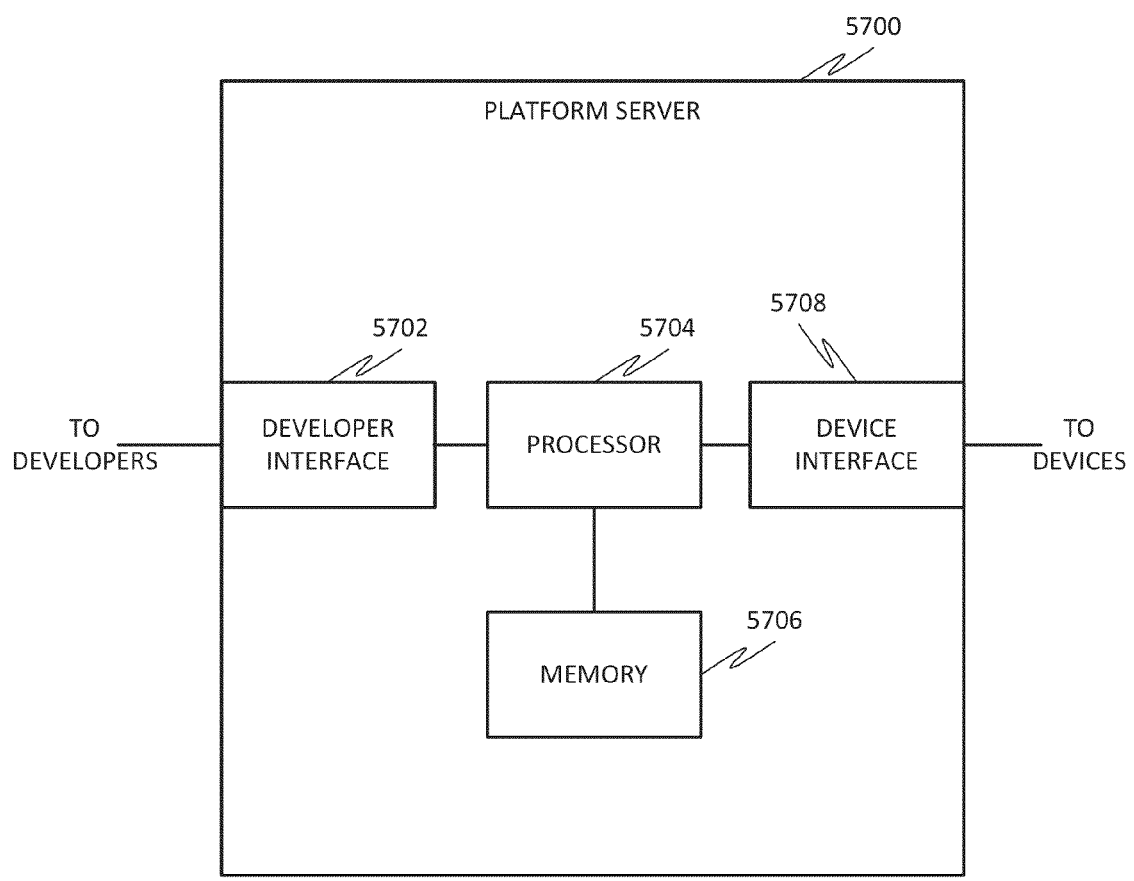
FIG. 57 is a block diagram illustrating a platform server in accordance with an example embodiment.

FIG. 57 is a block diagram illustrating a platform server 5700 in accordance with an example embodiment. The platform server may include a developer interface 5702 executable by a processor 5704 and configured to receive one or more configuration files from a developer. The platform server may also include a memory 5706 configured to store the configuration files. The platform server may also include a device interface 5708 executable by the processor and configured to distribute an application to a plurality of devices, the application containing code performing one or more calls to the one or more configuration files. The developer interface 5702 may be further configured to receive an update to the one or more configuration files and store the update in the memory, thereby altering the application distributed to the plurality of devices without recompiling the application.

Figure 58:
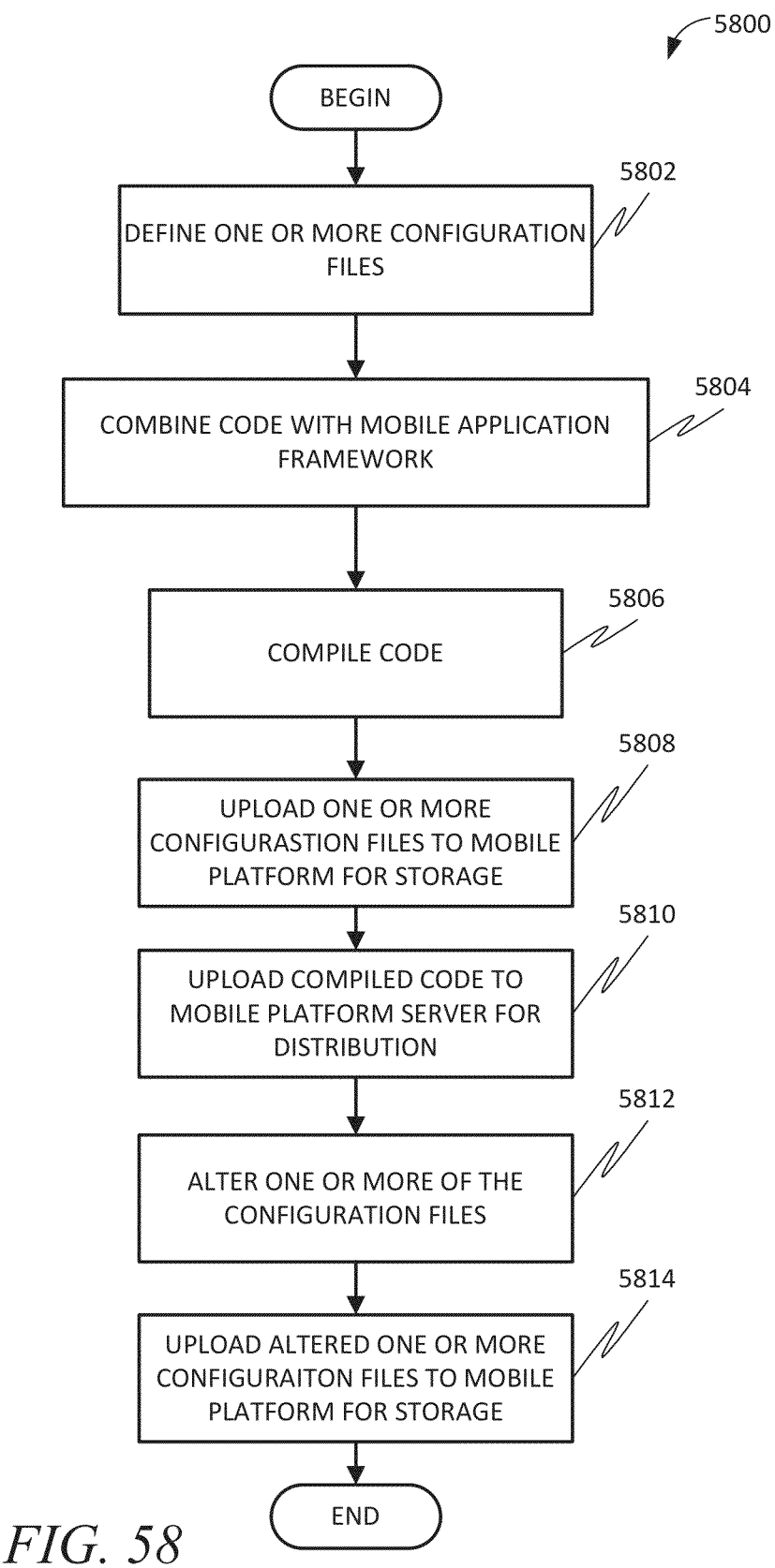
FIG. 58 is a flow diagram illustrating a method, in accordance with an example embodiment, of creating an extensible application.

FIG. 58 is a flow diagram illustrating a method 5800, in accordance with an example embodiment, of creating an extensible application. At operation 5802, one or more configuration files may be defined for the extensible application, the one or more configuration files including metadata for the extensible application. At operation 5804, code defining behavior of the extensible application may be combined with a mobile application framework, the mobile application framework including a plurality of generic components, the code including calls made to one or more of the generic components. At operation 5806, the code may be compiled. At operation 5808, one or more of the configuration files may be uploaded to a mobile platform server for storage. At operation 5810, the compiled code may be uploaded to the mobile platform server for distribution to one or more devices. At operation 5812, one or more of the configuration files may be altered to alter an aspect of the extensible application. At operation 5814, the altered one or more configuration files may be uploaded to the mobile platform server for storage.

Figure 59:
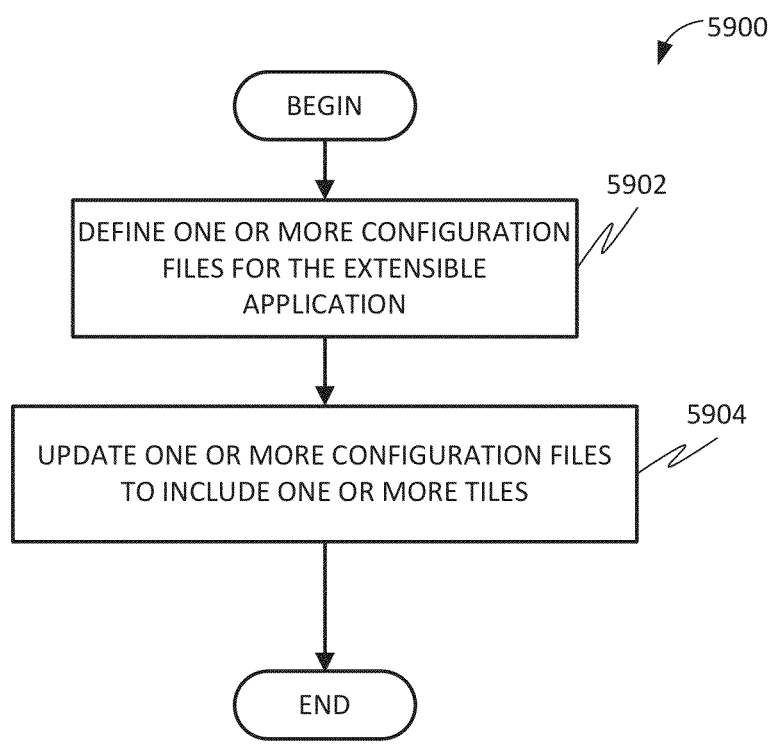
FIG. 59 is a flow diagram illustrating a method, in accordance with an example embodiment, of providing a metadata-driven mobile application.

FIG. 59 is a flow diagram illustrating a method 5900, in accordance with an example embodiment, of providing a metadata-driven mobile application. At operation 5902, a mobile application framework is added to a metadata-driven application, the mobile application framework including generic libraries having one or more references to one or more configuration files stored on a platform server. At operation 5904, the one or more configuration files may be updated to include one or more tiles, each tile comprising a user interface element or screen view, each tile being either a primitive tile or a tile embedding other nested tiles within it, thereby updating the metadata-driven mobile application without recompiling it.

Figure 60:
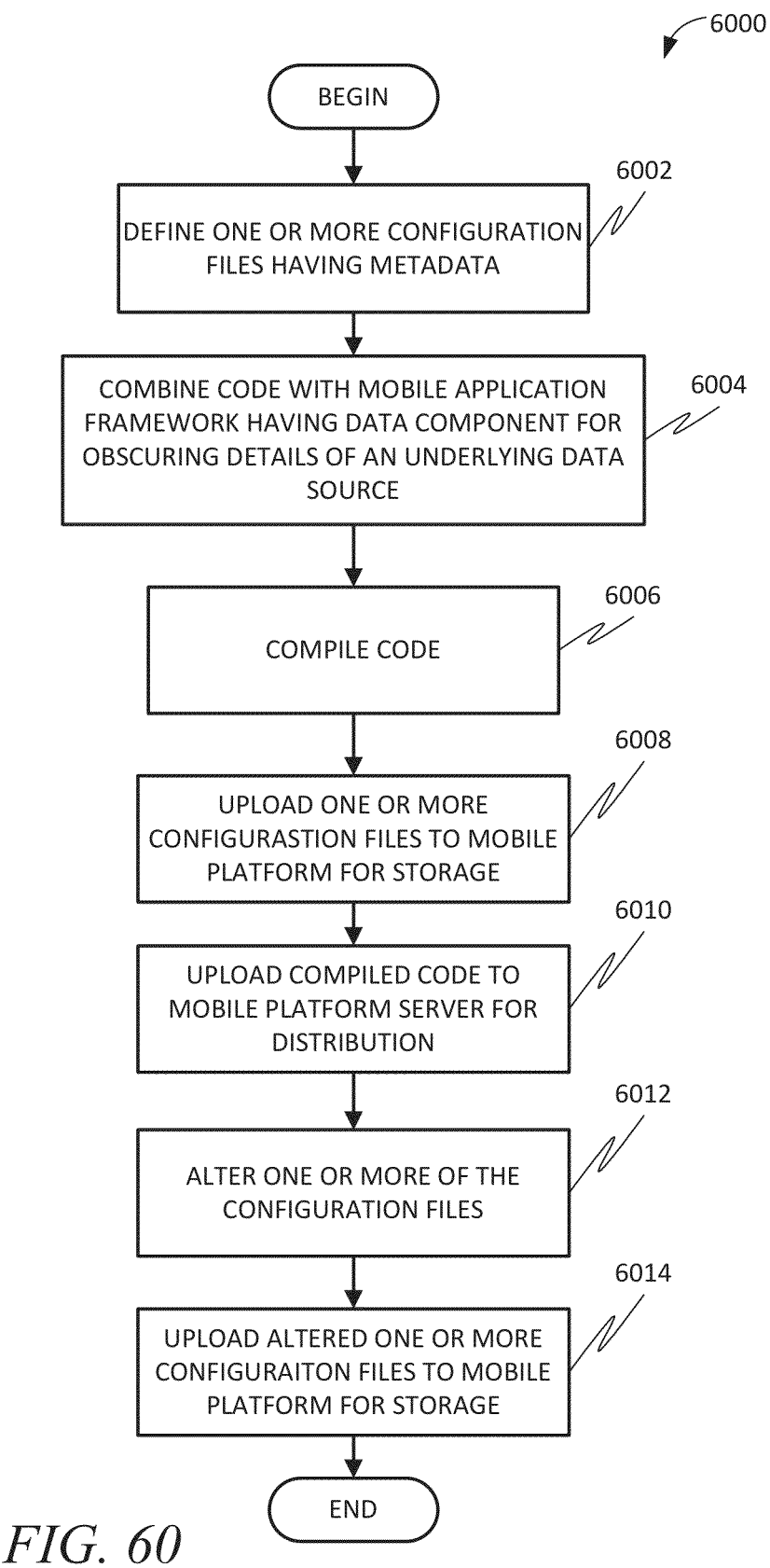
FIG. 60 is a flow diagram illustrating a method, in accordance with an example embodiment, of creating an extensible application.

FIG. 60 is a flow diagram illustrating a method 6000, in accordance with an example embodiment, of creating an extensible application. At operation 6002, one or more configuration files may be defined for the extensible application, the one or more configuration files including metadata for the extensible application. At operation 6004, code defining behavior of the extensible application may be combined with a mobile application framework, the mobile application framework including a data component executable by the processor and configured to obscure details of an underlying data source for the extensible application, the code including calls made to one or more of the generic components. At operation 6006, the code may be compiled. At operation 6008, one or more of the configuration files may be uploaded to a mobile platform server for storage. At operation 6010, the compiled code may be uploaded to a platform server for distribution to one or more devices. At operation 6012, one or more of the configuration files may be altered to alter an aspect of the extensible application. At operation 6014, the altered one or more configuration files may be uploaded to the mobile platform server for storage.

Figure 61:
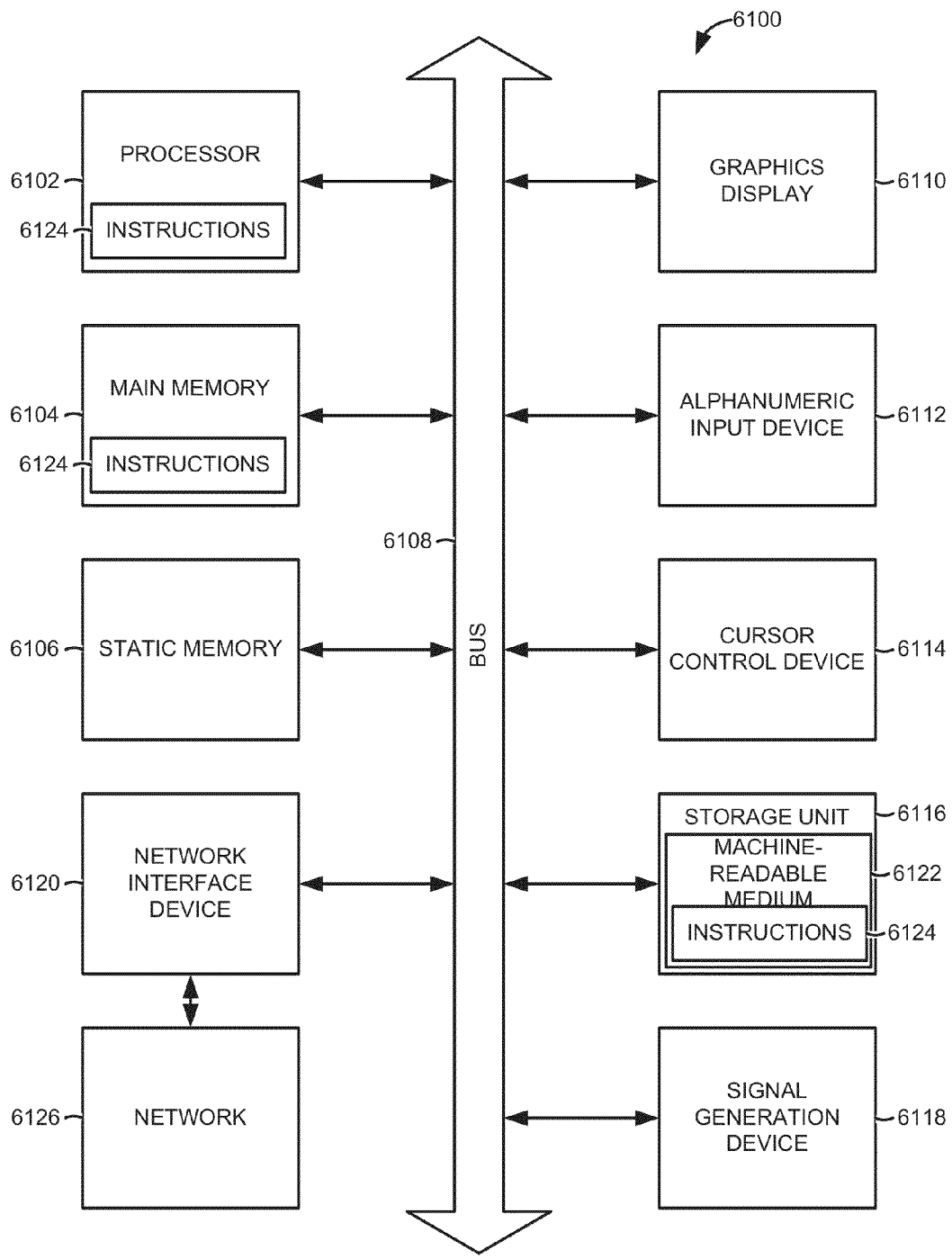
FIG. 61 is a block diagram of a computer processing system at a server system, within which a set of instructions may be executed for causing the computer processing system to perform any one or more of the methodologies discussed herein.

FIG. 61 is a block diagram of a computer processing system 6100 at a server system, within which a set of instructions 6124 may be executed for causing the computer processing system 6100 to perform any one or more of the methodologies discussed herein.

In addition to being sold or licensed via traditional channels, embodiments may also be deployed by Software-as-a-Service (SaaS), application service providers (ASP), or utility computing providers. The computer may be a server computer, a personal computer (PC), a tablet PC, a set-top box (STB), a personal digital assistant (PDA), cellular telephone, or any processing device capable of executing a set of instructions 6124 (sequential or otherwise) that specify actions to be taken by that device. Further, while only a single computer is illustrated, the term "computer" shall also be taken to include any collection of computers that individually or jointly execute a set (or multiple sets) of instructions 6124 to perform any one or more of the methodologies discussed herein.

The example computer processing system 6100 includes a processor 6102 (e.g., a central processing unit (CPU), a graphics processing unit (GPU) or both), main memory 6104 and static memory 6106, which communicate with each other via bus 6108. The computer processing system 6100 may further include a graphics display unit 6110 (e.g., a plasma display, a liquid crystal display (LCD) or a cathode ray tube (CRT)). The computer processing system 6100 also includes an alphanumeric input device 6112 (e.g., a keyboard), a cursor control device 6114 (e.g., a mouse, touch screen, or the like), a storage unit 6116, a signal generation device 6118 (e.g., a speaker), and a network interface device 6120.

The storage unit 6116 includes machine-readable medium 6122 on which is stored one or more sets of instructions 6124 and data structures (e.g., software) embodying or utilized by any one or more of the methodologies or functions described herein. The instructions 6124 may also reside, completely or at least partially, within the main memory 6104 and/or within the processor 6102 during execution thereof by the computer processing system 6100, the main memory 6104 and the processor 6102 also constituting machine-readable, tangible media.

The instructions 6124 may be further transmitted or received over a network 6126 via a network interface device 6120 utilizing any one of a number of well-known transfer protocols (e.g., HTTP).

While the machine-readable medium 6122 is shown in an example embodiment to be a single medium, the term "machine-readable medium" should be taken to include a single medium or multiple media (e.g., a centralized or distributed database, and/or associated caches and servers) that store the one or more sets of instructions 6124. The term "machine-readable medium" shall also be taken to include any medium that is capable of storing, encoding or carrying a set of instructions 6124 for execution by the computer processing system 6100 and that cause the computer processing system 6100 to perform any one or more of the methodologies of the present application, or that is capable of storing, encoding or carrying data structures utilized by or associated with such a set of instructions 6124. The term "machine-readable medium" shall accordingly be taken to include, but not limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions and improvements fall within the scope of the claims.

What is claimed is:

1. A method for providing a metadata-driven mobile application, the method comprising:
   receiving an indication from an user, via a graphical user interface, of one or more user interface elements to include in an un-compiled metadata-driven application;
   in response to the receiving, adding a mobile application framework to a metadata-driven application, the mobile application framework including generic libraries defining the one or more user interface elements and having one or more references to one or more configuration files;
   compiling the un-compiled metadata-driven application;
   uploading the compiled metadata-driven application to an application store for downloading and installation on a mobile device;
   receiving an indication from the user, via the graphical user interface, of changes to functionality of the one or more user interface elements;
   in response to the receiving an indication from the user, via the graphical user interface, of changes, updating the one or more configuration files to include one or more tiles, each tile comprising a user interface element or screen view, each tile being either a primitive tile or a tile embedding other nested tiles within it, one or more of the tiles being metadata-driven and provisioned by assigning a custom data source adapter delegate for the tile or passing context to the tile upon creation, wherein each tile, when retrieved, triggers a corresponding controller to fetch data; and
   uploading the updated one or more configuration files to a mobile platform server for provisioning to the mobile device, thereby updating the compiled metadata-driven application installed on the mobile device without recompiling the compiled metadata-driven application by allowing metadata in the one or more configuration files to be parsed and transformed into constructs native to the metadata-driven application.

2. The method of claim 1, wherein the metadata-driven mobile application is fully metadata-driven.

3. The method of claim 1, wherein the metadata-driven mobile application is partially metadata-driven and partially driven by custom code defined by a developer.

4. The method of claim 1, further comprising combining the one or more tiles with controls and views native to a particular mobile device.

5. The method of claim 1, wherein a root tile of the metadata-driven mobile application is metadata-driven, wherein the root tile represents the metadata-driven mobile application's initial user interface upon launching.

6. The method of claim 1, wherein one or more of the tiles includes a manually coded view.

7. The method of claim 1, further comprising calling one or more delegates before and after tile creation, wherein the one or more delegates automatically create a tile on behalf of a developer.

8. The method of claim 1, further comprising adding a metadata-driven tile, in the one or more configuration files, as a subview to a manually programmed view controller.

9. The method of claim 1, further comprising adding a metadata-driven tile, in the one or more configuration files, inserted in a navigation chain.

10. The method of claim 1, further comprising, upon execution of the metadata-driven mobile application, fetching data, validating the data, and transforming the data to one or more generic business objects to be displayed in accordance with the one or more tiles.

11. A compiled metadata-driven mobile application, executable by a processor and capable of being called by code in a mobile application, the mobile application comprising:
a mobile application framework including:
a core component configured to expose one or more application program interfaces (APIs) that initialize the mobile application framework when executed by a mobile device;
a user interface component configured to retrieve one or more configuration files identified by the core component and stored on the mobile device and to use the one or more configuration files to generate a user interface, the one or more configuration files including one or more tiles, each tile comprising a user interface element or screen view, each tile being either a primitive tile or a tile embedding other nested tiles within it, the configuration files dynamically updatable by a user and provisioned to the mobile device, causing the alteration of the functionality of the user interface without recompiling the metadata-driven mobile application, one or more of the tiles being metadata-driven and provisioned by assigning a custom data source adapter delegate for the tile or passing context to the tile upon creation, wherein each tile, when retrieved, triggers a corresponding controller to fetch data;
a data component configured to provide bindings to one or more business objects defining data for the mobile application;
generic libraries defining the one or more user interface elements and having one or more references to one or more configuration files; and
a configuration component configured to read and parse metadata in the one or more configuration files and transform the metadata to constructs native to the mobile application; and
a custom code portion containing one or more calls to the mobile application framework.

12. The metadata-driven mobile application of claim 11, wherein the mobile application framework includes one or more libraries.

13. A non-transitory machine-readable storage medium comprising instructions, which when implemented by one or more machines, cause the one or more machines to perform the following operations comprising:
receiving an indication from a user, via a graphical user interface, of one or more user interface elements to include in an un-compiled metadata-driven application;
in response to the receiving, adding a mobile application framework to a metadata-driven application, the mobile application framework including generic libraries defining the one or more user interface elements and having one or more references to one or more configuration files;
compiling the un-compiled metadata-driven application;
uploading the compiled metadata-driven application to an application store for downloading and installation on a mobile device;
receiving an indication from the user, via the graphical user interface, of changes to functionality of the one or more user interface elements;
in response to the receiving an indication from the user, via the graphical user interface, of changes, updating the one or more configuration files to include one or more tiles, each tile comprising a user interface element or screen view, each tile being either a primitive tile or a tile embedding other nested tiles within it, one or more of the tiles being metadata-driven and provisioned by assigning a custom data source adapter delegate for the tile or passing context to the tile upon creation, wherein each tile, when retrieved, triggers a corresponding controller to fetch data; and
uploading the updated one or more configuration files to a mobile platform server for provisioning to the mobile device, thereby updating the compiled metadata-driven application installed on the mobile device without recompiling the compiled metadata-driven application by allowing metadata in the one or more configuration files to be parsed and transformed into constructs native to the metadata-driven application.

14. The non-transitory machine-readable storage medium of claim 13, wherein the metadata-driven mobile application is fully metadata-driven.

15. The non-transitory machine-readable storage medium of claim 13, wherein the metadata-driven mobile application is partially metadata-driven and partially driven by custom code defined by a developer.

16. The non-transitory machine-readable storage medium of claim 13, wherein the operations further comprise combining the one or more tiles with controls and views native to a particular mobile device.

17. The non-transitory machine-readable storage medium of claim 13, wherein a root tile of the metadata-driven mobile application is metadata-driven, wherein the root tile represents the metadata-driven mobile application's initial user interface upon launching.

18. The non-transitory machine-readable storage medium of claim 13, wherein one or more of the tiles includes a manually coded view.

* * * * *